United States Patent [19]
Yoshii et al.

[11] Patent Number: 5,457,363
[45] Date of Patent: Oct. 10, 1995

[54] DRIVING-FORCE REGULATING APPARATUS FOR ELECTRIC VEHICLE

[75] Inventors: Kinya Yoshii; Takeharu Koide; Eiji Ichioka, all of Toyota; Koichi Tanaka, Mishima; Kojiro Kuramochi, Numazu, all of Japan

[73] Assignee: Toyota Jidosha Kabushiki Kaisha, Toyota, Japan

[21] Appl. No.: 186,187

[22] Filed: Jan. 24, 1994

[30] Foreign Application Priority Data

| Feb. 9, 1993 | [JP] | Japan | 5-044673 |
| Mar. 5, 1993 | [JP] | Japan | 5-071143 |
| Mar. 5, 1993 | [JP] | Japan | 5-071144 |
| Mar. 5, 1993 | [JP] | Japan | 5-071145 |

[51] Int. Cl.$^6$ .................................................. H02P 7/00
[52] U.S. Cl. .................... 318/432; 318/139; 180/282; 477/114
[58] Field of Search .................... 318/139, 587, 318/573, 571, 370–376, 432; 290/9, 16, 17, 38 E, 40 A, 46, 50; 192/3.3, 3.31, 4 R, 7, 9, 12 R, 13 R, 15, 17 C, 31, 40, 55, 54, 116.5, 127, 5, 94; 180/170, 171, 275, 278, 277, 282; 477/43, 114, 116, 118, 120, 129, 138, 143

[56] References Cited

U.S. PATENT DOCUMENTS

| 4,529,919 | 7/1985 | Melocik et al. | 318/375 X |
| 4,556,830 | 12/1985 | Schwalm et al. | 318/434 X |
| 4,688,530 | 8/1987 | Nishikawa et al. | 180/53.8 X |
| 4,879,925 | 11/1989 | Taga et al. | 74/867 |
| 4,969,545 | 11/1990 | Hayashi | 192/0.076 |
| 5,057,760 | 10/1991 | Dadpey et al. | 318/807 |
| 5,067,372 | 11/1991 | Suzuki | 74/866 |
| 5,119,694 | 6/1992 | Sato et al. | 74/866 |
| 5,376,869 | 12/1994 | Konrad | 318/139 X |

FOREIGN PATENT DOCUMENTS

| 53-60018 | 5/1978 | Japan . |
| 61-200054 | 9/1986 | Japan . |
| 199410 | 4/1989 | Japan . |
| 265604 | 3/1990 | Japan . |
| 3253202 | 11/1991 | Japan . |
| 480959 | 7/1992 | Japan . |

*Primary Examiner*—Jonathan Wysocki
*Attorney, Agent, or Firm*—Kenyon & Kenyon

[57] ABSTRACT

A driving-force regulating apparatus for an electric vehicle, including a first device which regulates, when the accelerator is operated, an output torque of the electric motor to a running torque corresponding to (A1) an operation amount of the accelerator and (A2) a rotation speed of the motor; a second device which regulates, when the vehicle satisfies a predetermined condition, the output torque of the electric motor to a creep torque corresponding to (B) one or more conditions of the vehicle; and a third device which regulates, when the accelerator is operated after termination of the creep torque regulation, the output torque of the motor to an after-creep torque corresponding to (B) the one or more conditions of the vehicle, (C1) an after-creep operation amount of the accelerator, and (C2) an after-creep rotation speed of the electric motor, the third device regulating the output torque of the motor such that the after-creep torque is different from a running torque to which the output torque of the motor is regulated in response to a same operation amount of the accelerator as the after-creep operation amount and a same rotation speed of the motor as the after-creep rotation speed.

26 Claims, 29 Drawing Sheets

FIG.8(a) MMA
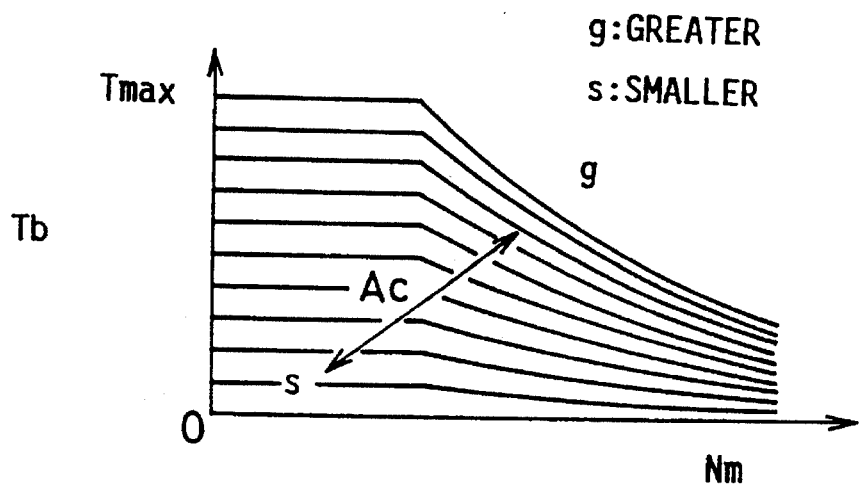
FIG.8(b) MMB
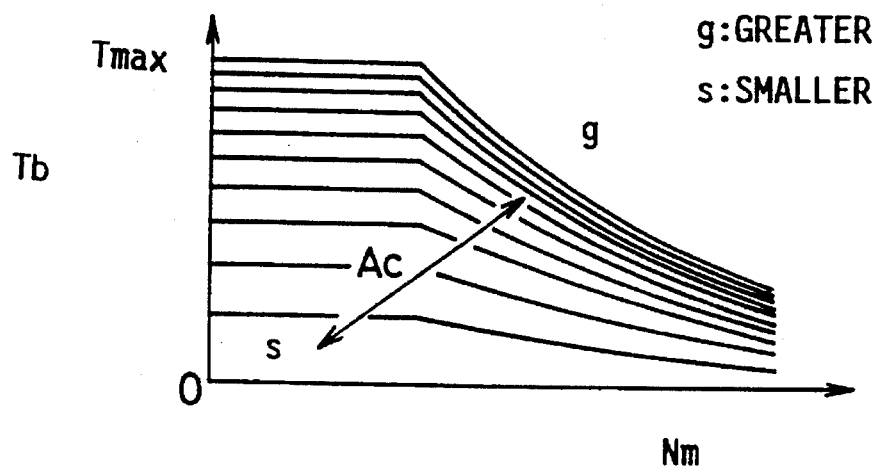
FIG.8(c) MMC
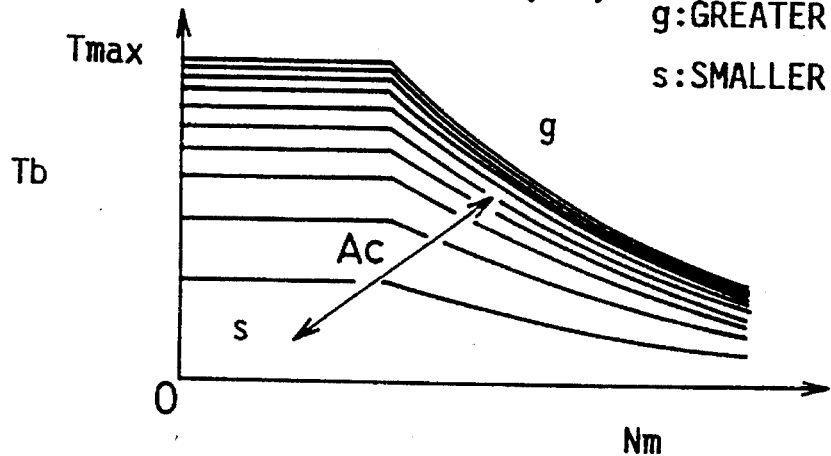

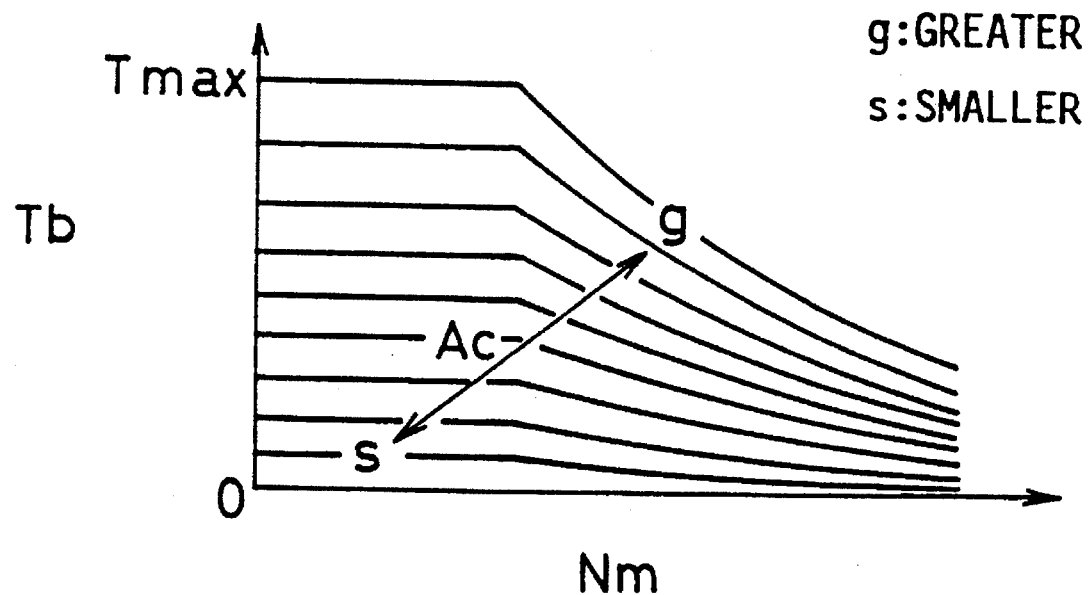
FIG.8(d) MMD
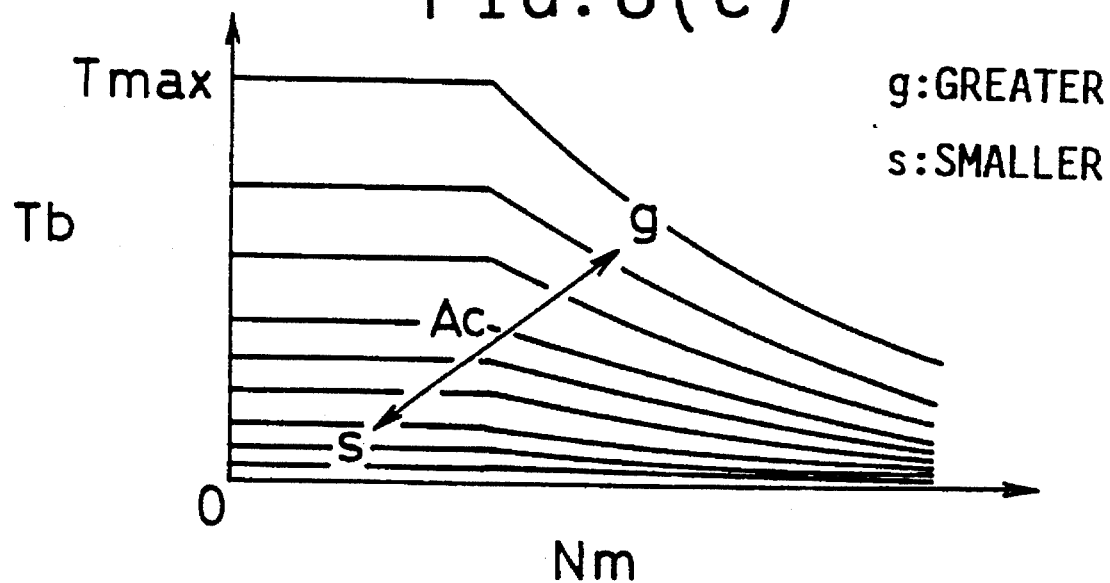
FIG.8(e) MME

DRIVING-FORCE REGULATING APPARATUS FOR ELECTRIC VEHICLE

BACKGROUND OF THE INVENTION

1. Field of the Invention

The present invention generally relates to a driving-force regulating apparatus for an electric vehicle which is driven by an electric motor and particularly to such an apparatus which is capable of regulating the output torque of the electric motor to a creep torque so that the electric vehicle creeps, i.e., is driven at a very low speed around zero.

2. Related Art Statement

There is known an electric vehicle which is driven by an electric motor in such a way that the output torque of the motor is regulated to a running torque corresponding to (a) an amount of operation of the accelerator pedal of the vehicle and (b) a current speed of rotation of the motor upon operation of the accelerator pedal. When the operation amount of the accelerator pedal is zero, the output torque of the electric motor is regulated to zero. Unlike an AT (automatic-transmission) vehicle having a hydraulic torque converter, the conventional electric vehicle is not capable of producing a creep torque. Therefore, when the driver or operator starts the electric vehicle on an upgrade road surface, he or she must depress the accelerator pedal immediately after releasing the brake pedal, or use the side brake. Otherwise, the electric vehicle will be dragged backward or downward on the upgrade road surface. Thus, operating the electric vehicle is considerably difficult for those accustomed to operating the AT vehicle.

In the technical background, Japanese Patent Application laid open for public inspection under Publication No. 3(1991)-253202 discloses the art of regulating, when an electric vehicle is stopped on an upgrade road surface, the output torque of an electric motor to a creep torque corresponding to the degree of upgrade of the road surface detected by a sensor, so that the vehicle is not dragged backward on the upgrade road surface. The output torque of the electric motor may be regulated to a creep torque corresponding to an operation amount of a manually operable member available to the operator. Thus, the driving-force regulating apparatus disclosed by the Japanese document is capable of effecting a creep torque regulation.

The above driving-force regulating apparatus is adapted to regulate, when the operator operates the accelerator pedal for starting the electric vehicle on the upgrade road surface following the creep torque regulation, the output torque of the electric motor again to a normal or running torque, according to a pre-stored data map indicative of a relationship between (1) motor output torque and (2) parameters, i.e., (2a) operation amount of the accelerator pedal and (2b) rotation speed of the electric motor. However, the data map is prepared mainly for the case where the vehicle is driven on a flat road surface. Therefore, in the case where the vehicle is started on a highly upgrade road surface, the operator must continue to fully depress the accelerator pedal so that the electric motor produces a sufficiently great driving force to start the vehicle on the highly upgrade road surface. Thus, the operability of the electric vehicle is not satisfactory.

A backward dragging force exerted to a specific electric vehicle on an upgrade road surface differs from those exerted to other vehicles, because the vehicles have different weights due to different equipments and/or different numbers of passengers, and exhibit different rolling resistances of tires. Additionally, since parts of the specific vehicle are deteriorated and/or worn because of use or service, the backward dragging force exerted to the vehicle is subject to time-wise change. Therefore, if the vehicle is driven on the same upgrade road surface with the same creep torque after a certain period of use, the vehicle might be dragged backward. If the vehicle is adapted, by taking into consideration the individuality and time-wise change of the vehicle, such that the output torque of the electric motor is regulated to a greater than necessary creep torque, the backward dragging of the vehicle would be prevented but the amount of consumption of electric power would be more than necessary. Even if where the output torque of the electric motor may be regulated to a creep torque selected by the operator, it is, in fact, impossible to select a creep torque appropriately corresponding to the individuality and one or more current conditions of the vehicle.

Japanese Patent Application laid open for public inspection under Publication No. 2(1990)-65604 discloses the art of producing, when the running speed of an electric vehicle is around zero with the accelerator pedal being released (i.e., "OFF"), an output torque of the electric motor in a direction opposite to a direction corresponding to the direction of movement of the vehicle, so that the vehicle is prevented from being dragged forward or backward on a downgrade or upgrade road surface, respectively.

Since, however, the above-indicated, second driving-force regulating apparatus is adapted to increase the output torque of the electric motor based on the distance of movement of the electric vehicle, the vehicle is subjected to repetitive forward and backward movements on the downgrade or upgrade road surface. Thus, the ride comfort of the vehicle is lowered. Additionally, as the degree of downgrade or upgrade of the road surface increases, or as the weight of the electric vehicle increases due to, e.g., increased number of passengers, the distance of movement of the vehicle increases. Moreover, the second apparatus controls the electric motor to produce an output torque in an opposite direction, also when the running speed of the electric vehicle is reduced to around zero as a result of operation ("ON") of the brake pedal. Thus, this arrangement leads to wasteful consumption of electric power.

The above-indicated, first driving-force regulating apparatus is adapted to regulate the output torque of the electric motor to a creep torque, independently of change of steering angle of the electric vehicle. When the steering angle is changed by rotating the steering wheel, the running resistance of the vehicle is changed and accordingly the running speed of the vehicle is changed. Therefore, if the electric vehicle is driven with a great steering angle for, e.g., putting the vehicle into a garage, the vehicle might be stopped because of an increased running resistance. For avoiding this, it is possible to adapt the first apparatus to regulate the output torque of the electric motor to a greater creep torque. In this case, however, when the electric vehicle is driven with a small steering angle, the vehicle would be driven at a higher than necessary running speed. Thus, the operability of the vehicle would not be improved but lowered. Although the operator can use the manually operable member to adjust the creep torque, it is considerably difficult to adjust the creep torque while simultaneously operating or rotating the steering wheel. Therefore, it is, in fact, impossible to obtain an appropriate creep torque corresponding to the current steering angle of the vehicle.

SUMMARY OF THE INVENTION

It is therefore an object of the present invention to provide a driving-force regulating apparatus for an electric vehicle which apparatus regulates the output torque of the electric motor so that the vehicle smoothly starts even on an upgrade or a downgrade road surface.

It is another object of the present invention to provide a driving-force regulating apparatus for an electric vehicle which apparatus regulates the output torque of the electric motor to an appropriate creep torque irrespective of change of one or more conditions of the vehicle such as the individuality and/or time-wise change of the vehicle and/or the degree of upgrade or downgrade of the road surface on which the vehicle is driven.

It is yet another object of the present invention to provide a driving-force regulating apparatus for an electric vehicle which apparatus regulates, irrespective of the degree of downgrade or upgrade of the road surface and/or the weight of the vehicle, the output torque of the electric motor with minimized consumption amount of electric power so that the running speed of the electric vehicle is maintained at around zero.

It is a further object of the present invention to provide a driving-force regulating apparatus for an electric vehicle which apparatus regulates the output torque of the electric motor to a creep torque appropriately corresponding to the steering angle of the vehicle.

The above objects have been achieved by the present invention.

According to a first aspect of the present invention, there is provided a driving-force regulating apparatus for an electric vehicle which is driven by an electric motor, comprising first regulating means for regulating, when an accelerator of the electric vehicle is operated, an output torque of the electric motor to a running torque corresponding to (A1) an operation amount of the accelerator and (A2) a rotation speed of the electric motor when the accelerator is operated; second regulating means for regulating, when the electric vehicle satisfies a predetermined condition, the output torque of the electric motor to a creep torque corresponding to (B) at least one condition of the vehicle different from an operation amount of the accelerator; and third regulating means for regulating, when the accelerator is operated after termination of the creep torque regulation by the second regulating means, the output torque of the electric motor to an after-creep torque corresponding to (B) the at least one condition of the vehicle when the vehicle satisfies the predetermined condition, (C1) an after-creep operation amount of the accelerator after the termination of the creep torque regulation, and (C2) an after-creep rotation speed of the electric motor when the accelerator is operated after the termination of the creep torque regulation, the third regulating means regulating the output torque of the electric motor to the after-creep torque such that the after-creep torque is different from a running torque to which the output torque of the motor is regulated by the first regulating means in response to a same operation amount of the accelerator as the after-creep operation amount thereof and a same rotation speed of the motor as the after-creep rotation speed thereof.

In the driving-force regulating apparatus in accordance with the first aspect of the invention, when the electric vehicle satisfies a predetermined condition, e.g., condition that the running speed of the vehicle is smaller than a reference value around zero, the second regulating means regulates the output torque of the electric motor to a creep torque corresponding to at least one condition of the vehicle, e.g., angle of inclination of the vehicle on an upgrade or downgrade road surface on which the vehicle currently is driven by the motor, and/or weight of the vehicle which may include the weight of the operator and one or more possible passengers. The angle of inclination of the vehicle, i.e., degree of upgrade or downgrade of the road surface may be detected by a known sensor mounted on the vehicle. Since the braking force applied to the brake device of the electric vehicle for braking the vehicle corresponds to the degree of upgrade or downgrade of the road surface, the at least one condition of the vehicle may comprise the braking force, which may be detected as the hydraulic pressure of the brake master cylinder at the time of the operation of the brake device, e.g., at the time of the operation ("ON") of the brake pedal. In this case, when the brake pedal is released ("OFF"), the second regulating means may regulate the output torque of the motor to a creep torque corresponding to the braking force. Furthermore, with the brake pedal being released and simultaneously with the accelerator pedal being released, the second regulating means may adjust the output torque of the motor from a predetermined creep torque to an adjusted creep torque so that with the adjusted creep torque the electric vehicle is driven on an upgrade or downgrade road surface at a prescribed running speed around zero. In this case, the adjusted creep torque corresponds to the degree of upgrade or downgrade of the road surface as the at least one condition of the electric vehicle.

When the accelerator pedal is operated after termination of the creep torque regulation by the second regulating means, the third regulating means regulates the output torque of the electric motor to an after-creep torque corresponding to the at least one condition of the electric vehicle when the vehicle satisfies the predetermined condition. Specifically, the third regulating means regulates the output torque of the electric motor to the after-creep torque such that the after-creep torque is different from a running torque to which the output torque of the electric motor is regulated by the first regulating means in response to a same operation amount of the accelerator as the after-creep operation amount thereof and a same rotation speed of the motor as the after-creep rotation speed thereof. When the second regulating means regulates the output torque of the electric motor to a positive creep torque on an upgrade road surface for preventing the vehicle from being dragging backward due to its weight, the third regulating means may regulate the output torque of the motor to an after-creep torque such that the after-creep torque is greater than a running torque to which the output torque of the motor is regulated by the first regulating means in response to a same operation amount of the accelerator as the after-creep operation amount thereof and a same rotation speed of the motor as the after-creep rotation speed thereof. On the other hand, when the second regulating means regulates the output torque of the electric motor to a negative creep torque on a downgrade road surface for preventing the vehicle from being dragging forward due to its weight, the third regulating means may regulate the output torque of the motor to an after-creep torque such that the after-creep torque is smaller than a running torque to which the output torque of the motor is regulated by the first regulating means in response to a same operation amount of the accelerator as the after-creep operation amount thereof and a same rotation speed of the motor as the after-creep rotation speed thereof.

Therefore, when the electric vehicle is started on an upgrade or downgrade road surface, the output torque of the electric motor is regulated, in response to a same operation amount of the accelerator pedal and a same rotation speed of the motor, to a greater or smaller torque than a running torque for vehicle's running on, e.g., a flat road surface. Therefore, even on a highly upgrade road surface, the electric vehicle smoothly starts without needing a continuous full depression of the accelerator pedal. Thus, the operability of the electric vehicle is improved.

In a preferred embodiment in accordance with the first aspect of the invention, the driving-force regulating apparatus further comprises a memory which stores data indicative of a relationship between creep torque and at least one parameter indicative of the at least one condition of the electric vehicle, the second regulating means determining, when a running speed of the electric vehicle is around zero, a creep torque corresponding to at least one actual value of the at least one parameter, according to the data stored in the memory, and regulating the output torque of the electric motor to the determined creep torque; torque adjusting means for adjusting the output torque of the electric motor from the determined creep torque to an adjusted creep torque, so that with the adjusted creep torque the electric vehicle is driven at a predetermined running speed around zero; and data updating means for updating the data stored in the memory, based on the adjusted creep torque.

In another embodiment in accordance with the first aspect of the invention, the driving-force regulating apparatus further comprises a brake switch which detects operation of a brake device of the electric vehicle for braking the vehicle; and a braking-force detector which detects a braking force applied to the brake device, when the brake switch detects the operation of the brake device and simultaneously when a running speed of the vehicle is around zero, the second regulating means regulating, when the brake switch detects termination of the operation of the brake device, the output torque of the electric motor to the creep torque corresponding to, as the at least one condition of the electric vehicle, the braking force detected by the braking-force detector, so that the running speed of the vehicle is maintained at around zero.

In yet another embodiment in accordance with the first aspect of the invention, the driving-force regulating apparatus further comprises a steering-angle detector which detects a steering angle of a steering member of the electric vehicle, the second regulating means regulating, when the electric vehicle satisfies the predetermined condition, the output torque of the electric motor to the creep torque corresponding to, as the at least one condition of the vehicle, the steering angle detected by the steering-angle detector such that a greater creep torque corresponds to a greater steering angle detected by the steering-angle detector.

According to a second aspect of the present invention, there is provided a driving-force regulating apparatus for an electric vehicle which is driven by an electric motor, comprising a memory which stores data indicative of a relationship between creep torque and at least one parameter indicative of at least one condition of the electric vehicle; torque regulating means for determining, when a running speed of the electric vehicle is around zero, a creep torque corresponding to at least one actual value of the at least one parameter, according to the data stored in the memory, and regulating an output torque of the electric motor to the determined creep torque; torque adjusting means for adjusting the output torque of the electric motor from the determined creep torque to an adjusted creep torque, so that with the adjusted creep torque the electric vehicle is driven at a predetermined running speed around zero; and data updating means for updating the data stored in the memory, based on the adjusted creep torque.

In the driving-force regulating apparatus in accordance with the second aspect of the present invention, the memory stores the data indicative of a relationship between creep torque and one or more parameters indicative of one or more conditions of the electric vehicle such as an angle of inclination of the vehicle, and the torque regulating means determines a creep torque corresponding to one or more actual values of the one or more parameters, according to the data stored in the memory, and regulates the output torque of the electric motor to the determined creep torque. The torque adjusting means adjusts (i.e., increases and/or decreases) the output torque of the electric motor from the determined creep torque to an adjusted creep torque, so that with the adjusted creep torque the vehicle is driven at a predetermined running speed around zero. Thus, the output torque of the electric motor is regulated to an appropriate creep torque, irrespective of the individuality and/or timewise change of the electric vehicle. The data updating means updates the data stored in the memory, based on the adjusted creep torque. According to the updated data in the memory, the torque regulating means determines a creep torque corresponding to one or more new actual values indicative of one or more new vehicle conditions, and regulates the output torque of the motor to the determined creep torque.

Thus, the present driving-force regulating apparatus effectively prevents the electric vehicle from being dragged backward when the running speed of the vehicle is decreased to around zero on, e.g., an upgrade road surface, by regulating the output torque of the electric motor to an appropriate creep torque with the minimized amount of consumption of electric power. This arrangement contributes to increasing the distance which the vehicle can run by consuming a unit amount of electric power. Additionally, since the data stored in the memory is updated based on a creep torque adjusted in a creep torque regulation and the electric motor is regulated according to the updated data in the following creep torque regulation, an appropriate creep torque will be reached in a very short time. Because of this arrangement, the present apparatus effectively prevents the backward dragging of the electric vehicle that occurs before the output torque of the electric motor has been changed to an appropriate creep torque, and additionally prevents the reduction in ride comfort due to the adjustment (i.e., increase and/or decrease) of the output torque of the motor.

According to a third aspect of the present invention, there is provided a driving-force regulating apparatus for an electric vehicle which is driven by an electric motor, comprising a brake switch which detects operation of a brake device of the electric vehicle for braking the vehicle; a braking-force detector which detects a braking force applied to the brake device, when the brake switch detects the operation of the brake device and simultaneously when a running speed of the vehicle is around zero; and torque regulating means for regulating, when the brake switch detects termination of the operation of the brake device, an output torque of the electric motor to a creep torque corresponding to the braking force detected by the braking-force detector, so that the running speed of the electric vehicle is maintained at around zero.

In the driving-force regulating apparatus in accordance with the third aspect of the present invention, the braking-force detector detects a braking force applied to the brake device, when the brake switch detects the operation of the brake device and simultaneously when a running speed of the vehicle is around zero. The torque regulating means regulates, when the brake switch detects termination of the operation of the brake device, the output torque of the electric motor to a creep torque corresponding to the braking force detected by-the braking-force detector, so that the running speed of the electric vehicle is maintained at around zero. For example, when the electric vehicle is started upon operation of the accelerator pedal after having been stopped as a result of operation of the brake pedal on an upgrade road surface, the output torque of the electric motor is regulated to a creep torque whose magnitude corresponds to the braking force applied for stopping the vehicle and whose direction is opposite to a direction corresponding to the direction of backward dragging of the vehicle. Thus, the vehicle is effectively prevented from being dragged forward or backward before the operator depresses the accelerator pedal after having released the brake pedal.

Thus, irrespective of the degree of downgrade or upgrade of the road surface and/or the weight of the vehicle, the present driving-force regulating apparatus quickly regulates the output torque of the electric motor to an appropriate creep torque. Unlike the conventional apparatus wherein the electric motor is regulated to a creep torque corresponding to the distance of movement of the vehicle, the present apparatus effectively prevents the forward or backward dragging of the electric vehicle and the repetitive forward and backward movements of the vehicle. Additionally, since the present apparatus is adapted to effect a creep torque regulation only after the operation of the brake device has been terminated, the consumption amount of electric power is minimized and the running distance of the vehicle with a unit amount of electric power is increased.

According to a fourth aspect of the present invention, there is provided a driving-force regulating apparatus for an electric vehicle which is driven by an electric motor, comprising a steering-angle detector which detects a steering angle of a steering member of the electric vehicle; and torque regulating means for regulating, when the electric vehicle satisfies a predetermined condition, an output torque of the electric motor to a creep torque corresponding to the steering angle detected by the steering-angle detector such that a greater creep torque corresponds to a greater steering angle detected by the steering-angle detector.

In the driving-force regulating apparatus in accordance with the fourth aspect of the present invention, the steering-angle detector detects the steering angle of the steering member (e.g., a steering wheel) of the electric vehicle, and the torque regulating means regulates the output torque of the electric motor to a creep torque corresponding to the steering angle detected by the steering-angle detector, such that a greater creep torque corresponds to a greater steering angle. Even if the electric vehicle is driven with a great steering angle, the output torque of the motor is regulated to a creep torque appropriately corresponding to the great steering angle. Therefore, putting the vehicle into a garage, for example, is easily done simply by depressing and releasing the brake pedal. Additionally, since the output torque of the electric motor is regulated such that the magnitude of creep torque appropriately corresponds to that of steering angle, the electric vehicle is effectively prevented from being driven at a higher than necessary running speed in response to a small steering angle of the steering wheel. Thus, the change of running speed of the electric vehicle is effectively reduced, even if the running resistance of the vehicle is changed as a result of operation of the steering wheel.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 8(a) is a view of a map, MMA, used at Step SC4 of FIG. 6;

FIG. 8(b) is a view of a map, MMB, used at Step SC5 of FIG. 6;

FIG. 8(c) is a view of a map, MMC, used at Step SC6 of FIG. 6;

FIG. 8(d) is a view of a map, MMD, used in the above-indicated modified arrangement of the control program represented by the flow chart of FIG. 4;

FIG. 8(e) is a view of a map, MME, used in the above-indicated modified arrangement of the control program represented by the flow chart of FIG. 4;

DETAILED DESCRIPTION OF THE PREFERRED EMBODIMENTS

Figure 1:
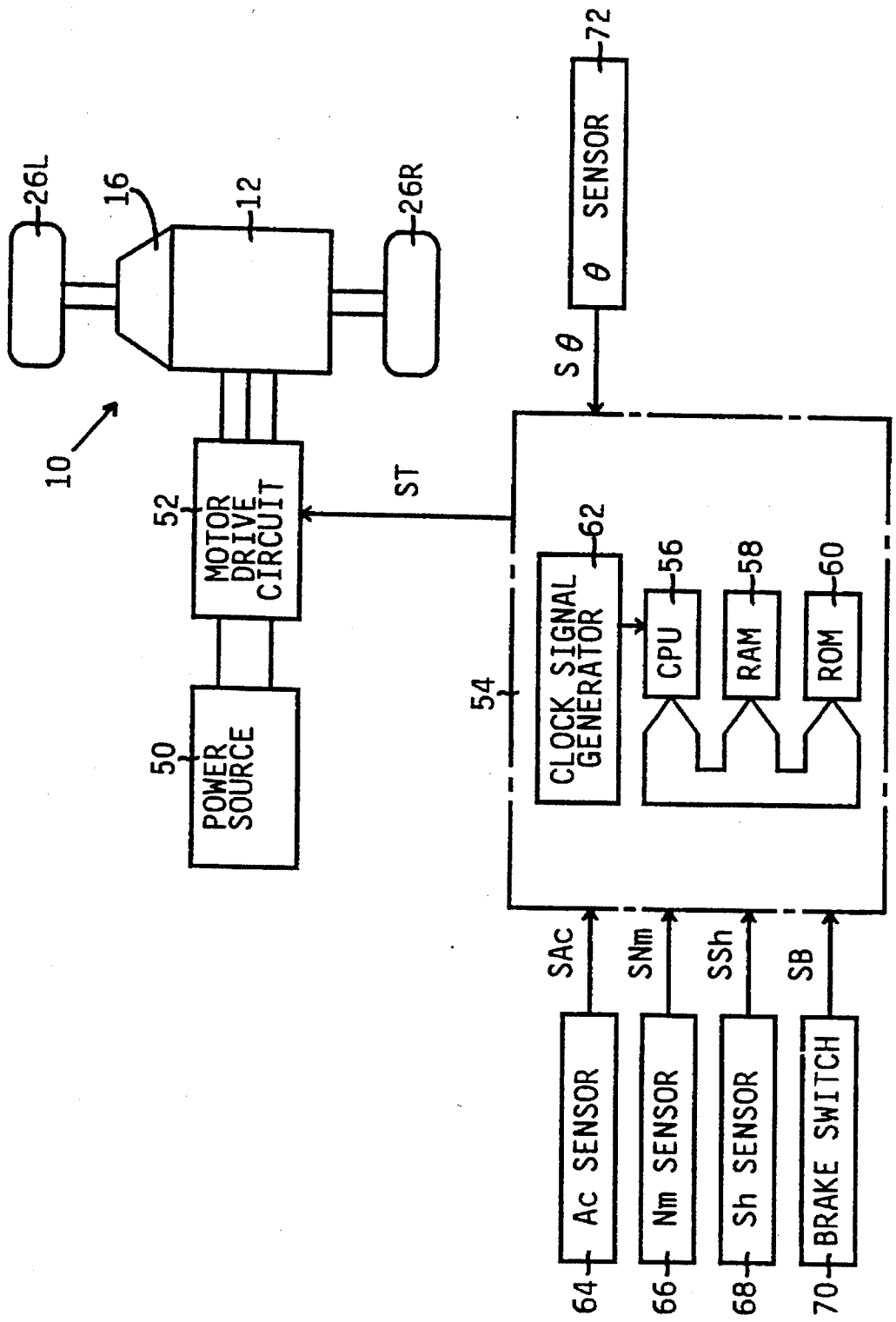
FIG. 1 is a diagrammatic view of a drive system for an electric vehicle to which system the present invention is applied.
Figure 2:
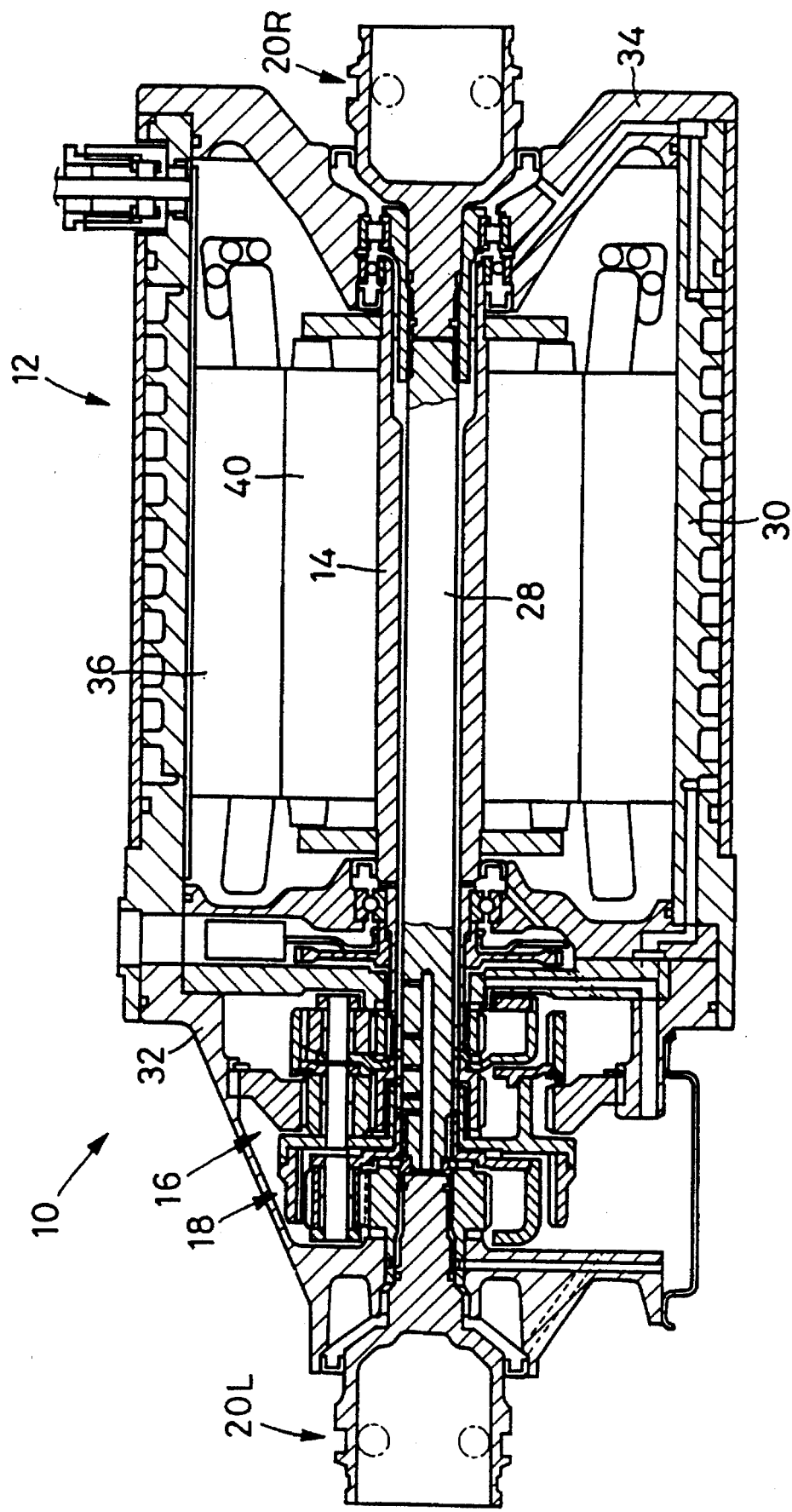
FIG. 2 is a cross-sectional view of a drive unit of the drive system of FIG. 1.
Figure 3:
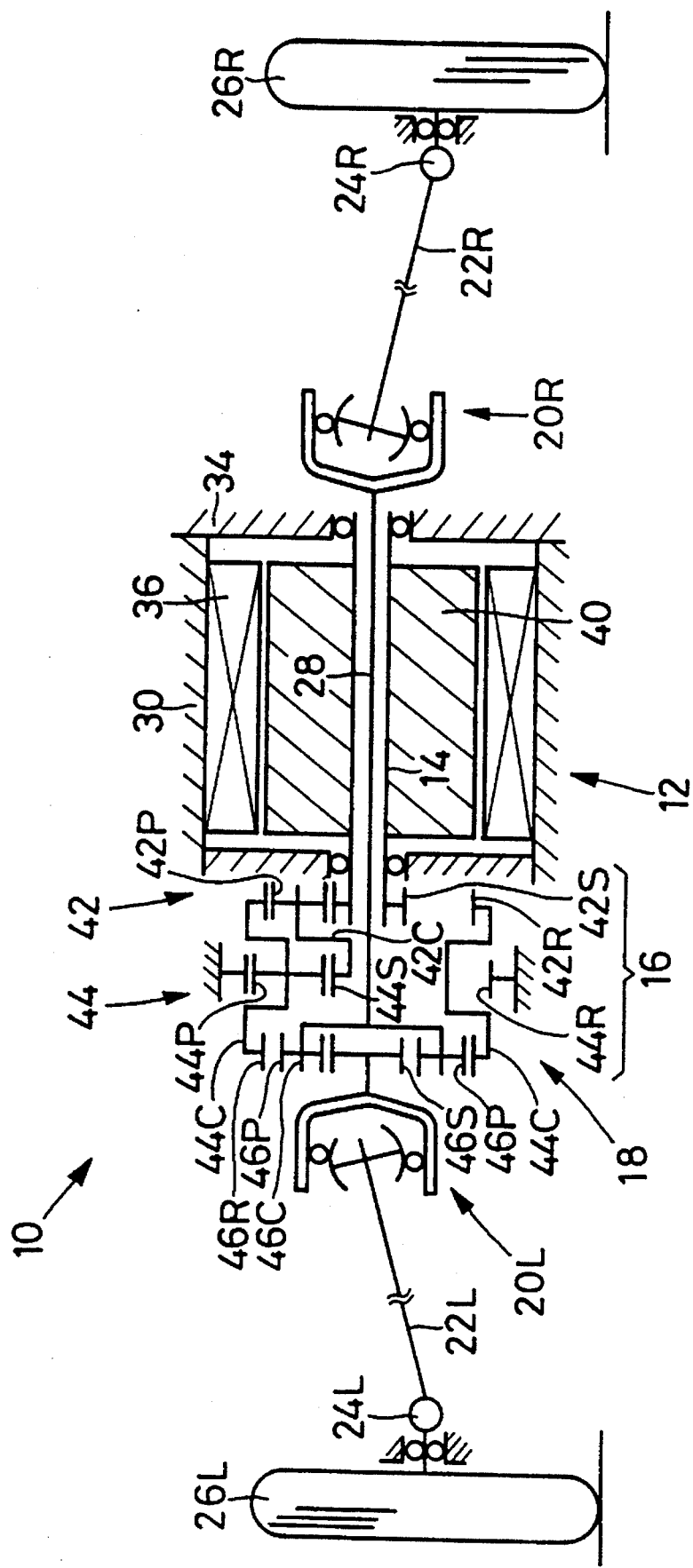
FIG. 3 is a diagrammatic view showing the path of transmission of a driving force in the drive unit of FIG. 2.

Referring first to FIG. 1, there is illustrated a drive system of an electric four-wheel vehicle to which system the present invention is applied. FIGS. 2 and 3 are a cross-sectional and a diagrammatic view of a drive unit 10 of the vehicle, respectively. The drive unit 10 includes an electric motor 12 and a reduction gear device 16. The driving force produced by the electric motor 12, i.e., rotation of a hollow cylindrical output shaft 14 of the motor 12 is transmitted to a differential 18 via the reduction gear device 16, such that the speed of rotation of the output shaft 14 is reduced while the rotation is transmitted through the reduction gear device 16. The differential 18 divides the transmitted force into two forces which are distributed to a left and a right drive line, respectively. One of the divided forces is transmitted via a left first constant speed universal joint 20L, a left axle shaft 22L, and a left second constant speed universal joint 24L, to a left driving wheel 26L supported by a suspension device (not shown). The other divided force is transmitted via an intermediate shaft 28 which extends coaxially with the output shaft 14 of the electric motor 12 through the inner cylindrical space of the output shaft 14, a right first constant speed universal joint 20R, a right axle shaft 22R, and a right second constant speed universal joint 24R, to a right driving wheel 26R supported by the suspension device. The two driving wheels 26L, 26R may be either front or rear wheels of the four-wheel vehicle.

The electric motor 12 is disposed within a housing constituted by a cylindrical central housing 30 and a first and a second side housing 32, 34 respectively fitted to the opposite ends of the central housing 30, such that the output shaft 14 of the motor 12 extends parallel to the crosswise direction of the electric vehicle, i.e., perpendicular to the lengthwise direction of the vehicle in which the vehicle is driven forward and backward by the motor 12. The electric motor 12 includes a stator 36 and a rotor 40. The stator 36 has a coil, and is fixed to the inner circumferential surface of the central housing 30. The rotor 40 is fixed to the output shaft 14 coaxially with the stator 36. The electric motor 12 may be one of various known motors such as a permanent-magnet type AC (alternating current) motor, induction motor, synchronous motor, and DC (direct current) motor.

As shown in FIG. 3, the reduction gear device 16 includes a first and a second planetary gear unit 42, 44. The first gear unit 42 is constituted by a first sun gear 42S fixed to one end of the output shaft 14 of the electric motor 12, a first planetary pinion 42P meshing with the first sun gear 42S, a first carrier 42C rotatably supporting the first planetary pinion 42P, and a first ring gear 42R meshing with the first planetary pinion 42P. The second gear unit 44 is constituted by a second sun gear 44S fixed to the first carrier 42C, a second planetary pinion 44P meshing with the second sun gear, 44S, a stationary second ring gear 44R meshing with the second planetary pinion 44P, and a second carrier 44C rotatably supporting the second planetary pinion 44P and fixed to the first ring gear 42R. The reduction gear device 16 (i.e., first and second gear units 42, 44) defines a prescribed reduction gear ratio and, according to this gear ratio, reduces the speed of the rotation of the output shaft 14 of the electric motor 12 inputted to the first sun gear 42S of the first gear unit 42, so that the reduced rotation or driving force is outputted from the second carrier 44C of the second gear unit 44 to a third ring gear 46R of the differential 18.

The differential 18 is a double-pinion type planetary gear unit constituted by a third sun gear 46S fixed to the right end of the left first constant speed universal joint 20L, the third ring gear 46R fixed to the second carrier 44C of the second gear unit 46, two pairs of third planetary pinions 46P, 46P wherein the two pinions of each pair mesh with each other, one of the two pairs meshes with the third sun gear 46S, and the other pair meshes with the third ring gear 46R, and a third carrier 46C rotatably supporting the two pairs of third planetary pinions 46P, 46P and fixed to the left end of the above-described intermediate shaft 28. The differential 18 divides the force transmitted to the third ring gear 46R into two forces, and distributes one of the divided forces to the left driving wheel 26L via the third sun gear 46S operatively connected to the wheel 26L and the other divided force to the right driving wheel 26R via the third carrier 46C operatively connected to the wheel 26R.

Referring back to FIG. 1, the electric motor 12 is supplied with an electric power from a power source 50 such as a battery via a motor drive circuit 52, so that the motor 12 is rotated selectively in opposite directions. The motor drive circuit 52 includes, e.g., an inverter. According to a command signal, ST, supplied from a motor control computer 54, the drive circuit 52 changes the frequency or current of the electric power fed to the electric motor 12, thereby regulating the output torque of the motor 12. Additionally, the drive circuit 52 serves for regulating the regenerative braking torque of the electric motor 12 produced when the motor 12 is forcibly rotated, thereby charging the power source 50 with the electric power generated by the forced rotation of the motor 12. The motor control computer 54 is constituted by a central processing unit (CPU) 56, a random access memory (RAM) 58, a read only memory (ROM) 60, a clock signal generator 62 such as a crystal oscillator, analog/digital (A/D) converters (not shown), an input interface circuit (not shown), data bus, etc. The CPU 56 processes signals according to the control programs pre-stored in the ROM 60 by utilizing the temporary-storage function of the RAM 58, and generates the above-described command signal ST to the motor drive circuit 52 for regulating the output torque or regenerative braking torque of the electric motor 12.

To the motor control computer 54, are connected a first, a second, a third, and a fourth sensor 64, 66, 68, 72 and a brake switch 70. The first sensor 64 detects the amount, Ac, of operation or depression of an accelerator pedal (not shown) of the vehicle (hereinafter, referred to as the "Ac sensor" 64), and generates to the control computer 54 a signal, SAc, indicative of the detected operation amount Ac of the accelerator pedal. The second sensor 66 detects the speed, Nm, of rotation of the electric motor 12 (hereinafter, referred to as the "Nm sensor" 66), and generates to the control computer 54 a signal, SNm, indicative of the detected rotation speed Nm of the motor 12. The third sensor 68 identifies which shift position, Sh, is currently selected through operation of a shift lever (not shown) of the vehicle from a plurality of selectable shift positions or ranges (hereinafter, referred to as the "Sh sensor" 68), and generates to the control computer 54 a signal, SSh, indicative of the currently selected shift position Sh. The brake switch 70 identifies whether a brake pedal (not shown) of the vehicle is currently operated or depressed (i.e., "ON") and generates to the control computer 54 a signal, SB, indicative of the positive ("ON") or negative ("OFF") result. The fourth sensor 72 detects the current degree of upgrade or downgrade of the road surface on which the vehicle is driven by the motor 12, i.e., current angle, $\theta$, of inclination of the vehicle measured in a vertical plane parallel to the lengthwise direction of the vehicle, with respect to a horizontal plane (hereinafter, referred to as the "R sensor" 72), and generates to the control computer 54 a signal, S$\theta$, indicative of the detected inclination angle $\theta$. The shift lever is disposed in the neighborhood of the driver's seat, and the selectable shift positions or ranges include a drive (D) range selected for driving the vehicle forward, a reverse range (R) for driving the vehicle backward, a parking (P) range for parking the vehicle, and a neutral (N) range for allowing the free rotation of the electric motor 12.

Hereinafter there will be described the operation of the motor control computer 54 for regulating the driving force of the electric motor 12 with the shift lever being operated to the D (drive) range, by reference to the flow charts of FIGS. 4, 5, and 6. The control program represented by those flow charts is repetitively implemented at a prescribed cycle time such as several tens of milliseconds (msec).

Figure 4:
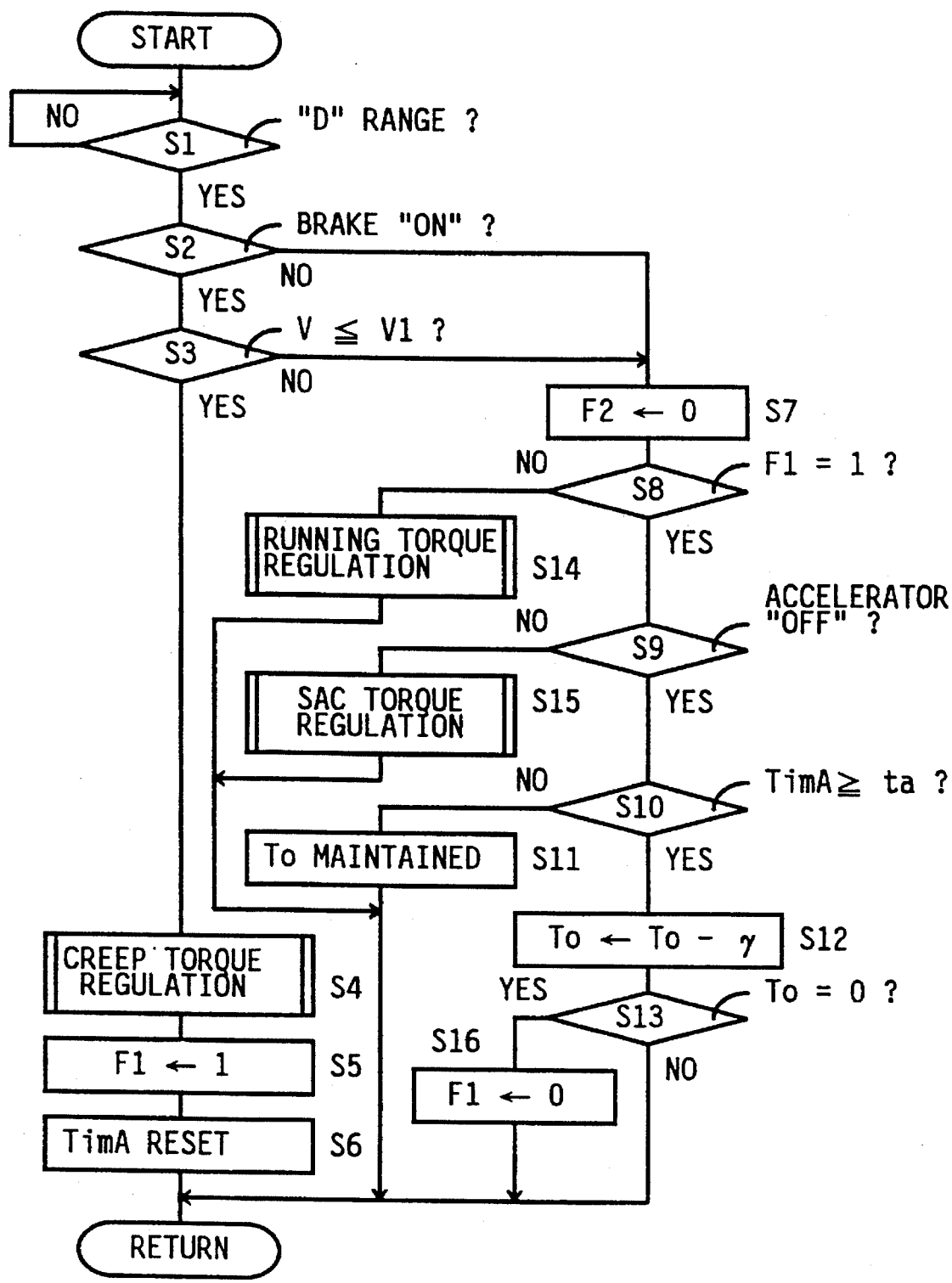
FIG. 4 is a flow chart representing a control program used by the drive system of FIG. 1 for regulating the driving force of the electric vehicle.

First, at Step S1 of FIG. 4, the CPU 56 judges whether the shift lever is currently operated to the D range, based on the shift-position signal SSh supplied from the Sh sensor 68. If a positive judgment ("YES") is made at Step S1, the control of the CPU 56 proceeds with Step S2 to judge whether the brake pedal is currently depressed ("ON") for braking the vehicle, based on the brake signal SB supplied from the brake switch 70. If a positive judgment is made at Step S2, the control proceeds with Step S3 to judge whether the current running speed, V, of the vehicle is not greater than a prescribed reference value, $V_1$, based on the motor-speed signal SNm supplied from the Nm sensor 66. The reference value $V_1$ is pre-selected at, for example, several kilometers per hour. If a positive judgment is made at Step S3, the control of the CPU 56 goes to Step S4 where the CPU 56 effects a creep torque regulation. Meanwhile, if a negative judgment ("NO") is made at Step S1, Step S1 is repeated. If a negative judgment is made at either Step S2 or Step S3, the control goes to Step S7.

Figure 5:
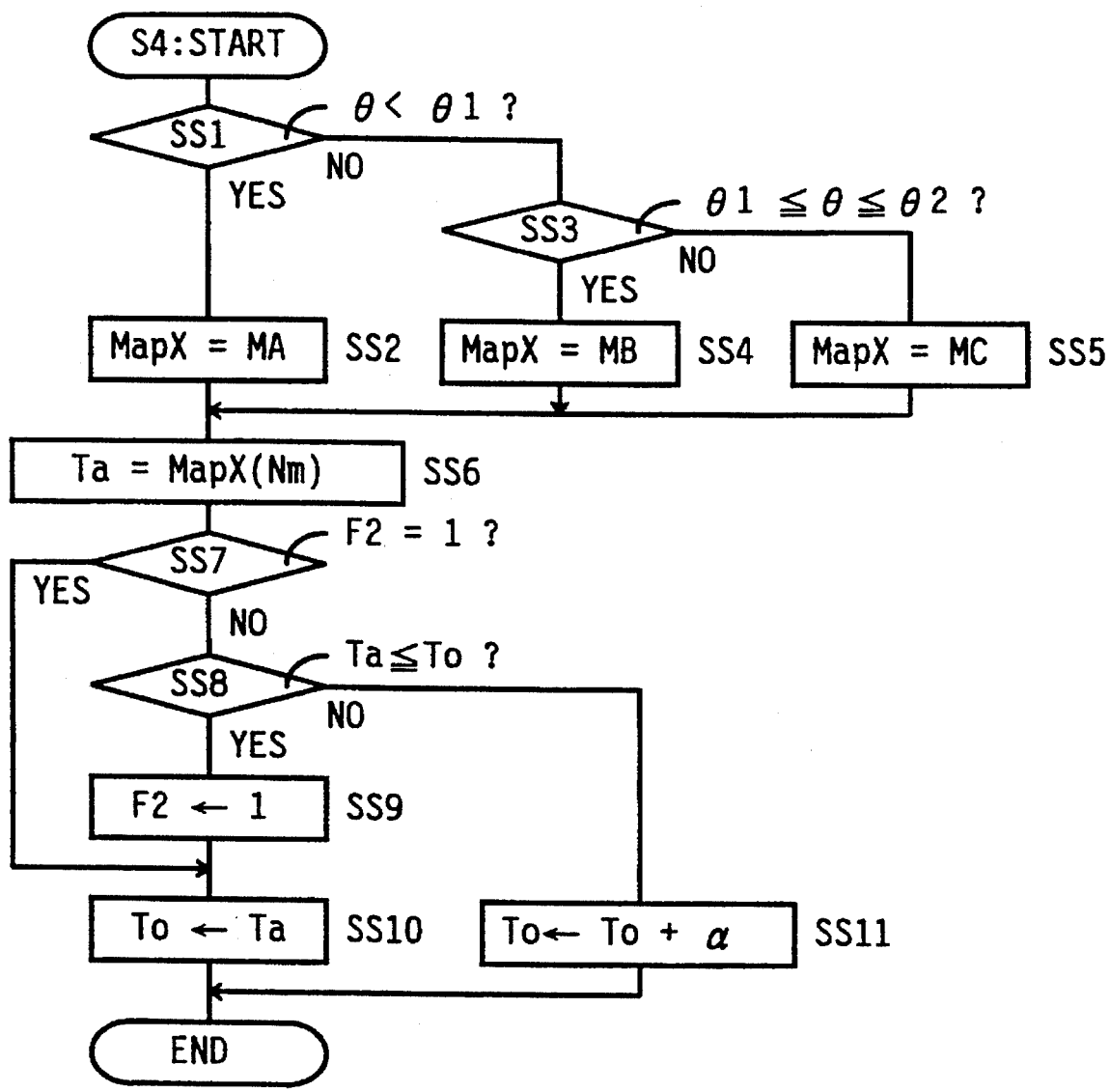
FIG. 5 is a flow chart representing a control program implemented at Step S4 of FIG. 4.
Figure 7A:
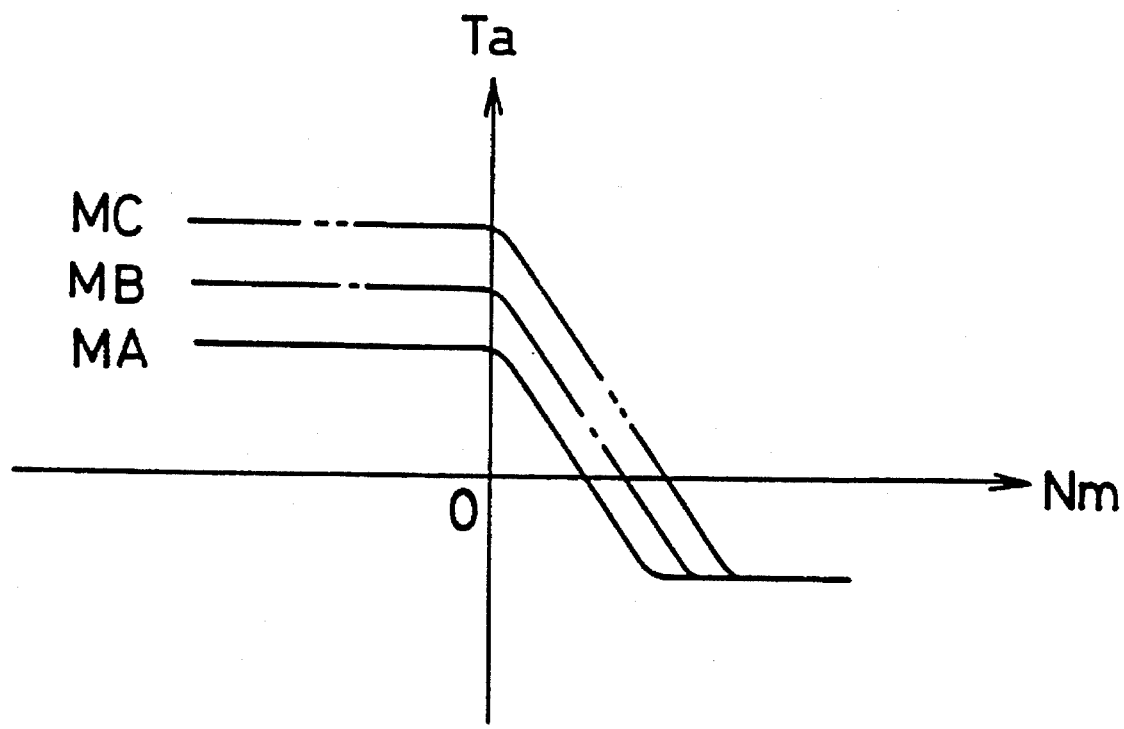
FIG. 7(a) is a view of maps, MA, MB, and MC, used at Steps SS2, SS4, SS5 of FIG. 5, respectively.

The flow chart of FIG. 5 represents an example of the creep torque regulation effected at Step S4 of FIG. 4 for regulating the output torque of the electric motor 12 based on the current degree of upgrade or downgrade of the road surface on which the vehicle is being driven, i.e., current angle $\theta$ of inclination of the vehicle. At Step SS1, the CPU 56 judges whether the current inclination angle $\theta$ is smaller than a prescribed reference value $\theta_1$, based on the inclination-angle signal S$\theta$ supplied from the $\theta$ sensor 72. The reference value $\theta_1$ is pre-selected at a small positive value indicative of a lowly upgrade road surface. If the inclination angle $\theta$ is smaller than the reference value $\theta_1$ (i.e., $\theta<\theta_1$), that means that the road surface is either lowly upgrade, flat, or downgrade. In this case, the control of the CPU 56 goes to Step SS2 to select a first curve or map, MA, as a data map, MapX, used for the current creep torque regulation. The first map MA is shown in FIG. 7(a). On the other hand, if a negative judgment is made at Step SS1, the control goes to Step SS3 to judge whether the current inclination angle $\theta$ is not smaller than the reference value $\theta_1$ and simultaneously is not greater than a prescribed reference value, $\theta_2$, greater than the value $\theta_1$. In the case of $\theta_1 \leq \theta \leq \theta_2$, that is, where the road surface is intermediately upgrade, the control of the CPU 56 goes to Step SS4 to select a second map, MB, as the data map MapX. If a negative judgment (i.e., $\theta_2<\theta$) is made at Step SS3, that is, if the road surface is highly upgrade, the control goes to Step SS5 to select a third map, MC, as the data map MapX. The second and third maps MB, MC are shown together with the first map MA in FIG. 7(a) for better understanding purposes only. Each of the first to third maps MA, MB, MC represents a relationship between motor output torque (Ta) and motor rotation speed (Nm) which relationship is used for determining a final-target output torque, Ta, of the electric motor 12 by using as a parameter the current rotation speed Nm of the motor 12. The CPU 56 controls the electric motor 12 according to the thus determined final-target output torque Ta. As shown in FIG. 7(a), the second map or curve MB is substantially entirely greater than the first curve MA with respect to the motor output torque Ta, and the third curve MC is substantially entirely greater than the second curve MB. Therefore, for a same rotation speed Nm of the electric motor, the second curve MB defines a greater output torque Ta than the first curve MA and the third curve MC defines a greater output torque Ta than the second curve MB. Thus, the electric motor 12 is controlled to produce such a creep torque which effectively prevents the electric vehicle from being dragged backward due to its weight on an intermediate or highly upgrade road surface. The data indicative of the first to third maps MA, MB, MC are pre-stored in the ROM 60.

Following each of Steps SS2, SS4, and SS5, the control of the CPU 56 goes to Step SS6 to calculate the final-target output torque Ta based on the current motor rotation speed Nm according to the data map MapX, i.e., one of the first to third maps MA, MB, MC selected at Step SS2, SS4, or SS5. Step SS6 is followed by Step SS7 to judge whether a flag, F2, is set at F2=1. In an early control cycle according to the program represented by the flow chart of FIG. 4, the flag F2 is set to F2=0 at Step S7. Assuming therefore that a negative judgment is made at Step SS7, the control of the CPU 56 goes to Step SS8 to judge whether a target output torque, To, is not smaller than the final-target output torque Ta determined at Step SS6. The target torque To is substantially equal to the current, actual output torque of the electric motor 12. In the first or initial control cycle according to Step S4 of FIG. 4, i.e., program represented by the flow chart of FIG. 5, the accelerator pedal has not been operated yet and therefore the target torque To is zero. Thus, a negative judgment is made at Step SS8, and the control of the CPU 56 goes to Step SS11 to update the target torque To by adding thereto a prescribed small value, $\alpha$. The CPU 56 generates the command signal ST indicative of the thus updated target torque To to the motor drive circuit 52, for regulating the output torque of the electric motor 12 to the target torque To. As Step SS11 is repeated in successive control cycles of Step S4, the target torque To, i.e., actual output torque of the electric motor 12 is increased by the increments α. This arrangement effectively prevents the vehicle from suffering a shock because of an abrupt and large change of the output torque of the electric motor 12 at the time of, e.g., change of the map MapX used. Meanwhile, when the target torque To has exceeded the final-target torque Ta and therefore when a positive judgment is made at Step SS8, the control of the CPU 56 goes to Step SS9 to set the flag F2 to F2=1. Step SS9 is followed by Step SS10 to update the target torque To by replacing the value To with the final-target torque Ta, and generate the command signal ST indicative of the updated target torque To to the motor drive circuit 52, for regulating the output torque of the electric motor 12 to the target torque To, i.e., final-target torque Ta. Thus, the electric motor 12 is controlled to produce such a creep torque which appropriately corresponds to the current degree of upgrade of the road surface on which the vehicle is being driven, thereby effectively preventing the backward dragging of the vehicle on the upgrade road surface due to its weight no matter how high upgrade the road surface may have, and additionally effectively preventing wasteful consumption of the electric power due to the production of unnecessarily great creep torque.

Back to the program of FIG. 4, after the creep torque regulation has been effected at Step S4 as described above, Step S4 is followed by Step S5 to set a flag, F1, to F1=1 and subsequently by Step S6 to reset a timer, TimA, to zero.

If a negative judgment is made at either Step S2 or Step S3, the control of the CPU 56 goes to Step S7, as described above. At Step S7, the CPU 56 sets the flag F2 to F2=0. Step S7 is followed by Step S8 to judge whether the flag F1 is set at F1=1. Since the flag F1 is set to F1=1 at Step S5 after a creep torque regulation has been effected at Step S4, a positive judgment is made at Step S8 in a control cycle immediately after the creep torque regulation has been effected at Step S4. On the other hand, if a negative judgment is made at Step S8, the control goes to Step S14 to effect a running torque regulation. In the running torque regulation, the CPU 56 determines a final-target output torque, Tb, of the electric motor 12 based on the current operation amount Ac of the accelerator pedal and the current rotation speed Nm of the motor 12 according to a first map, MMA, shown in FIG. 8(a), and generates to the motor drive circuit 52 the command signal ST indicative of the thus determined final-target torque Tb as the target torque To. Meanwhile, when the vehicle satisfies a prescribed condition, the CPU 56 generates to the drive circuit 52 the command signal ST indicative of a regulated regenerative braking torque, so that the electric motor 12 produces the regulated braking torque, like the engine brake of an internal-combustion engine for an automotive vehicle, and so that the power source 50 is charged with the electric energy corresponding to the braking torque produced by the electric motor 12.

Steps S9 to S13, S15, and S16 are implemented at the transition from a creep torque regulation at Step S4 to a running torque regulation at Step S14. At Step S9, the CPU 56 identifies whether the accelerator pedal is not operated, i.e., is released ("OFF"), based on the signal SAc supplied from the Ac sensor 64. A positive judgment is made, for example, when the current operation amount Ac is smaller than about several percent of the full operation amount of the accelerator pedal. In this case, the control goes to Step S10 to judge whether the time measured or counted by the timer TimA has exceeded a prescribed reference value, ta. As long as a negative judgment is made at Step S10, that is, till the reference time ta is counted up, the CPU 56 continues, at Step S11, to maintain the target torque To used in the last creep torque regulation at Step S4. Since at Step S6 the timer TimA is reset to zero each time a creep torque regulation is effected at Step S4, the timer TimA counts the time which has passed after the last creep torque regulation has been effected. The reference value ta is pre-selected at a time sufficiently longer than a time duration necessary for the driver or operator to release the brake pedal and subsequently depress the accelerator pedal. Thus, during a time duration in which the operator releases the brake pedal and depresses the accelerator pedal, the electric motor 12 produces a creep torque comparable to a creep torque used in a proper creep torque regulation at Step S4, thereby preventing the backward dragging of the vehicle.

In the case where the reference time ta is counted up without operation of the acceleration pedal, the control of the CPU 56 proceeds with Step S12 to update the target torque To by subtracting a prescribed value, γ, therefrom. Consequently the output torque of the electric motor 12 is decreased to the target torque To by the decrement γ. Step S12 is followed by Step S13 to judge whether the target torque To is equal to zero. If a positive judgment is made at Step S13 because Step S12 is repeated, the control of the CPU 56 goes to Step S16 to set the flag F1 to F1=0. Therefore, in the next control cycle, the CPU 56 implements Step S14 following Step S8.

If a negative judgment is made at Step S9, that is, if the accelerator pedal is operated, the control of the CPU 56 goes to Step S15 to effect a start-after-creep torque regulation (hereinafter, referred to as the "SAC" torque regulation) according to the program represented by the flow chart of FIG. 6. At Step SC1, the CPU 56 judges whether the current operation amount Ac of the accelerator pedal is not smaller than a prescribed reference value, $Ac_1$, thereby identifying whether the current operation amount Ac is greater than an average operation amount for starting the vehicle on, e.g., a flat road surface. The reference value $Ac_1$ is pre-selected at about 50% for example. If a positive judgment is made at Step SC1, the control goes to Step SC2 to judge whether the current running speed V of the vehicle is not greater than a prescribed reference value, $V_2$, thereby identifying whether the current running speed V has not been increased to a value within an intermediate speed range. The reference value $V_2$ is pre-selected at, e.g., about 20 to 30 km/h. If a negative judgment is made at either Step SC1 or SC2, the control of the CPU 56 goes to Step SC4 to select the first map MMA shown in FIG. 8(a), as a data map, MapY, used for the current SAC torque regulation. On the other hand, in the case where a positive judgment is made at each of Steps SC1 and SC2, that is, in the case of $Ac_1 \leq Ac$ and simultaneously $V \leq V_2$, the control goes to Step SC3 to identify which map out of the three maps MA, MB, MC had been selected as the data map MapX for the last creep torque regulation at Step S4. The data indicative of one of the three maps MA, MB, MC selected at Step S4 is stored in the RAM 58. In the case of MapX=MA, the control goes to Step SC4 to select the first map MMA as the data map MapY; in the case of MapX=MB, the control goes to Step SC5 to select a second map, MMB, as the data map MapY; and in the case of MapX=MC, the control goes to Step SC6 to select a third map, MMC, as the data map MapY. The second and third maps MMB, MMC are shown in FIGS. 8(b) and 8(c), respectively. Each of the three maps MMA, MMB, MMC is utilized for determining a final-target output torque, Tb, by using as parameters the current operation amount Ac of the accelerator pedal and the current rotation speed Nm of the electric motor 12. The data representative of the maps MMA, MMB, MMC are pre-stored in the ROM 60. For a same depression amount Ac of the accelerator pedal and a same rotation speed Nm of the electric motor, the second map MMB defines a greater output torque Tb than the first map MMA, and the third map MMC defines a greater output torque Tb than the second map MMB.

In the case where the first map MMA is selected at Step SC4, the control of the CPU 56 goes to Step SC7 to set a flag, F3, to F3=0. Step SC7 is followed by Step SC9 to calculate the final-target torque Tb according to the first map MMA based on the current operation amount Ac of the accelerator pedal and the current rotation speed Nm of the electric motor 12. On the other hand, in the case where the second or third map MMB, MMC is selected at Step SC5 or SC6, the control of the CPU 56 goes to Step SC8 to set the flag F3 to F3=1. Step SC8 is followed by Step SC9 to calculate the final-target torque Tb according to the second or third map MMB, MMC based on the current operation amount Ac and the current rotation speed Nm. Step SC9 is followed by Step SC10 to judge whether the final-target torque Tb determined at Step SC9 is smaller than a value obtained by subtracting a prescribed small value, $\beta_1$, from the target output torque To. In the case of Tb<(To−$\beta_1$), the control goes to Step SC11 to update the target torque To by subtracting the constant value $\beta_1$ from the target torque To, and generate the command signal ST indicative of the thus updated target torque To. Consequently the output torque of the electric motor 12 is reduced by the decrement $\beta_1$. The decrement $\beta_1$ is pre-selected at such a value which appropriately changes the output torque of the electric motor 12 without causing a shock to the vehicle. Therefore, even if any one of the maps MMA, MMB, MMC is selected at Step SC4, SC5, or SC6, the output torque of the electric motor 12 is gradually or smoothly reduced to the final-target torque Tb.

In the case where a negative judgment is made at Step SC10, i.e., in the case of Tb≧(To−$\beta_1$), the CPU 56 goes to Step SC12 to judge whether the final-target torque Tb is greater than a value obtained by adding a prescribed small value, $\beta_2$, to the target output torque To. In the case of Tb>(To+$\beta_2$), the control goes to Step SC13 to update the target torque To by adding the small value $\beta_2$ to the target torque To, and generate the command signal ST indicative of the thus updated target torque To. Thus, the output torque of the electric motor 12 is increased by the increment $\beta_2$. The increment $\beta_2$ is pre-selected at such a value which appropriately changes the output torque of the electric motor 12 without causing a shock to the vehicle. Therefore, even if any one of the maps MMA, MMB, MMC is selected at Step SC4, SC5, or SC6, the output torque of the electric motor 12 is gradually or smoothly increased to the final-target torque Tb. The value $\beta_2$ may be equal to the value $\beta_1$. On the other hand, in the case where a negative judgment is made at Step SC12, i.e., in the case of (To−$\beta_1$)≦Tb≦(To+$\beta_2$), the control goes to Step SC14 to update the target torque To by replacing the value To with the final-target torque Tb, and generate the command signal ST indicative of the updated target torque To. Thus, the output torque of the electric motor 12 is regulated to the target torque To, i.e., final-target torque Tb.

Thus, in the SAC torque regulation at Step S15, the output torque of the electric motor 12 is regulated according to the data map MapY, i.e., one of the three maps MMA, MMB, or MMC selected at Step SC4, SC5, or SC6. The three maps MMA, MMB, MMC respectively correspond to the three maps MA, MB, MC used as the data map MapX for the creep torque regulation at Step S4. For example, when the vehicle is driven on a highly upgrade road surface, the output torque of the electric motor 12 is regulated, according to the third map MMC, to a greater final-target torque Tb than that according to the first or second map MMA, MMB, based on a same depression amount Ac of the accelerator pedal and a same rotation speed Nm of the electric motor 12. Accordingly, when the vehicle is started on the highly upgrade road surface, the electric motor 12 is regulated to a comparatively great output torque in response to a comparatively small depression amount Ac. Consequently the vehicle is smoothly started without needing to continuously fully depress the accelerator pedal. However, Steps SC10 through SC13 may be omitted, so that the control of the CPU 56 proceeds with Step SC14 following Step SC9.

In the case where the final-target torque Tb is used as the current target torque To at Step SC14, the control of the CPU 56 goes to Step SC15 to judge the time counted by the timer TimA has exceeded the reference value ta. If a positive judgment (i.e., TimA≧ta) is made at Step SC15, the control goes to Step SC16 to judge whether the flag F3 is set at F3=0, i.e., whether the first map MMA which is commonly used in the running torque regulation at Step S14, has been selected at Step SC4. In the case where a positive judgment is made at Step SC15, i.e., in the case of F3=0, the control of the CPU 56 goes to Step SC17 to set the flag F1 to F1=0, so that in the next control cycle according to the program of FIG. 4, the control of the CPU 56 goes to Step S14 following Step S8. On the other hand, in the case where a negative judgment is made at Step SC16, i.e., in the case of F3=1, the control of the CPU 56 may go to Step S15 following Step S8 via Step S9. The reason for the provision of Step SC15 is to prevent the current SAC torque regulation from being followed by a running torque regulation at Step S14 in the case where a negative judgement is made at Step SC1 just because the current operation amount Ac of the accelerator pedal is detected as being smaller than the reference value $Ac_1$ only during a "temporary" period before the operation amount Ac exceeds the reference value $Ac_1$. In such a case, the operation amount Ac will soon exceed the reference value $Ac_1$ after the "temporary" period. The reference time ta used at Step SC15 may be different from the reference time ta used at Step S10.

It emerges from the foregoing description that in the start-after-creep (SAC) torque regulation at Step S15, the output torque of the electric motor 12 is regulated according to the data map MapY, i.e., one of the three maps MMA, MMB, MMC which appropriately corresponds to one of the three maps MA, MB, MC selected for the creep torque regulation at Step S4. Therefore, when the vehicle is being driven on a highly upgrade road surface, the output torque of the electric motor 12 is regulated according to the third map MMC. Thus, the electric motor 12 produces a great output torque in response to a small operation amount Ac of the accelerator pedal. Consequently the vehicle is smoothly started without needing to continuously fully depress the accelerator pedal. Thus, the operability of the electric vehicle is improved.

In the present embodiment, Step S14 and a portion of the motor control computer 54 for implementing Step S14 cooperate with each other to function as the first regulating means for the running torque regulation; Step S4, i.e., program represented by the flow chart of FIG. 5 and a portion of the computer 54 for implementing Step S4 cooperate with each other to function as the second regulating means for the creep torque regulation; and Step S15, i.e., program represented by the flow chart of FIG. 6 and a portion of the computer 54 for implementing Step S15 cooperate with each other to function as the third regulating means for the after-creep torque regulation. When a positive judgment is made at each of Steps S2 and S3, the second regulating means judges that the vehicle has satisfied a prescribed condition for the creep torque regulation at Step S4.

Figure 6:
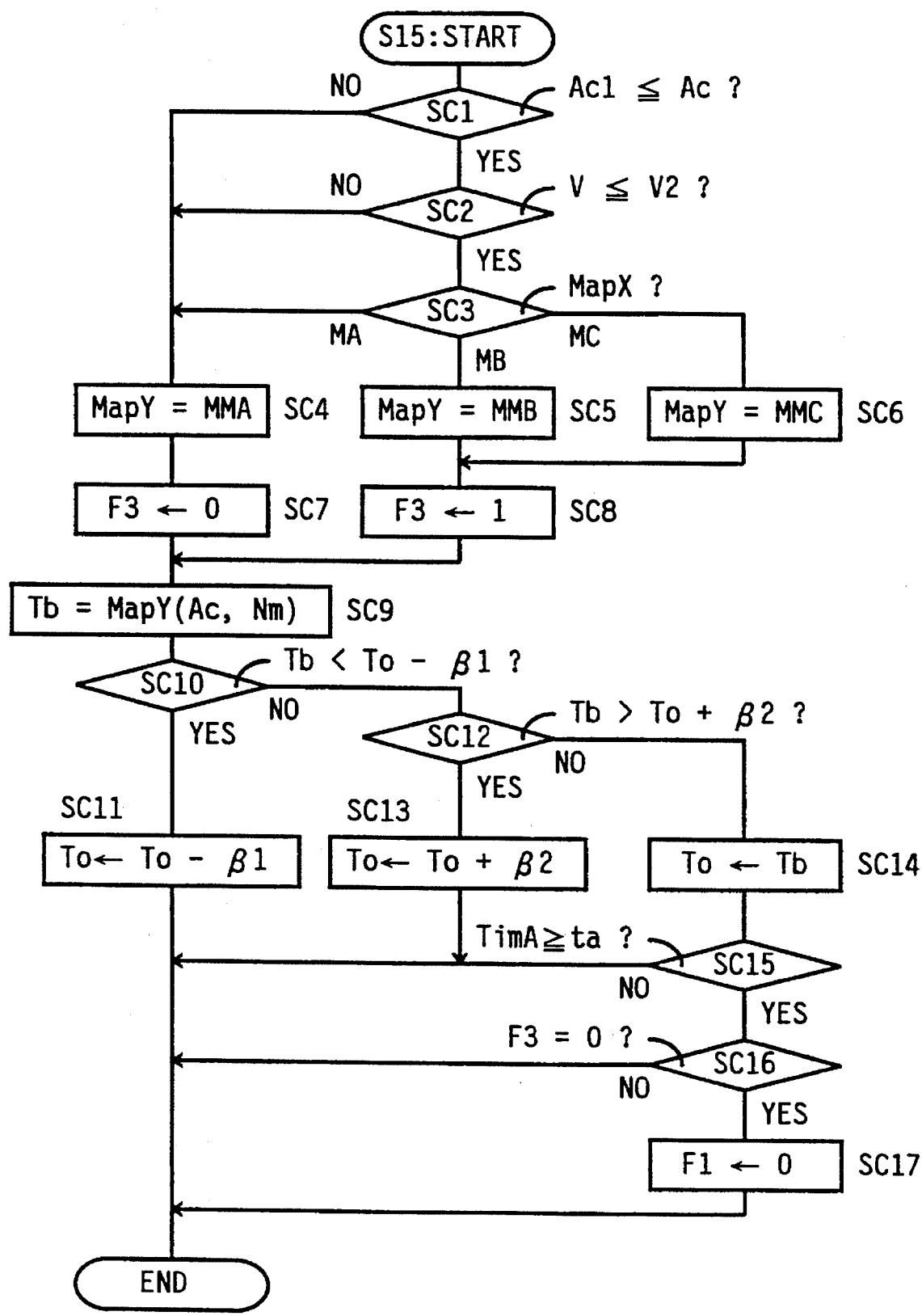
FIG. 6 is a flow chart representing a control program implemented at Step S15 of FIG. 4.
Figure 7B:
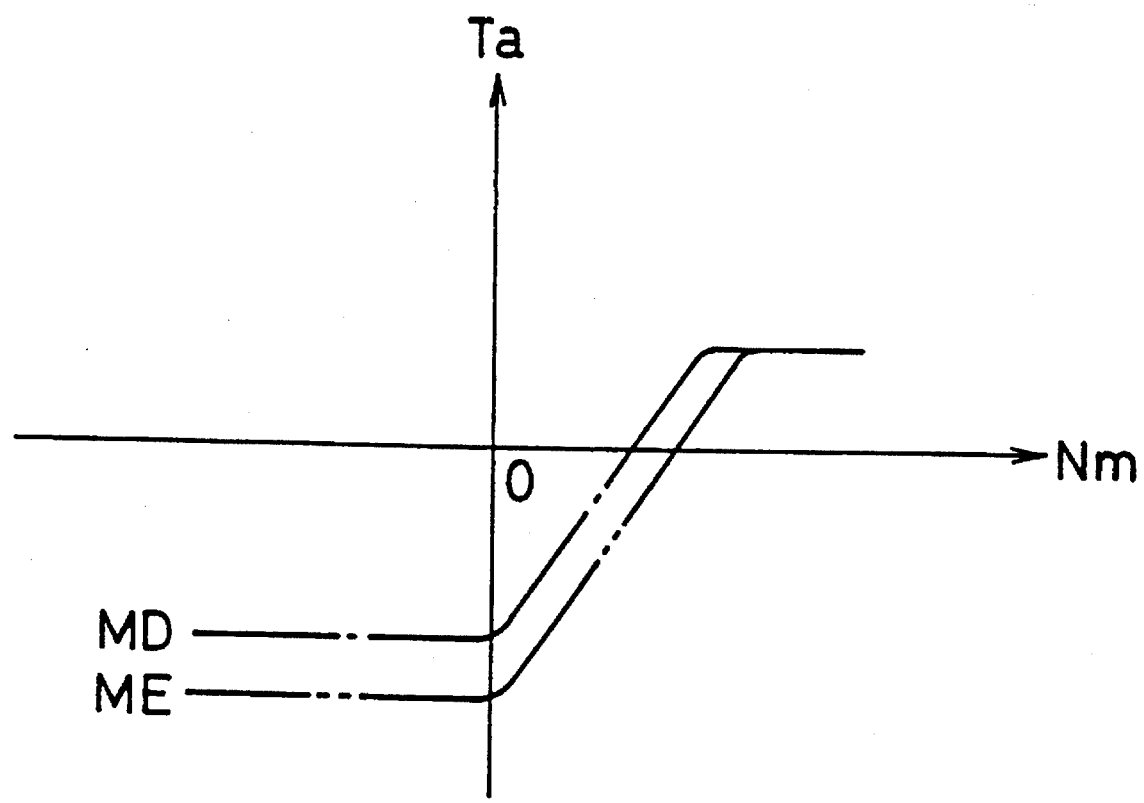
FIG. 7(b) is a view of maps, MD and ME, used in a modified arrangement of the control program represented by the flow chart of FIG. 4.

In a modified arrangement of the control program represented by the flow chart of FIG. 4, Steps S4 and S15, i.e., flow charts of FIGS. 5 and 6 are modified as follows: If a positive judgment is made at Step SS1 of FIG. 5, the control of the CPU 56 goes to an additional step to judge whether the current inclination angle θ is greater than a prescribed reference value, $-\theta_1$ ($\theta_1>0$), based on the inclination-angle signal Sθ supplied from the θ sensor 72. The reference value $-\theta_1$ is indicative of a lowly downgrade road surface. If the inclination angle θ is greater than the reference value $-\theta_1$ (i.e., $\theta>-\theta_1$), that means that the road surface is either lowly upgrade, flat, or lowly downgrade. In this case, the control of the CPU 56 goes to Step SS2 to select the first map MA as the data map MapX used for the current creep torque regulation. On the other hand, if a negative judgment is made at this first additional step, the control goes to a second additional step to judge whether the current inclination angle θ is not greater than the reference value $-\theta_1$ and simultaneously is not smaller than a prescribed reference value, $-\theta_2$ ($\theta_2$ is positive and greater than the value $\theta_1$). In the case of $\theta_2 \leq \theta \leq -\theta_1$, that is, where the road surface is intermediately downgrade, the control of the CPU 56 goes to a third additional step to select, as the data map MapX, a fourth map, MD, as shown in FIG. 7(b). If a negative judgment (i.e., $-\theta_2>\theta$) is made at the second additional step, that is, if the road surface is highly downgrade, the control goes to a fourth additional step to select, as the data map MapX, a fifth map, ME, as shown in FIG. 7(b). As shown in FIG. 7(b), the fifth curve ME is substantially entirely smaller than the fourth curve MD with respect to the motor output torque Ta. Therefore, for a same rotation speed Nm of the electric motor, the fifth curve ME defines a smaller output torque Ta (Ta<0) than the fourth curve MD. Thus, the electric motor 12 is controlled to produce such a creep torque which effectively prevents the electric vehicle from being dragged forward due to its weight on a highly downgrade road surface. The data indicative of the maps MD, ME are pre-stored in the ROM 60. In this modified case, following each of Steps SS2, SS4, SS5, and the additional third and fourth steps, the control of the CPU 56 goes to Step SS6 to calculate the final-target output torque Ta based on the current motor rotation speed Nm according to the data map MapX, i.e., one of the first to fifth maps MA, MB, MC, MD, ME. Additionally, if a negative judgment is made at Step SS7, the control of the CPU 56 goes to a fifth additional step to judge whether the final-target output torque Ta is not smaller than zero. If a positive judgment is made at this fifth additional step, the control goes to Step SS8. On the other hand, if a negative judgment is made at this step, the control goes to a sixth additional step to judge whether the target output torque To is not greater than the final-target output torque Ta determined at Step SS6. If a negative judgment is made at this sixth additional step, the control of the CPU 56 goes to a seventh additional step to update the target torque To by subtracting the previously-described prescribed small value α (α>0). As the seventh additional step is repeated in successive control cycles of Step S4, the target torque To, i.e., actual output torque of the electric motor 12 is decreased by the decrements α. Thus, the electric motor 12 is controlled to produce such a creep torque which appropriately corresponds to the current degree of downgrade of the road surface on which the vehicle is being driven, thereby effectively preventing the forward dragging of the vehicle on the downgrade road surface due to its weight no matter how high downgrade the road surface may have, and additionally effectively preventing wasteful consumption of the electric power due to the production of unnecessarily great creep torque. Furthermore, in the flow chart of FIG. 6, Step SC1 is omitted. Therefore, if a negative judgment is made at Step SC2, the control of the CPU 56 goes to Step SC4 to select the first map MMA shown in FIG. 8(a), as the data map MapY used for the current SAC torque regulation. On the other hand, if a positive judgment is made at Step SC2, that is, in the case of $V \leq V_2$, the control goes to Step SC3 to identify which map out of the five maps MA, MB, MC, MD, ME had been selected as the data map MapX for the last creep torque regulation at Step S4. The data indicative of one of the five maps MA, MB, MC, MD, ME selected at Step S4 is stored in the RAM 58. In the case of MapX=MD, the control goes to an additional step to Select a fourth map, MMD, as the data map MapY; and in the case of MapX=ME, the control goes to another additional step to select a fifth map, MME, as the data map MapY. The second and third maps MMB, MMC are shown in FIGS. 8(d) and 8(e), respectively. The data representative of the maps MMD, MME are pre-stored in the ROM 60. For a same depression amount Ac of the accelerator pedal and a same rotation speed Nm of the electric motor, the fourth map MMD defines a smaller output torque Tb than the first map MMA, and the fifth map MME defines a smaller output torque Tb than the fourth map MMD. In this modified arrangement, the start-after-creep (SAC) torque regulation at Step S15 is carried out such that the output torque of the electric motor 12 is regulated according to the data map MapY, i.e., one of the five maps MMA, MMB, MMC, MD, ME which appropriately corresponds to one of the five maps MA, MB, MC, MD, ME selected for the creep torque regulation at Step S4. Therefore, when the vehicle is being driven on a highly downgrade road surface, the output torque of the electric motor 12 is regulated according to the fifth map MMC. Thus, the electric motor 12 produces a small output torque in response to a normal operation amount Ac of the accelerator pedal. Consequently the vehicle is smoothly started with the normal operation of the accelerator pedal. Thus, the operability of the electric vehicle is improved.

There will be described the second embodiment of the present invention by reference to the flow charts of FIGS. 9, 10, and 11. The second embodiment relates to a drive system of an electric vehicle which system has the same hard-ware construction as that of the first embodiment shown in FIGS. 1, 2, and 3. Therefore, the same reference numerals as used for the first embodiment are used for reference to the corresponding parts or elements of the second embodiment.

Figure 9:
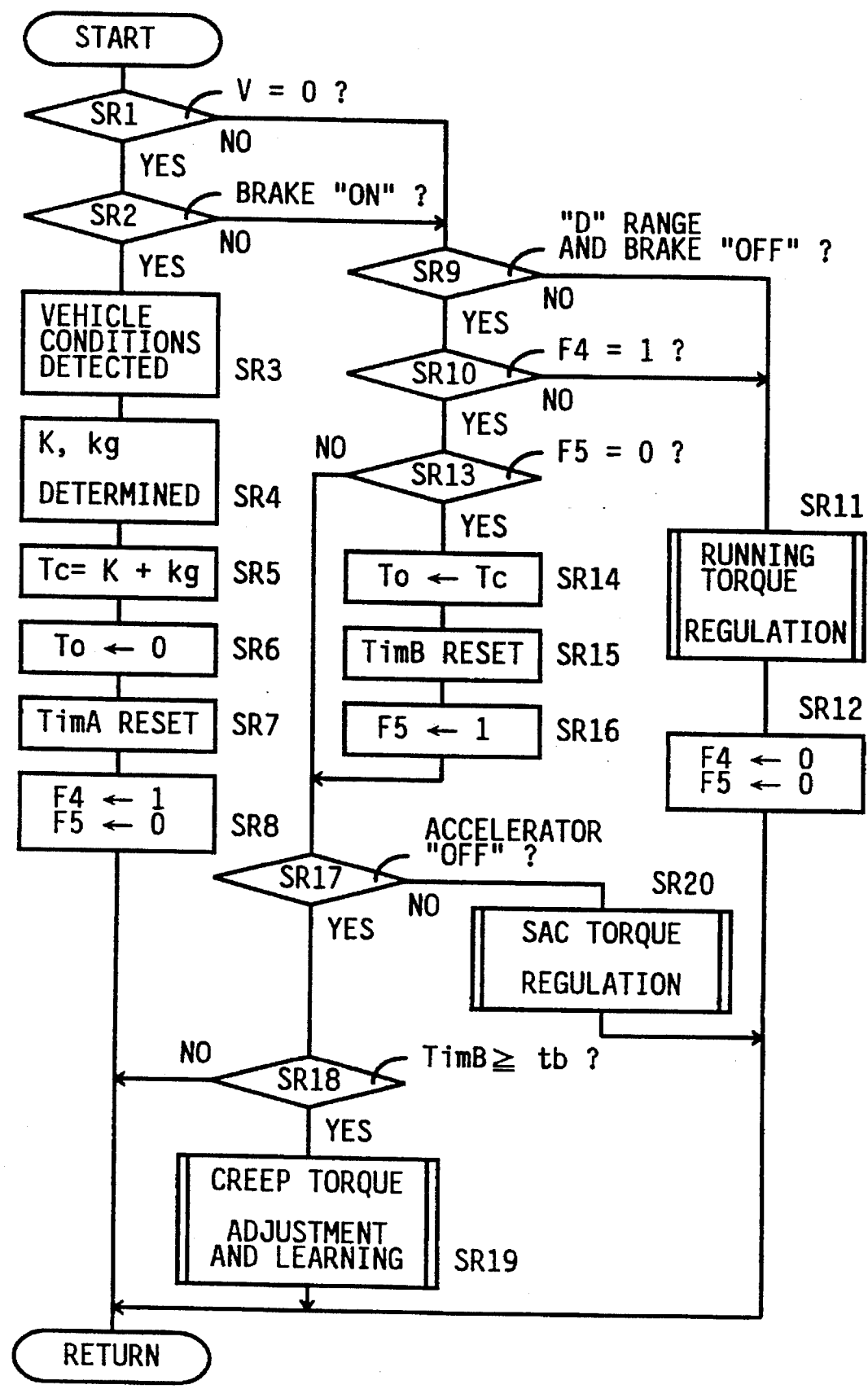
FIG. 9 is a flow chart representing a control program used by a different drive system as the second embodiment of the present invention, for regulating the driving force of an electric vehicle.
Figure 10:
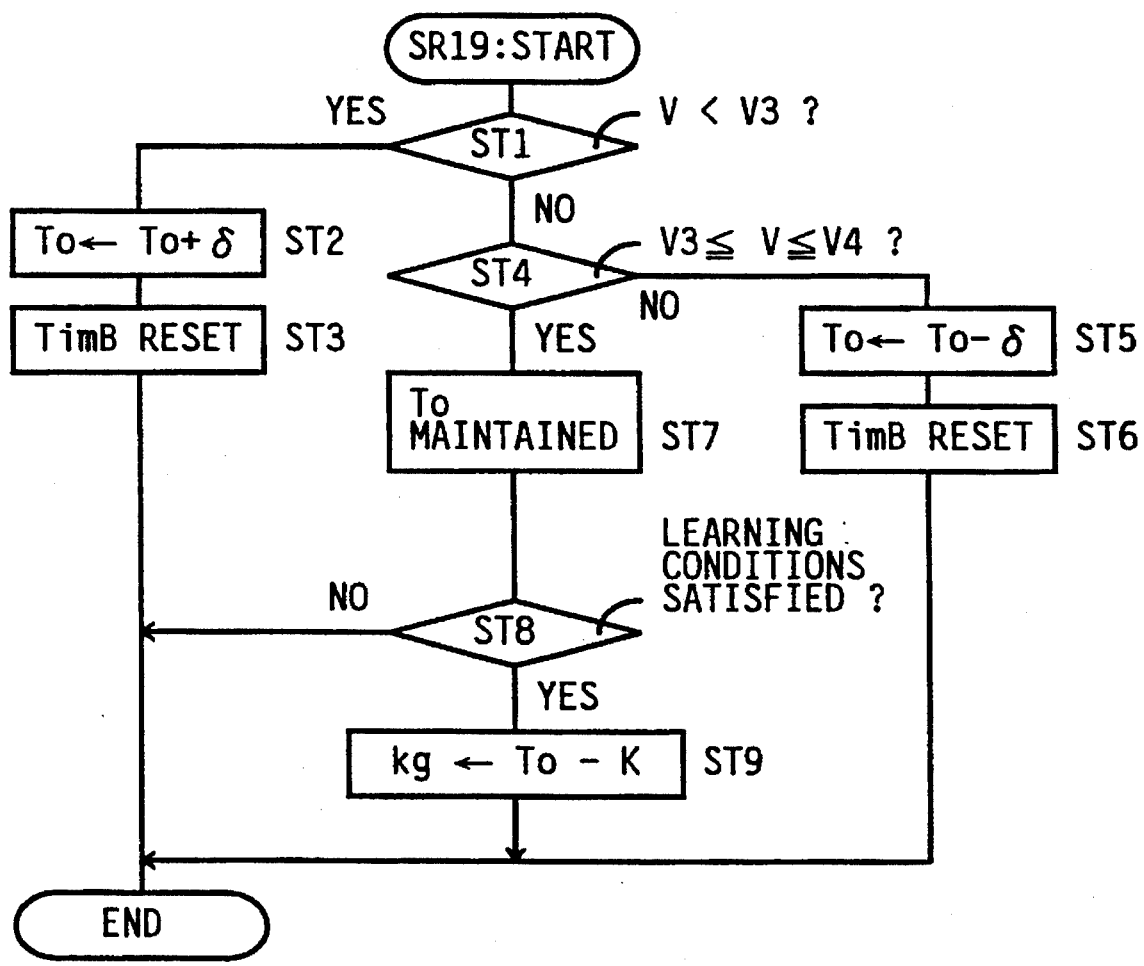
FIG. 10 is a flow chart representing a control program implemented at Step SR19 of FIG. 9.
Figure 11:
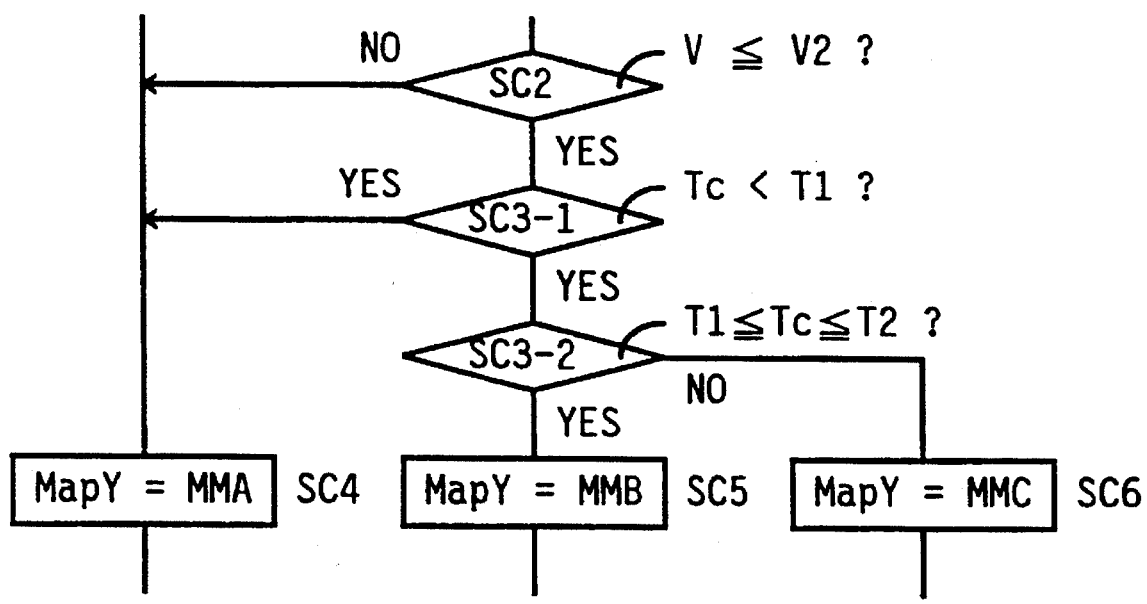
FIG. 11 is a flow chart representing Steps SC3-1 and SC3-2 which are implemented at Step SR20 of FIG. 9 and are different from the steps of FIG. 7.

However, for the second embodiment, the control program represented by the flow charts of FIGS. 9 to 11 is employed in place of the control program represented by the flow charts of FIGS. 4 to 6 for the first embodiment, though the flow chart of FIG. 6 modified as indicated in FIG. 11 is used for the second embodiment.

First, at Step SR1 of FIG. 9, the CPU 56 of the motor control computer 54 judges whether the current running speed V of the vehicle is zero, based on the motor-speed signal SNm supplied from the Nm sensor 66. If a positive judgment is made at Step SR1, the control of the CPU 56 proceeds with Step SR2 to judge whether the brake pedal is currently depressed ("ON") for braking the vehicle, based on the brake signal SB supplied from the brake switch 70. If a positive judgment is made at Step SR2, the control proceeds with Step SR3 to detect one or more current conditions of the vehicle. In the present embodiment, the current angle θ of inclination of the vehicle is detected based on the angle signal Sθ supplied from the R sensor 72, and additionally the current vehicle weight, M, including the weight of the operator and one or more possible passengers is measured by, e.g., a deflectometer (not shown) which detects the amount of deflection or deformation of the suspension device (not shown). Both the inclination angle θ and the vehicle weight W influence the backward dragging of the vehicle on the upgrade road surface. Step SR3 is followed by Step SR4 to determine a basic creep-torque value, K, and a learning-control value, kg, based on the detected vehicle conditions. For the determination of the value K, is used a first data map pre-stored in the ROM 60 which map defines a relationship between (1) basic creep-torque value K and (2) (2a) inclination angle θ and (2b) vehicle weight M, such that a greater basic creep-torque value K corresponds to a greater inclination angle e or a greater vehicle weight M, so that on an upgrade road surface the vehicle will not be dragged backward even if the brake pedal is released ("OFF") and so that on a flat road surface the vehicle will be driven forward at a very low speed (i.e., "creep" speed). Similarly, for the determination of the value kg, is used a second data map pre-stored in the RAM 58 which map defines a relationship between (3) learning-control value kg and (2) (2a) inclination angle θ and (2b) vehicle weight M. The second data map used for determining the learning-control value kg is updated at Step ST9 of FIG. 10, and is kept intact even after the operation start key or switch (not shown) of the vehicle is turned off. At the following Step SR5, the CPU 56 sums the values K and kg determined at Step SR4 and stores the obtained value (K+kg) as a final-target output torque, Tc, in the RAM 58. Step SR5 is followed by Step SR6 to set zero as the target output torque To and regulate the output torque of the electric motor 12 to zero. Subsequently, at Step SR7, the CPU 56 resets the timer TimA to zero. Furthermore, at Step SR8, the CPU 56 sets a flag, F4, to F4=1 and a flag, F5, to F5=0. Thus, in the second embodiment, the electric motor 12 is not controlled to produce a creep torque while the brake pedal is depressed ("ON"), unlike the first embodiment. However, it is possible like the first embodiment that when the brake pedal is being depressed ("ON") the output torque of the electric motor 12 be regulated to, as the target torque To, a creep torque equal to, e.g., the final-target torque Tc.

In the case where a negative judgment is made at either Step SR1 or Step SR2, the control of the CPU 56 goes to Step SR9 to judge whether the shift lever is currently operated to the D (drive) range, based on the shift-position signal SSh supplied from the Sh sensor 68, and additionally whether the brake pedal is currently not depressed ("OFF"), based on the brake signal SB supplied from the brake switch 70. If a negative judgment is made at Step SR9, the control proceeds with Step SR11 to effect a running torque regulation identical with that effected at Step S14 in the first embodiment. Step SR11 is followed by Step SR12 to set the flags F4 and F5 to F4=0 and F5=0, respectively. On the other hand, if a positive judgment is made at Step SR9, the control goes to Step SR10 to judge whether the flag F4 is set at F4=1. Assuming that the flag F4 is set at F4=1 in a control cycle immediately after Step SR3 and the following steps have been implemented, the control goes to Step SR13 and the following steps.

At Step SR13, the CPU 56 judges whether the flag F5 is set at F5=0. If a negative judgment is made at Step SR13, the control goes to Step S17 and the following steps. Assuming that the flag F5 is set at F5=0 in the control cycle immediately after Step SR3 and the following steps have been implemented, a positive judgment is made at Step SR13, and the control goes to Step SR14 to replace the target torque To with the final-target torque Tc (=K+kg) determined at Step SR5 and regulate the output torque of the electric motor 12 to the value To, i.e., value Tc (=K+kg). Thus, the electric motor 12 is controlled to produce a creep torque such that on an upgrade road surface, the vehicle is effectively prevented from being dragged backward no matter how high upgrade the road surface may have or no matter how much the vehicle may weigh (e.g., no matter how many passengers the vehicle may be transporting), and such that on a flat road surface, the vehicle is driven forward at a creep speed. Like Steps SS7 to SS11 of FIG. 5 in the first embodiment, it is possible to gradually increase the output torque of the electric motor 12 up to the final-target torque Tc by incrementing the target torque To.

Step SR14 is followed by Step SR15 to reset a timer, TimB, to zero. At the subsequent Step SR16, the CPU 56 sets the flag F5 to F5=1. Thus, in the following control cycle, the control of the CPU 56 goes to Step SR17 after Step SR13. At Step SR17, the CPU 56 identifies whether the accelerator pedal is not being operated ("OFF"), based on the signal SAc supplied from the Ac sensor 64. A positive judgment is made, for example, when the current operation amount Ac is smaller than about several percent of the full operation amount of the accelerator pedal. In this case, the control goes to Step SR18 to judge whether the time counted by the timer TimB has exceeded a prescribed reference value, tb. The timer TimB counts the time which has passed after the target torque To is changed at Step SR14 of FIG. 9, or Step ST2 or ST5 of FIG. 10. The reference value tb is pre-selected at a time sufficiently longer than a time lag necessary for the running speed V of the vehicle to change in response to the regulation of the output torque of the electric motor 12 to the target torque To. As long as a negative judgment is made at Step SR18, that is, till the reference time tb is counted up, the target torque To is maintained. Meanwhile, when a positive judgment is made at Step SR18, the control goes to Step SR19.

FIG. 10 shows the flow chart representing the series of steps implemented at Step SR19. At Step ST1, the CPU 56 judges whether the current running speed V of the vehicle is smaller than a reference value, $V_3$. The reference value $V_3$ may be pre-selected at zero or a positive value around zero. Otherwise, the CPU 56 may be adapted to determine the value $V_3$ based on the current condition or conditions of the vehicle including, e.g., the current inclination angle θ. In this case, for an upgrade road surface the value V3 may be determined at zero, and for a flat road surface the value V3 may be determined at a positive value around zero. If a positive judgment is made at Step ST1, the control of the CPU 56 goes to Step ST2 to add a prescribed small value, δ, to the target torque To and increase the output torque of the electric motor 12 by the increment δ. Step ST2 is followed by Step ST3 to reset the timer B. On the other hand, if a negative judgment is made at Step ST1, the control of the CPU 56 goes to Step ST4 to judge whether the current vehicle speed V is not smaller than the reference value $V_3$ and simultaneously is not greater than a reference value, $V_4$, which is slightly greater than the reference value $V_3$ by taking the degree of accuracy of the torque regulation into consideration. In the case where a negative judgment is made at Step ST4, that is, in the case of $V_4$<V, the control of the CPU 56 goes to Step ST5 to subtract the small value δ from the target torque To and decrease the output torque of the electric motor 12 by the decrement δ. Step ST5 is followed by Step ST6 to reset the timer B. On the other hand, if a positive judgment is made at Step ST4, the control of the CPU 56 goes to Step ST7 to regulate the output torque of the electric motor 12 at the target torque To maintained without any change. Thus, the electric motor 12 is regulated at such a creep torque which causes the vehicle to be driven at the running speed V within the range of $V_3 \leq V \leq V_4$. The small value δ used at Step ST5 may be different from that used at Step ST2. Otherwise, the CPU 56 may be adapted to determine the value δ based on, e.g., the difference between the current vehicle speed V and the reference value $V_3$ or $V_4$.

Step ST7 is followed by Step ST8 to judge whether the vehicle has satisfied a prescribed learning condition which may be that a positive judgment is made at Step ST4 successively in a prescribed number of control cycles. If a positive judgment is made at Step ST8, the control of the CPU 56 goes to Step ST9 to obtain a learning-control value kg by subtracting the basic creep-torque value K determined at Step SR4, from the current target torque To. At Step ST9, the CPU 56 rewrites the initial value kg corresponding to the vehicle conditions detected at Step SR3, into the newly obtained value kg, on the second data map stored in the RAM 58. Thus, the second data map for the learning-control data kg is updated. If the same vehicle conditions as described above are detected in a subsequent creep torque regulation, the same final-target torque Tc is determined according to the updated second data map, so that the electric motor 12 is regulated to the determined value Tc. Thus, any creep torque regulation at Step SR19 begins with a creep torque appropriate for the specific vehicle, irrespective of the individuality of the vehicle which may be different from those of other vehicles and irrespective of the time-wise change of the vehicle.

Back to FIG. 9, if a negative judgment is made at Step SR17, that is, if the accelerator pedal is depressed ("ON"), the control of the CPU 56 goes to Step SR20 to effect a start-after-creep (SAC) torque regulation according to the control program which is almost the same as that represented by the flow chart of FIG. 6 but is modified as indicated in FIG. 11. Specifically, since the data map MapX (i.e., maps MA, MB, MC) is not employed in the present embodiment, Steps SC3-1 and SC3-2 are provided in place of Step SC3 of FIG. 6. At Step SC3-1, the CPU 56 judges whether the final-target torque Tc determined at Step SR5 is smaller than a prescribed reference value, $T_1$. That is, the CPU 56 judges whether the creep torque Tc used in the creep torque regulation at Step SR14 is smaller than the reference value $T_1$. In the case where a positive judgment is made at Step SC3-1, i.e., in the case of Tc<$T_1$, the control goes to the previously-described Step SC4. On the other hand, in the case where a negative judgment is made at Step SC3-1, i.e., in the case of Tc≧$T_1$, the control goes to Step SC3-2 to judge whether the final-target torque Tc is not smaller than the reference value $T_1$ and simultaneously is not greater than a prescribed reference value, $T_2$, greater than the reference value $T_1$. In the case of $T_1 \leq Tc \leq T_2$, i.e., in the case where an intermediate creep torque Tc is used in the creep torque regulation at Step SR14, the control goes to the previously-described Step SC5. On the other hand, in the case of $T_2$<Tc, i.e., in the case where a great creep torque Tc is used at Step SR14, the control goes to the previously-described Step SC6.

Similar to the first embodiment, the second embodiment provides the advantage that when the vehicle is started on a high upgrade road surface after the electric motor 12 has been regulated to a high creep torque in a creep torque regulation, the electric motor 12 produces a greater output torque than that for a running torque regulation, in response to a same operation amount Ac of the accelerator pedal and a same rotation speed Nm of the motor 12. Consequently the vehicle is smoothly started without needing to continuously fully depress the accelerator pedal. Thus, the operability of the electric vehicle is improved. Additionally, since the learning-control data kg or second data map is updated while the output torque of the electric motor 12 is regulated in a creep torque regulation, the following creep torque regulation begins with an appropriate creep torque. Furthermore, on a flat road surface, with the brake pedal being released ("OFF") the electric motor 12 is regulated to a creep torque which drives the vehicle forward at a creep speed. This arrangement is advantageous in that the vehicle intermittently runs forward simply by repeating the depression and release of the brake pedal, for example, when the vehicle is being involved in a traffic snarl or when the vehicle is being put into a garage. In this respect, too, the operability of the vehicle is improved.

In the second embodiment, Step SR11 and a portion of the motor control computer 54 for implementing Step SR11 cooperate with each other to function as the first regulating means for the running torque regulation; Steps SR3, SR4, SR5, SR14, and SR19 and a portion of the computer 54 for implementing those steps cooperate with each other to function as the second regulating means for the creep torque regulation; and Step SR20 and a portion of the computer 54 for implementing Step SR20 cooperate with each other to function as the third regulating means for the after-creep torque regulation. When a positive judgment is made at each of Steps SR9 and SR10, the second regulating means judges that the vehicle has satisfied a prescribed condition for the creep torque regulation.

While in the first and second embodiments the creep torque regulation is effected while the electric vehicle is driven with the shift lever being operated to the D (drive) range, it is possible to adapt the drive system to effect the creep torque regulation while the vehicle is driven with the shift lever being operated to the R (reverse) range.

While in the first embodiment the creep torque regulation is effected while the vehicle satisfies a prescribed condition that the brake pedal is currently depressed ("ON") and the current vehicle speed V is not greater than the reference value $V_1$, a different creep-torque-regulation starting and/or ending condition may be employed. For example, the CPU 56 may be adapted to start a creep torque regulation when the accelerator pedal is released ("OFF"), or when a creep-torque-regulation select switch (not shown) is turned on by the operator. The creep-torque-regulation ending condition may be different from the creep-torque-regulation starting condition. These apply to the second embodiment.

While in the preceding embodiments the start-after-creep (SAC) torque regulation is started upon operation of the accelerator pedal after a creep torque regulation has been effected, a different SAC-torque-regulation starting condition may be employed. For example, the CPU 56 may be adapted to start the SAC torque regulation only while a mode-select switch (not shown) provided on the vehicle is operated to select a "power" mode different from an "economy" mode.

Although in the first embodiment the creep torque regulation is effected while the brake pedal is depressed ("ON") and in the second embodiment the creep torque regulation is effected when the brake pedal is released ("OFF") after having been depressed ("ON"), it is possible to combine the two embodiments so that the creep torque regulation is effected during both a first period when the brake pedal is being depressed and a second period after the brake pedal has been released.

While in the first embodiment the creep torque regulation is effected based on the inclination angle θ of the vehicle and in the second embodiment the creep torque regulation is effected based on the inclination angle θ and the vehicle weight M, it is possible to effect a creep torque regulation based on one or more different parameters by taking a creep-torque-regulation starting and/or ending condition into consideration. Otherwise, the CPU 56 may be adapted to regulate, with the brake pedal being released ("OFF") and simultaneously with the accelerator pedal being released ("OFF"), the output torque of the electric motor 12 from a prescribed initial creep torque to an adjusted creep torque, so that with the adjusted creep torque the vehicle is driven on an upgrade or downgrade road surface at a prescribed running speed which may be zero. In this case, the adjusted creep torque corresponds to the degree of upgrade or downgrade of the road surface on which the vehicle is driven at the prescribed running speed.

Although in the preceding embodiments the creep torque regulation is effected while the vehicle is driven on a flat or a downgrade road surface in addition to while the vehicle is driven on an upgrade road surface, it is possible to effect the creep torque regulation only while the vehicle is driven on such an upgrade road surface which causes the backward dragging of the vehicle with the brake pedal being released ("OFF") and with the accelerator pedal being released ("OFF"). Otherwise, it is possible to effect a creep torque regulation for producing a creep torque which drives an electric vehicle backward and thereby preventing forward dragging of the vehicle, only while the vehicle is driven on a downgrade road surface.

While in the preceding embodiments the SAC torque regulation is effected according to the data map MapY (i.e., selected one of the maps MMA, MMB, MMC) when the operation amount Ac of the accelerator pedal and the running speed V of the vehicle satisfy predetermined conditions at Steps SC1 and SC2, respectively, this SAC-torque-regulation starting and ending condition may be changed. For example, it is possible to employ a different SAC-torque-regulation ending condition that the current amount or rate of reduction of the accelerator operation amount Ac has exceeded a prescribed value, or that the current operation amount Ac has been reduced to a value smaller than a prescribed percentage of a maximum operation amount $Ac_{max}$ for a specific SAC torque regulation. The SAC-torque-regulation starting and ending conditions may be different from each other. For example, each of the accelerator operation amount Ac and the vehicle running speed V may be compared with different reference values for judging whether to start and end a SAC torque regulation, respectively.

Although in the preceding embodiments the data map MapY is selected from the three maps MMA, MMB, MMC, the number of the maps MMA, MMB, MMC may be changed to two or more than three. Additionally, it is possible to store in the ROM 60 a single data map suitable for the running torque regulation and correct the data map based on one or more conditions of the vehicle at the time of the creep torque regulation. Otherwise, it is possible to determine the final-target torque Tb according to the data map MMA based on the current operation amount Ac of the accelerator and the current rotation speed Nm of the electric motor 12 and correct the thus determined value Tb by using a correction coefficient corresponding to one or more conditions of the vehicle at the time of the creep torque regulation. In the last two cases, the output-torque characteristic of the electric motor 12 for the SAC torque regulation is continuously changeable based on one or more conditions of the vehicle at the time of the creep torque regulation, which conditions may include the creep torque Tc. Similarly, a different number of maps may be employed as the data map MapX used in the first embodiment. Moreover, it is possible to correct the basic map MA based on the current inclination angle θ of the vehicle and determine a creep torque according to the thus adjusted map based on the current operation amount Ac of the accelerator and the current rotation speed Nm of the electric motor 12.

Without using the data map MapY, it is possible to effect the SAC torque regulation by employing a fuzzy-algorithmic approach wherein the creep torque Tc, accelerator operation amount Ac, motor rotation speed Nm, etc. are used as parameters. The running torque regulation or the creep torque regulation may also be effected by a fuzzy-algorithmic approach, without using any data map.

While in the preceding embodiments the SAC torque regulation is effected only when the electric vehicle is started upon operation of the accelerator pedal after the vehicle has substantially been stopped as a result of operation of the brake pedal, a special torque regulation similar to the SAC torque regulation may be effected additionally when the vehicle is running on a road surface without any operation of the brake or accelerator pedal, according to a selected one of the maps MMA, MMB, MMC which corresponds to the degree of upgrade or downgrade of the road surface on which the vehicle is running. In this case, it is preferred that a mode-select switch (not shown) be provided for allowing the operator to select one of a special mode wherein the special torque regulation may occur and a normal mode wherein the special torque regulation may not occur.

Although in the second embodiment the creep torque Tc is obtained by summing the basic creep-torque value K and the learning-control value kg and only the second data map used for determining the value kg is updated, it is possible to update the data map used for determining the value K, without using the data map for the value kg. In this case, the data K serve as learning-control data.

Figure 12:
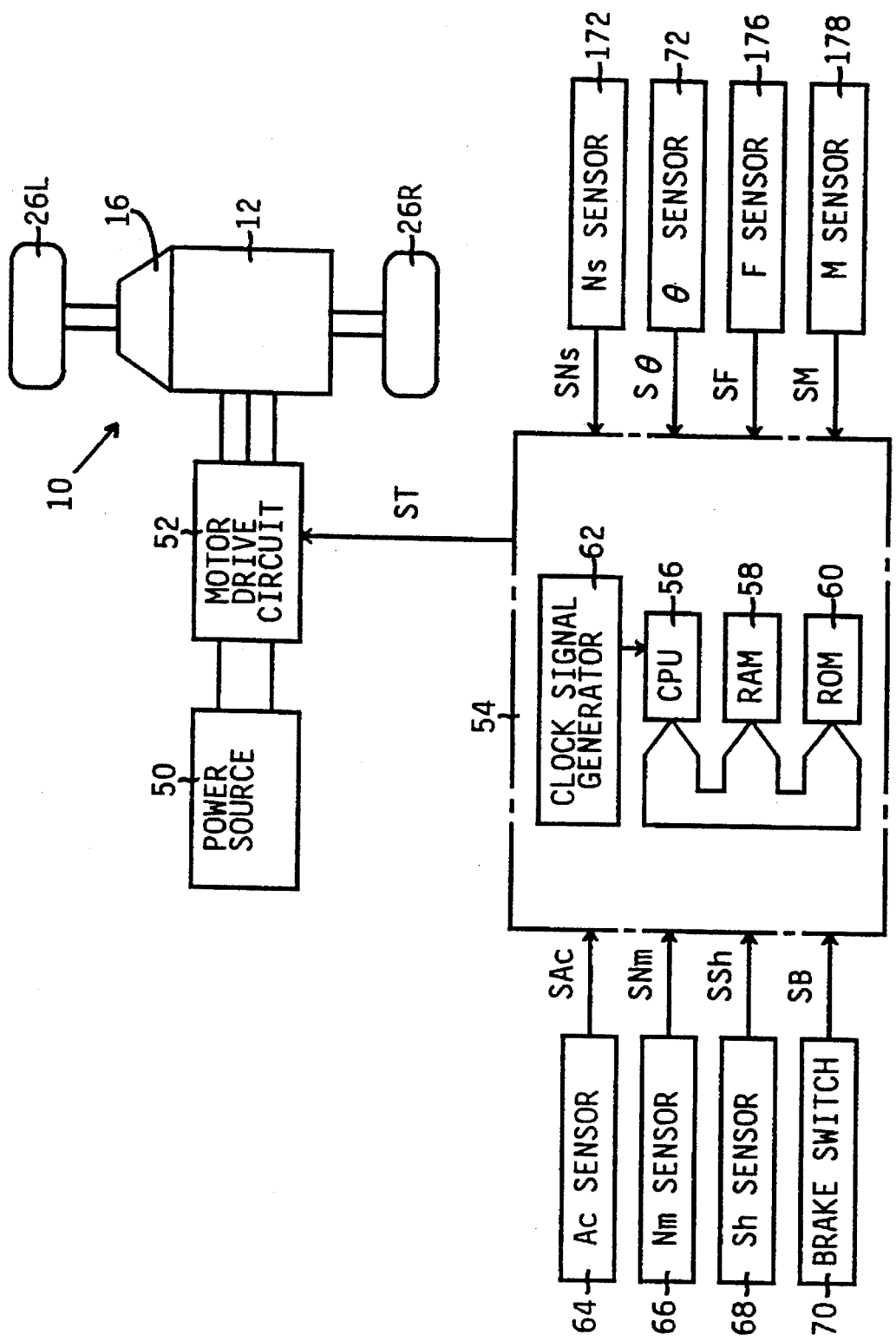
FIG. 12 is a diagrammatic view of a drive system for an electric vehicle as the third embodiment of the present invention.

Referring next to FIG. 12, there is illustrated a third embodiment of the present invention. The same reference numerals as used in the first embodiment are used for designating the corresponding elements or parts of the third embodiment. The third embodiment relates to a drive system of an electric vehicle which system has a hard-ware construction generally similar to that of the first embodiment shown in FIG. 1 but different from the latter in that the drive system of the third embodiment additionally includes a fifth, a sixth, and a seventh sensor 172, 176, 178.

The fifth sensor 172 detects the current rotation speed, Ns, of one of the two driven wheels (not shown) of the electric four-wheel vehicle, and generates to the motor control computer 54 a signal, SNs, indicative of the detected rotation speed Ns (hereinafter, referred to as the "Ns sensor 172"). The sixth sensor 176 detects the current braking force, F, for example, hydraulic pressure produced in the brake master cylinder of the vehicle as a result of operation or depression of the brake pedal by the operator, and generates to the control computer 54 a signal, SF, indicative of the detected braking force F (hereinafter, referred to as the "F sensor 176"). The seventh sensor 178 detects the current weight, M, of the vehicle including the weight of the operator and one or more possible passengers, and generates to the control computer 54 a signal, SM, indicative of the detected vehicle weight M (hereinafter, referred to as the "M sensor 178").

Hereinafter there will be described the operation of the motor control computer 54 of the drive system as the third embodiment, for regulating the driving force of the electric motor 12 with the shift lever being operated to the D (drive) range, by reference to the flow charts of FIGS. 13 and 14. The control program represented by those flow charts is repetitively implemented at a prescribed cycle time such as several tens of milliseconds (msec).

Figure 13:
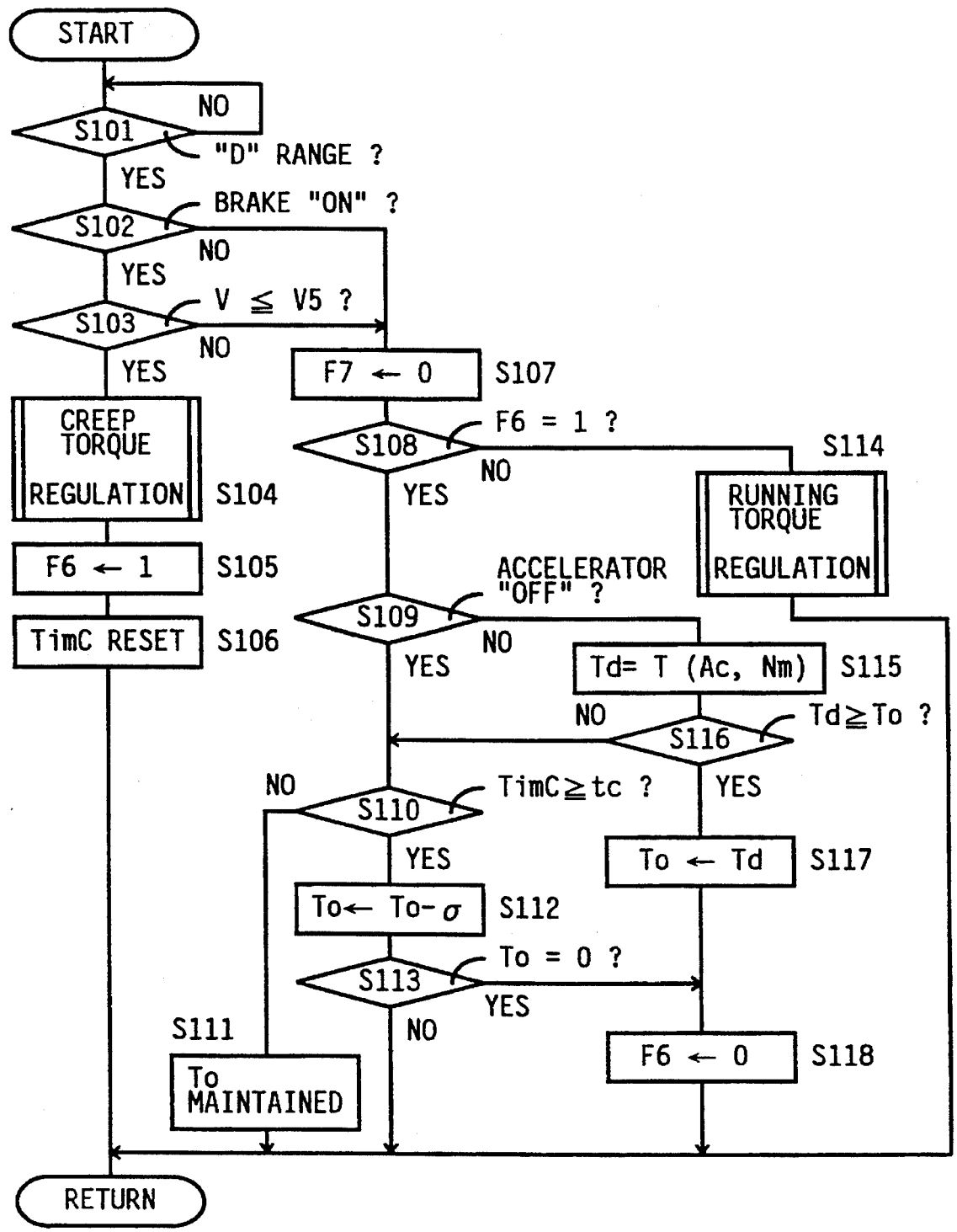
FIG. 13 is a flow chart representing a control program used by the drive system of FIG. 12 for regulating the driving force of the electric vehicle.

First, at Step S101 of FIG. 13, the CPU 56 judges whether the shift lever is currently operated to the D range, based on the shift-position signal SSh supplied from the Sh sensor 68. If a positive judgment is made at Step S101, the control of the CPU 56 proceeds with Step S102 to judge whether the brake pedal is currently depressed ("ON") for braking the vehicle, based on the brake signal SB supplied from the brake switch 70. If a positive judgment is made at Step S102, the control proceeds with Step S103 to judge whether the current running speed V of the vehicle is not greater than a prescribed reference value, $V_S$, based on the motor rotation speed Nm represented by the signal SNm supplied from the Nm sensor 66, or the driven-wheel rotation speed Ns represented by the signal SNs supplied from the Ns sensor 172. The reference value $V_S$ is pre-selected at, e.g., several kilometers per hour. If a positive judgment is made at Step S103, the control of the CPU 56 goes to Step S104 where the CPU 56 effects a creep torque regulation. Meanwhile, if a negative judgment is made at Step S101, Step S101 is repeated. If a negative judgment is made at either Step S102 or Step S103, the control goes to Step S107.

Figure 14:
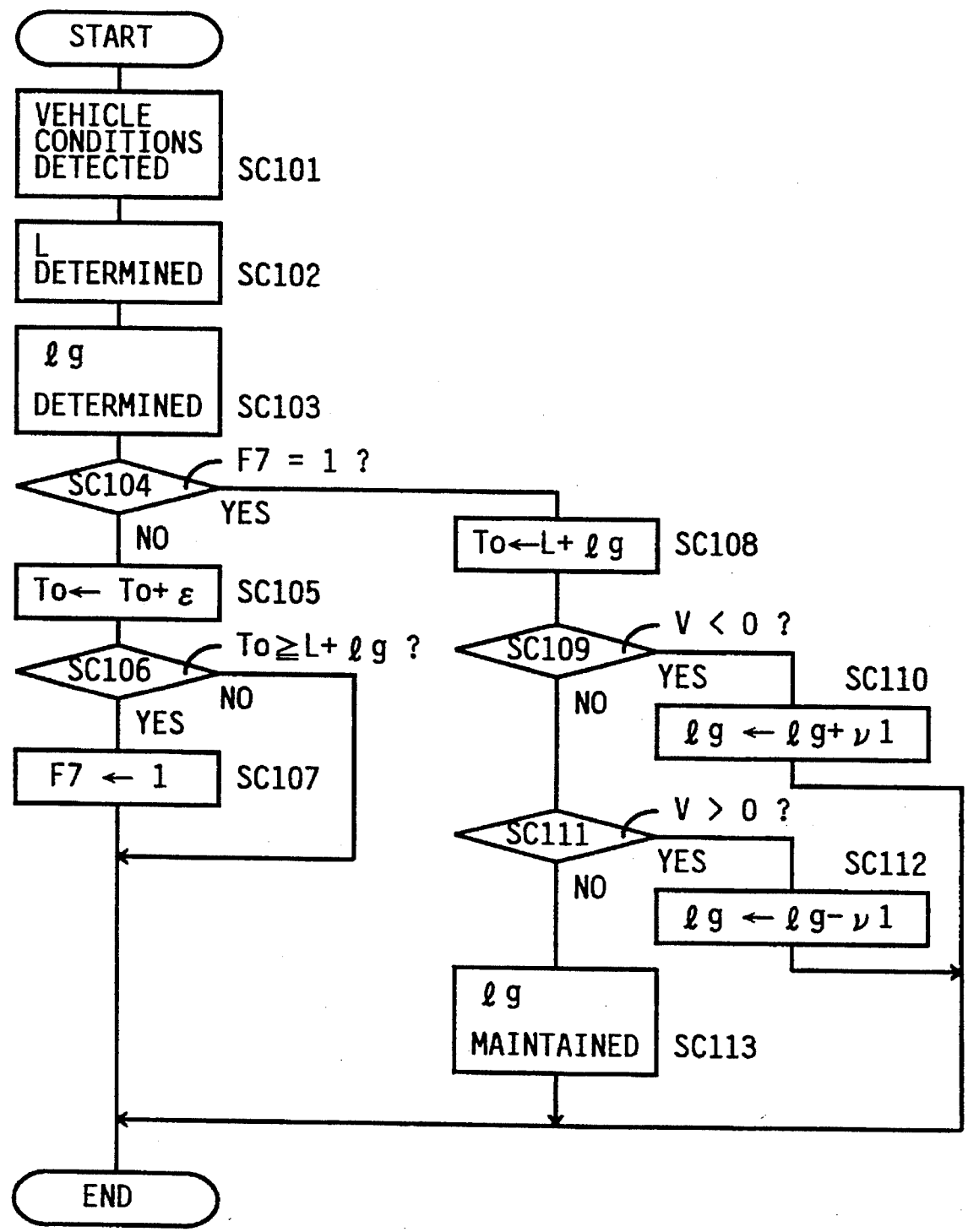
FIG. 14 is a flow chart-representing a control program implemented at Step S104 of FIG. 13.

The flow chart of FIG. 14 represents an example of the creep torque regulation effected at Step S104 of FIG. 13 for regulating the output torque of the electric motor 12 while the vehicle is driven forward at a creep speed, or is stopped, with the brake pedal being depressed ("ON").

At Step SC101 the CPU 56 operates for detecting current vehicle conditions. In the present embodiment, the current braking force F is detected based on the signal SF supplied from the F sensor 176, the current inclination angle θ of the vehicle is detected based on the signal Sθ supplied from the θ sensor 72, and the current weight M of the vehicle is detected based on the signal SM supplied from the M sensor 178. The braking force F, inclination angle θ, and vehicle weight W influence a necessary creep torque to which the output torque of the electric motor 12 is regulated in the current creep torque regulation. Step SC101 is followed by Step SC102 to determine a basic creep-torque value, L, based on the current vehicle conditions detected at Step SC101. For the determination of the value L, is used a first data map pre-stored in the ROM 60 which map defines a relationship between (1) basic creep-torque value L and (2) (2a) braking force F, (2b) inclination angle θ, and (2c) vehicle weight M, such that a greater basic creep-torque value L corresponds to a smaller braking force F, a greater inclination angle θ, or a greater vehicle weight M, so that on an upgrade road surface the vehicle will not be dragged backward even when the vehicle is stopped on the road surface, and simultaneously by taking into consideration the individuality of the vehicle that may be different from those of other vehicles, such that each basic creep-torque value L is greater by a prescribed small amount than a corresponding theoretic value obtained from experiments, simulations, etc. Additionally, the first data map defines the basic creep-torque values L such that in the case where the inclination angle θ is zero (i.e., θ=0), i.e., where the vehicle is being driven on a flat road surface, the output torque of the electric vehicle is regulated to a small creep torque which does not cause the vehicle to run forward even when the brake pedal is released ("OFF"). The CPU 56 determines, by using, e.g., the technique of map interpolation, a basic creep-torque value L according to the first data map based on the detected values of the parameters F, θ, M.

Step SC102 is followed by Step SC103 to determine a learning-control value, lg, based on the current vehicle conditions detected at Step SC101. For the determination of the value lg, is used a second data map pre-stored in the RAM 58 which map defines a relationship between (3) learning-control value lg and (2) (2a) braking force F, (2b) inclination angle θ, and (2b) vehicle weight M. The second data map is updated at Step SC110 or SC112, and is kept intact even after the operation start key or switch (not shown) of the vehicle is turned off. Similar to the determination of the basic creep-torque value L, the CPU 56 determines, by using, e.g., the technique of map interpolation, a learning-control value lg according to the second data map based on the detected values of the parameters F, θ, M.

At the following Step SC104, the CPU 56 judges whether a flag, F7, is set at F7=1. In the case of F7=1, i.e., in the case where a positive judgment is made at Step SC104, the control proceeds with Step SC108. On the other hand, in the case of F7=0, i.e., in the case where a negative judgment is made at Step SC104, the control proceeds with Step SC105. The flag F7 is set to F7=0 at Step S107 in an early control cycle according to the program represented by the flow chart of FIG. 13. Assuming that a negative judgment is made at Step SC104, the control of the CPU 56 proceeds with Step SC105 to update the target output torque To by adding thereto a prescribed small value, ε, and generates to the motor drive circuit 52 the command signal ST indicative of the updated target torque To for regulating the output torque of the electric motor 12 to the target torque To. Step SC105 is followed by Step SC106 to judge whether the sum, (L+lg), of the basic creep-torque value L determined at Step SC102 and the learning-control value lg determined at Step SC103 is not greater than the target torque To. The summed value (L+lg) is a final-target output torque of the electric motor 12, i.e., creep torque to which the output torque of the motor 12 is regulated. If a positive judgment is made at Step SC106, the control of the CPU 56 goes to Step SC107 to set the flag F7 to F7=1, so that in the next control cycle the control goes to Step SC108 following Step SC104. Steps SC104 to SC107 are provided for gradually increasing the output torque of the electric motor 12 by the increments c and thereby preventing an abrupt and large change of the motor output torque at the beginning of the creep torque regulation from the target torque To to the creep torque (L+lg), because in the first or initial control cycle of Step S104 of FIG. 13, the target torque To is usually zero.

At Step SC108, the CPU 56 updates the target torque To by replacing the value To with the summed value (L+lg), and generates to the motor drive circuit 52 the command signal ST indicative of the updated target value To for regulating the output torque of the electric motor 12 to the value To, i.e., creep torque (L+lg). Step SC108 is followed by Step SC109 to judge whether the current running speed V of the vehicle is negative, i.e., whether the vehicle is being dragged backward, e.g., after the vehicle has been stopped on an upgrade road surface. In the case of V<0, the creep torque (L+lg) is insufficiently low and a positive judgment is made at Step SC109. In this case, the control of the CPU 56 goes to Step SC110 to update the learning-control value lg as an element of the creep torque (L+lg), by adding thereto a prescribed small value, $v_1$, and rewrite the learning-control value lg corresponding to the vehicle conditions detected at Step SC101, into the updated learning-control value lg, on the second data map stored in the RAM 58. Thus, in the next control cycle of Step SC103, the CPU 56 obtains, based on the same vehicle conditions as described above, a learning-control value lg greater by the value $v_1$ than that obtained in the current control cycle, according to the updated second data map. Therefore, the output torque of the electric motor 12 is regulated to a creep torque greater by the value $v_1$. Step SC110 is repeated till the vehicle running speed V is increased to zero, i.e., a negative judgment is made at Step SC109. Thus, the backward dragging of the vehicle on the upgrade road surface is effectively prevented.

Meanwhile, if a negative judgment is made at Step SC109, the control of the CPU 56 goes to Step SC111 to judge whether the current running speed V is positive, i.e., whether the current creep torque of the electric motor 12 is excessively great. In the case of V>0, a positive judgment is made at Step SC111, and the control of the CPU 56 goes to Step SC112 to update the learning-control value lg of the creep torque (L+lg) by subtracting therefrom the small value $v_1$ and rewrite the learning-control value lg corresponding to the vehicle conditions detected at Step SC101, into the updated learning-control value lg, on the second data map stored in the RAM 58. Thus, in the next control cycle of Step SC103, the CPU 56 obtains, based on the same vehicle conditions as described above, a learning-control value lg smaller by the value $v_1$ than that obtained in the current control cycle, according to the updated second data map. Therefore, the output torque of the electric motor 12 is regulated to a creep torque smaller by the value $v_1$. Step SC112 is repeated till the vehicle running speed V is decreased to zero, i.e., a negative judgment is made at Step SC111. Thus, the wasteful consumption of the electric energy due to the production of unnecessarily great creep torque is effectively reduced. The value $v_1$ used at Step SC112 may be different from the value $v_1$ used at Step SC110. Otherwise, the CPU 56 may be programmed to determine the value $v_1$ by using, e.g., the vehicle running speed V as a parameter. In the case where a negative judgment is made at each of Steps SC109 and SC111, the control of the CPU 56 goes to Step SC113 to maintain the learning-control value lg of the creep torque (L+lg) without changing it on the second data map. Thus, the creep torque regulation according to the flow chart of FIG. 14 terminates.

After the creep torque regulation according to the flow chart of FIG. 14 has terminated as described, the control of the CPU 56 goes back to Step S105 of FIG. 13 to set a flag, F6, to F6=1 and subsequently to Step SC106 to reset a timer, TimC, to zero.

Figure 15:
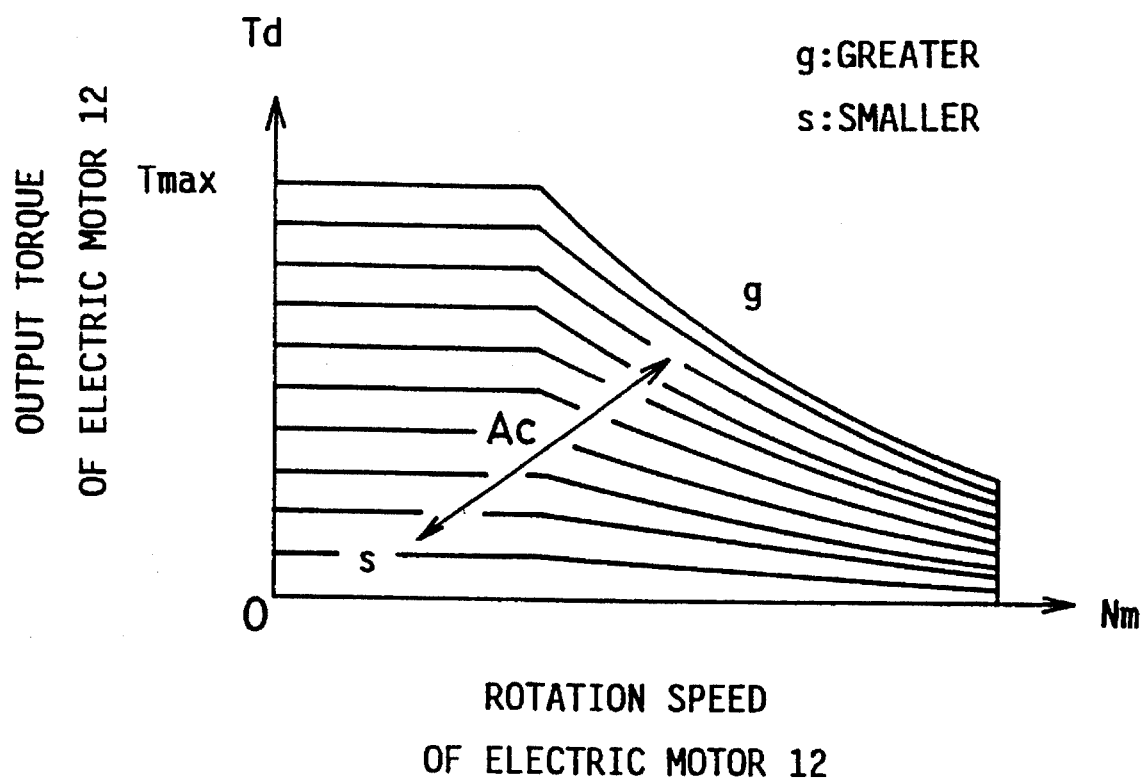
FIG. 15 is a view of a map used at Step S114 or Step S115 of FIG. 13.

On the other hand, in a negative judgment is made at Step S102 or Step S103, the control of the CPU 56 goes to Step S107 to set the flag F7 to F7=0. Step S107 is followed by Step S108 to judge whether the flag F6 is set at F6=1. Assuming that the flag F6 is set to F6=1 at Step S105 after a creep torque regulation has been effected at Step S104, a positive judgment is made at Step S108 in a control cycle immediately after the creep torque regulation has been effected at Step S104. On the other hand, if a negative judgment is made at Step S108, the control goes to Step S114 to effect a running torque regulation. In the running torque regulation, the CPU 56 determines a final-target output torque, Td, of the electric motor 12 based on the current operation amount Ac of the accelerator pedal and the current rotation speed Nm of the motor 12 according to a data map as shown in FIG. 15, and generates to the motor drive circuit 52 the command signal ST indicative of the thus determined final-target torque Td as the target torque To. Meanwhile, when the vehicle satisfies a prescribed condition, the CPU 56 generates to the drive circuit 52 the command signal ST indicative of a regulated regenerative braking torque, so that the electric motor 12 produces a regulated braking force, like the engine brake of an internal-combustion engine for an automotive vehicle, and so that the power source 50 is charged with the electric energy corresponding to the braking torque of the electric motor 12.

Steps S109 to S118 are implemented at the transition from the creep torque regulation at Step S104 to the running torque regulation at Step S114. At Step S109, the CPU 56 identifies whether the accelerator pedal is not depressed, i.e., is released ("OFF"), based on the signal SAc supplied from the Ac sensor 64. A positive judgment is made, for example, when the current operation amount Ac represented by the signal SAc is smaller than about several percent of the full operation amount of the accelerator pedal. In this case, the control goes to Step S110 to judge whether the time measured or counted by the timer TimC has exceeded a prescribed reference value, tc. As long as a negative judgment is made at Step S110, that is, till the reference time tc is counted up, the CPU 56 continues at Step S111 to maintain the target torque To used for the creep torque regulation at Step S104. Since at Step S106 the timer TimC is reset to zero each time a creep torque regulation is effected at Step S104, the timer TimC counts the time which has passed after the last creep torque regulation has been completed. The reference value tc is pre-selected by taking into consideration a time duration necessary for the operator to release the brake pedal and subsequently depress the accelerator pedal, and/or a delay of response of the torque regulation. During this time duration, the electric motor 12 produces a creep torque comparable to a creep torque produced in a proper creep torque regulation at Step S104, thereby preventing the backward dragging of the vehicle. When the reference time tc is counted up without operation of the accelerator pedal, the control of the CPU 56 proceeds with Step S112 to update the target torque To by subtracting therefrom a prescribed small value, σ. Consequently the output torque of the electric motor 12 is decreased to the updated target torque To by the decrement σ. Step S112 is followed by Step S113 to judge whether the target torque To is equal to zero. If a positive judgment is made at Step S113 after Step S112 is repeated, the control of the CPU 56 goes to Step S118 to set the flag F6 to F6=0. Therefore, in the next control cycle, the CPU 56 implements Step S114 following Step S108. Steps S109 to S113 and S118 are provided for gradually decreasing the output torque of the electric motor 12 from the creep torque produced in a creep torque regulation at Step S104 and thereby protecting the operator or other passengers against uncomfortable ride feeling due to an abrupt and large change of the output torque, when the brake pedal is released after the vehicle has substantially been stopped through depression of the brake pedal and accordingly the above creep torque regulation has been effected.

If a negative judgment is made at Step S109, that is, if the accelerator pedal is operated, the control of the CPU 56 goes to Step S115 to determine the final-target output torque Td based on the current operation amount Ac of the accelerator pedal and the current rotation speed Nm of the motor 12 according to the data map of FIG. 15. Step S115 is followed by Step S116 to judge whether the current target torque To is not greater than the final-target torque Td determined at Step S115. In the case of Td<To, i.e., in the case where a negative judgment is made at Step S116, the control of the CPU 56 goes to Steps S110 and the following steps. On the other hand, in the case of Td≧To, i.e., in the case where a positive judgment is made at Step S116, the control of the CPU 56 goes to Step S117 to update the target torque To by replacing the value To with the final-target torque Td and controls the motor drive circuit 52 for regulating the output torque of the electric motor 12 to the value To, i.e., final-target torque Td. Subsequently, the control of the CPU 56 goes to Step S118 to set the flag F6 to F6=0. Thus, after Step S108 in the next control cycle, the CPU 56 implements a running torque regulation at Step S114.

It emerges from the foregoing description that in the third embodiment, the creep torque regulation at Step S104 is effected such that the output torque of the electric motor 12 is adjusted to an appropriate creep torque at Step SC110 or SC112 so that the running speed V of the vehicle is maintained at zero. Thus, the electric motor 12 is controlled to produce an appropriate creep torque without any excess or short irrespective of the individuality and time-wise change of the vehicle. Therefore, the present drive system effectively prevents the backward dragging of the vehicle, e.g., when the vehicle is stopped on an upgrade road surface, while minimizing the consumption amount of electric power and thereby increasing the running distance of the vehicle with a unit of electric power.

The above adjustment of the output torque of the electric motor 12 is effected by updating the second data map used for determining the learning-control value lg at Step SC103. Therefore, the next creep torque regulation is effected according to the updated second data map. Assuming that the vehicle conditions detected at Step SC101 in that creep torque regulation include no change, the output torque of the motor 12 is regulated directly to an optimum creep torque without any excess or short. Thus, the present drive system effectively prevents the backward dragging of the vehicle during a time period before the output torque of the motor 12 is adjusted to an optimum creep torque, and additionally prevents the reduction in ride comfort due to the adjustment of the output torque of the motor 12.

Since in the present embodiment the learning-control data lg or second data map used at Step SC103 is defined by various parameters including the braking force F, inclination angle θ, and vehicle weight M detected at Step SC101, the degree of accuracy of "learning" of the learning-control value lg, i.e., updating of the second data map at Step SC110 or SC112 is very high, so that the output torque of the electric motor 12 is regulated to an appropriate creep torque according to the updated second data map irrespective of the changes of braking force applied to the brake pedal, degree of upgrade or downgrade of the road surface, and number of the passengers riding on the vehicle.

Additionally, in the present embodiment, the electric motor 12 is controlled, while the vehicle is driven on a flat road surface, to produce such a small creep torque which does not cause the vehicle to run forward even when the brake pedal is released. Therefore, when the vehicle is started on the flat road surface by operating the accelerator pedal after releasing the brake pedal, generation of noise and/or vibration due to, e.g., backlash of the gears of the drive system is effectively prevented.

In the present embodiment, at Steps SC101 to SC103 in each creep torque regulation, a creep torque is determined as the sum of the basic creep-torque value L and the learning-control value lg based on the current conditions of the electric vehicle, so that the output torque of the electric motor 12 is regulated to the summed value (L+lg) as the target torque To. Therefore, even in the case where the braking force F is changed while the vehicle is stopped, the control of the electric motor 12 quickly follows the change of the braking force F, by regulating the output torque of the motor 12 to a new creep torque corresponding to the changed braking force F. Thus, both the backward dragging of the vehicle and the excessive consumption of the electric power are effectively prevented.

In the present embodiment, Step S104, i.e., program represented by the flow chart of FIG. 14 and a portion of the computer 54 for implementing Step S104 cooperate with each other to function as the torque regulating means for the creep torque regulation; Steps SC109 to SC112 and a portion of the computer 54 for implementing those steps cooperate with each other to function as the torque adjusting means; Steps SC110 and SC112 and a portion of the computer 54 for implementing those steps cooperate with each other to function as the data updating means; and the ROM 60 which stores the first data map used for determining the basic creep-torque value L and the RAM 58 which stores the second data map used for determining the learning-control value lg, cooperate with each other to serve as the memory which stores data indicative of a relationship between creep torque and at least one parameter indicative of at least one condition of the vehicle.

Figure 16:
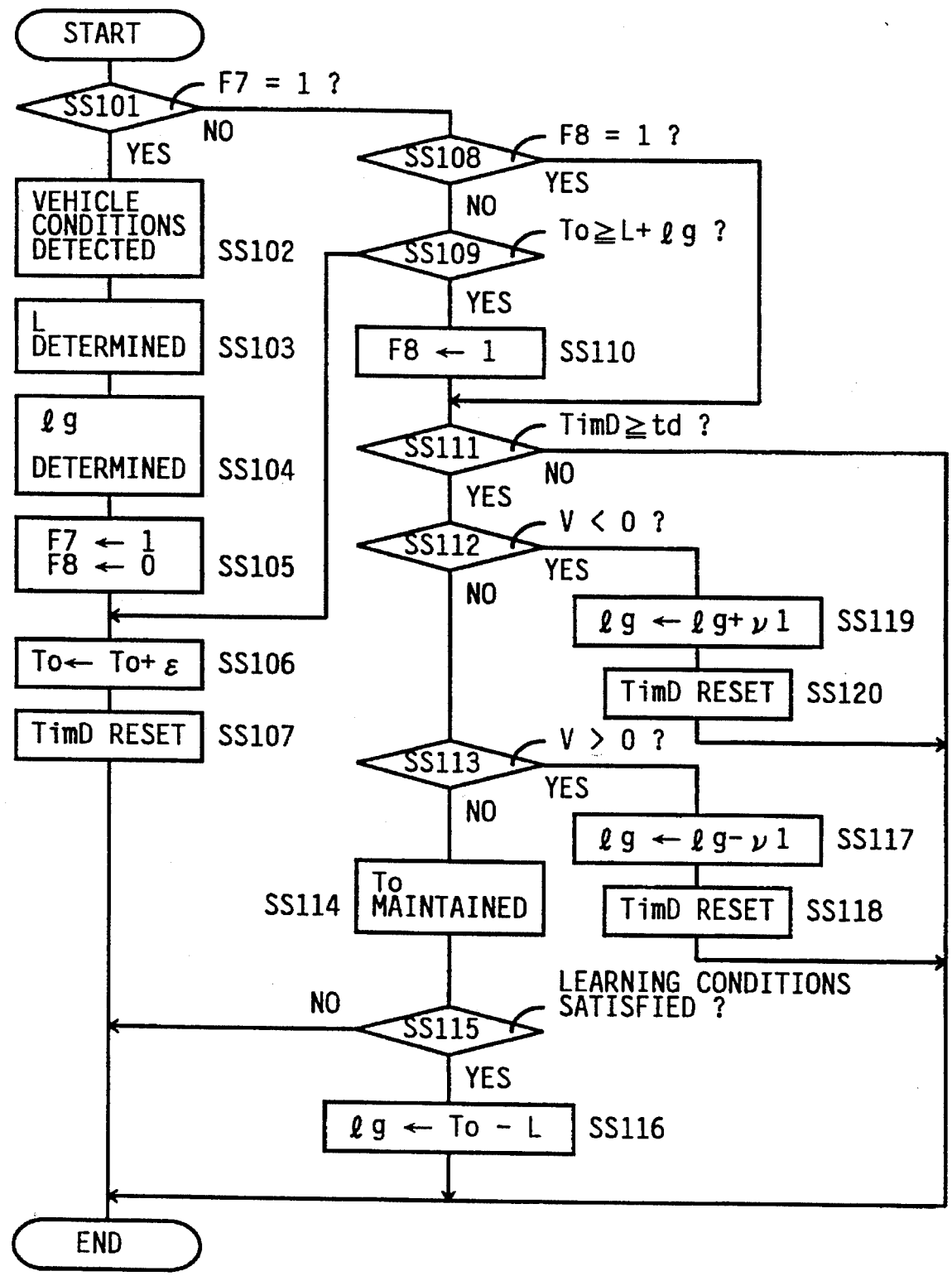
FIG. 16 is a flow chart representing a different control program implemented at Step S104 of FIG. 13, in the fourth embodiment of the present invention.

Referring next to FIG. 16, there will be described the fourth embodiment of the present invention. The fourth embodiment is generally similar to the third embodiment and differs from the latter only in that in the fourth embodiment, the creep torque regulation at Step S104 of FIG. 13 is effected according to the control program represented by the flow chart of FIG. 16, in place of the flow chart of FIG. 14 used in the third embodiment.

Steps SS102 to SS104 and SS106 for the fourth embodiment are the same as Steps SC101 to SC103 and SC105 for the third embodiment, and description thereof is omitted. At Step SS105, the CPU 56 sets the flag F7 to F7=1 and a flag, F8, to F8=0, respectively. At Step SS108, the CPU 56 resets a timer, TimD, to zero. In the case where the flag F7 has been set to F7=1 at Step S105 in a certain control cycle, the control of the CPU 56 goes, in the next control cycle, to Step SS108 following Step SS101. Since, in this case, the flag F8 has been set to F8=0 at Step SS105, a negative judgment is made at Step SS108. Therefore, the control goes to Step SS109. Similar to Steps SC105 and SC106 of FIG. 14, the CPU 56 judges whether the sum (L+lg) of the basic creep-torque value L determined at Step SS103 and the learning-control value lg determined at Step SS104 is not greater than the target output torque To. The summed value (L+lg) is a final-target output torque of the electric motor 12, i.e., creep torque to which the output torque of the motor 12 is regulated. If a positive judgment is made at Step SS109, the control of the CPU 56 goes to Step SS110 to set the flag F8 to F8=1, so that in the next control cycle the control goes to Step SS111 following Step SS108. On the other hand, if a negative judgment is made at Step SS109, the control of the CPU 56 proceeds with Step SS106 to update the target torque To by adding thereto the prescribed small value e, and generates to the motor drive circuit 52 the command signal ST indicative of the updated target torque To for regulating the output torque of the electric motor 12 to the target torque To. Till the target torque To reaches the final-target torque (L+lg), Step SS106 is repeated for gradually increasing the target torque To by the increments ϵ. When the target torque To reaches the final-target torque (L+lg), a positive judgment is made at Step SS109.

At Step SS111, the CPU 56 judges whether the time counted by the timer TimD has exceeded a reference time, td. The timer TimD measures the time which has passed after the target torque To is updated at Step SS106, Step SS117, or Step SS119. The reference time td is pre-selected by taking into consideration a time lag necessary for the actual running speed V of the vehicle to change in response to the change of the output torque of the electric motor 12. So long as the time measured by the timer TimD is smaller than the reference time td, the CPU 56 does not update the target torque To. If a positive judgment is made at Step SS111, the control of the CPU 56 goes to Step SS112 to judge whether the current running speed V of the vehicle is negative. In the case of V<0, a positive judgment is made at Step SS112. In this case, the control of the CPU 56 goes to Step SC119 to update the target torque To by adding thereto the prescribed small value $v_1$, so that the output torque of the electric motor 12 is increased by the value $v_1$. Step SS119 is followed by Step SS120 to reset the timer TimD to zero. Meanwhile, if a negative judgment is made at Step SS112, the control of the CPU 56 goes to Step SC113 to judge whether the current vehicle speed V is positive. In the case of V>0, a positive judgment is made at Step SS113, and the control of the CPU 56 goes to Step SS117 to update the target torque To by subtracting therefrom the small value $v_1$, so that the output torque of the electric motor 12 is decreased by the value $v_1$. Step SS117 is followed by Step SS118 to reset the timer TimD to zero. Steps SS112, SS113, and SS117 to SS120 are provided for regulating the output torque of the electric motor 12 so as to drive the electric vehicle at a running speed V substantially equal to zero.

In the case where a negative judgment is made at each of Steps SS112 and SS113, the control of the CPU 56 goes to Step SS114 to maintain the target torque To without any change. Step SS114 is followed by Step SS115 to judge whether the vehicle has satisfied a prescribed learning condition which may be that the vehicle running speed V has been maintained at zero for more than a prescribed period of time without any change of the vehicle conditions. If a positive judgment is made at Step SS115, the control of the CPU 56 goes to Step SS116 to obtain a learning-control value kg by subtracting the "current" basic creep-torque value K from the current target torque To. Since the braking force F may be changed during the creep torque regulation at Step S104, the "current" value K is not one determined at Step SS3, but one newly determined according to the first data map stored in the ROM 60 based on the vehicle conditions F, θ, M newly detected at this step. At Step SS115, the CPU 56 rewrites a learning-control value lg corresponding to the vehicle conditions newly detected at this step, into the thus obtained learning-control value lg, on the second data map stored in the RAM 58. Thus, the second data map is updated.

In the fourth embodiment, after the reference time td has passed following the change of output torque of the electric motor 12 at Step SS106, SS117, or SS119, it is judged at Step SS112 and the following steps whether the changed output torque is an appropriate creep torque. Thus, the magnitude or amplitude of change (i.e., increase and decrease) of the creep torque is effectively reduced, and accordingly the pulsation of the vehicle is effectively restrained. Moreover, since the learning-control data lg or second data map is updated only when the vehicle has satisfied a prescribed condition, the degree of accuracy of "learning" of the data lg, i.e., updating of the second data map is improved.

In the fourth embodiment, Steps SS112, SS113, SS117, and SS119 and a portion of the computer 54 for implementing those steps cooperate with each other to function as the torque adjusting means; and Step SS116 and a portion of the computer 54 for implementing Step SS116 cooperate with each other to function as the data updating means.

There will be described the fifth embodiment of the present invention by reference to the flow charts of FIGS. 17 and 18. The fifth embodiment relates to a drive system of an electric vehicle which system has the same hard-ware construction as that of the third embodiment shown in FIG. 12. The same reference numerals as used for the third embodiment are used for reference to the corresponding parts or elements of the fifth embodiment.

Figure 17:
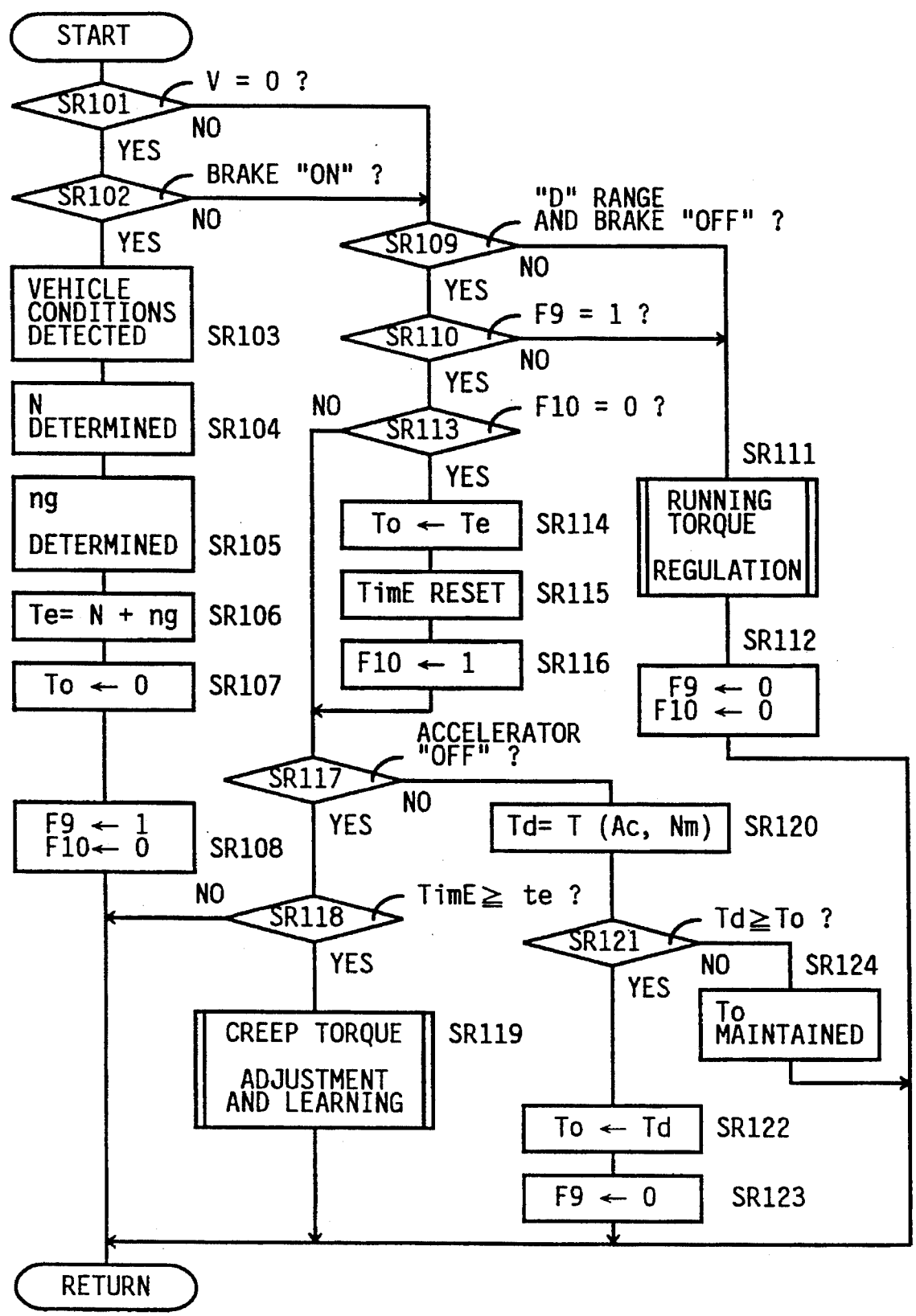
FIG. 17 is a flow chart representing a control program used by a different drive system as the fifth embodiment of the present invention, for regulating the driving force of an electric vehicle.
Figure 18:
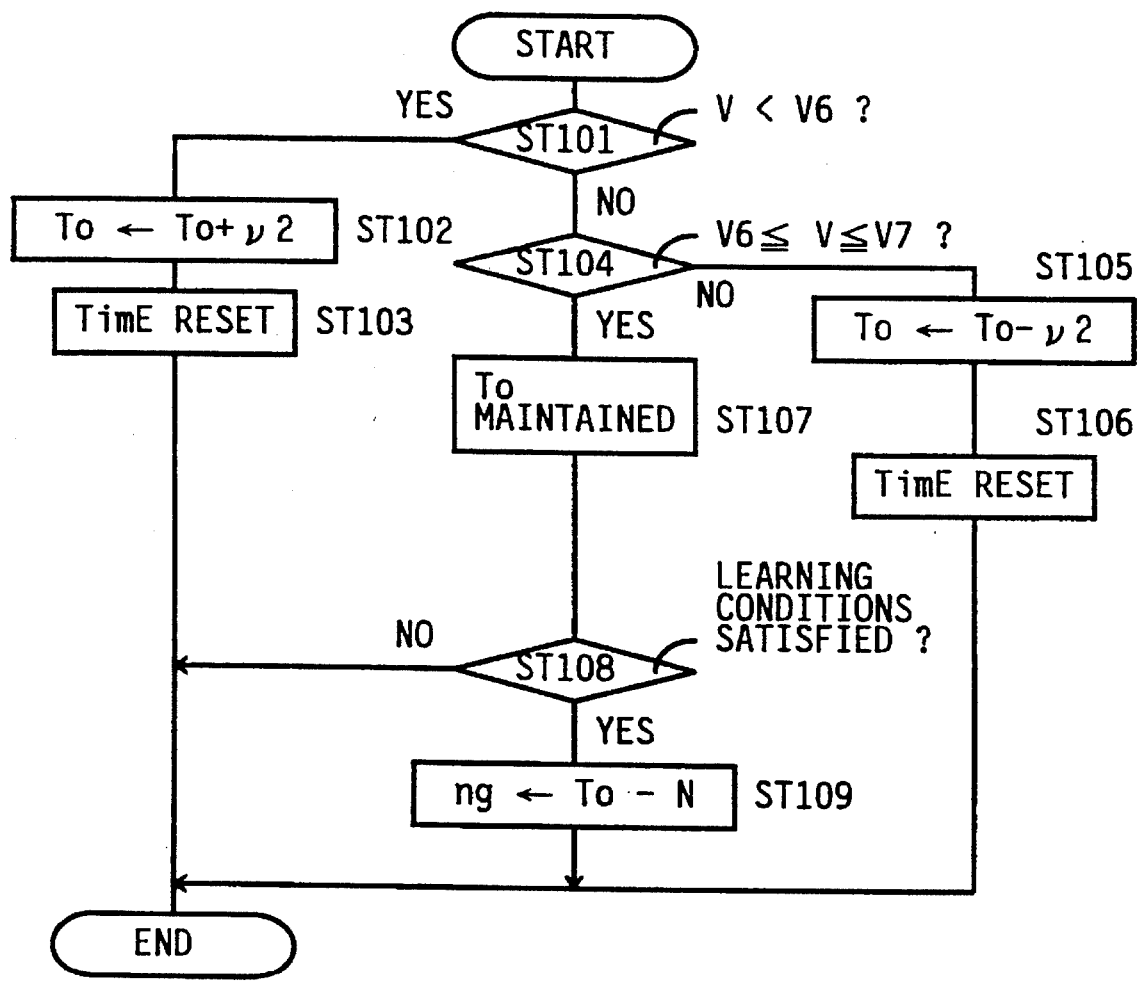
FIG. 18 is a flow chart representing a control program implemented at Step SR119 of FIG. 17.

However, for the fifth embodiment, the control program represented by the flow charts of FIGS. 17 and 18 is employed in place of the control program represented by the flow charts of FIGS. 13 and 14 for the third embodiment.

The program represented by the flow charts of FIGS. 17 and 18 is provided for regulating the output torque of the electric motor 12 to a creep torque after the brake pedal has been released ("OFF"). The flow chart of FIG. 17 is similar to the flow chart of FIG. 9 but is different from the latter in that Step SR4 of FIG. 9 is divided into Steps SR104 and SR105 of FIG. 17, that Step SR7 of FIG. 9 is not employed in the flow chart of FIG. 17, and that Step SR20 of FIG. 9 is replaced with Steps SR120 through SR124. The flow chart of FIG. 18 is the same as the flow chart of FIG. 10. However, in the flow charts of FIGS. 17 and 18, different symbols, N, ng, Te, F9, F10, TimE, te, $V_6$, $V_7$, and $v_2$, are used in place of symbols, K, kg, Tc, F4, F5, TimB, tb, $V_3$, $V_4$, and δ, used in the flow charts of FIGS. 9 and 10.

First, at Step SR101 of FIG. 17, the CPU 56 of the motor control computer 54 judges whether the current running speed V of the vehicle is zero. If a positive judgment is made at Step SR101, the control of the CPU 56 proceeds with Step SR102 to judge whether the brake pedal is currently depressed ("ON") for braking the vehicle. If a positive judgment is made at Step SR102, the control proceeds with Step SR103 and the following steps. At Step SR103, the CPU 56 detects, as the current conditions of the vehicle, the current angle θ of inclination of the vehicle based on the signal Sθ supplied from the θ sensor 72, and additionally the current weight M of the vehicle based on the signal SM supplied from the M sensor 178. Step SR103 is followed by Steps SR104 and SR105 to respectively determine a basic creep-torque value, N, and a learning-control value, ng, based on the vehicle conditions θ, M detected at Step SR103. For the determination of the value N at Step SR104, is used a first data map pre-stored in the ROM 60 which map defines a relationship between (1) basic creep-torque value N and (2) (2a) inclination angle θ and (2b) vehicle weight M, so that on an upgrade road surface the vehicle will not be dragged backward because of its weight M even if the brake pedal is released ("OFF") and so that on a flat road surface the vehicle will be driven forward at a creep speed. Similarly, for the determination of the value ng at Step SR105, is used a second data map pre-stored in the RAM 58 which map defines a relationship between (3) learning-control value ng and (2) (2a) inclination angle θ and (2b) vehicle weight M. The second data map is updated at Step ST109 of FIG. 18. At the following Step SR106, the CPU 56 sums the values N and ng and stores the obtained value (N+ng) as a final-target torque, Te, in the RAM 58. Step SR106 is followed by Step SR107 to set zero as the target output torque To and regulate the output torque of the electric motor 12 to the target torque To, i.e., zero. Subsequently, at Step SR108, the CPU 56 sets a flag, F9, to F9=1 and a flag, F10, to F10=0. Thus, in the fifth embodiment, the electric motor 12 is not controlled to produce a creep torque while the brake pedal is depressed ("ON"). However, it is possible that with the brake pedal being depressed ("ON"), the output torque of the electric motor 12 be regulated to, as the target torque To, a creep torque which may be the final-target torque Te.

In the case where a negative judgment is made at either Step SR101 or Step SR102, the control of the CPU 56 goes to Step SR109 to judge whether the shift lever is currently operated to the D (drive) range, and additionally whether the brake pedal is currently not depressed ("OFF"). If a negative judgment is made at Step SR109, the control proceeds with Step SR111 to effect a running torque regulation identical with that effected at Step S114 of the third embodiment. Step SR111 is followed by Step SR112 to set the flags F9 and F10 to F9=0 and F10=0, respectively. On the other hand, if a positive judgment is made at Step SR109, the control goes to Step SR110 to judge whether the flag F9 is set at F9=1. In the case where the flag F9 is set at F9=1 because the current control cycle is one immediately after Step SR103 and the following steps have been implemented, the control goes to Step SR113 and the following steps.

At Step SR113, the CPU 56 judges whether the flag F10 is set at F10=0. If a negative judgment is made at Step SR113, the control goes to Step S117 and the following steps. In the case where the flag F10 is set at F10=0 in the control cycle immediately after Step SR103 and the following steps have been implemented, a positive judgment is made at Step SR113, and the control goes to Step SR114 to update the target torque To by replacing the value To with the final-target torque, i.e., creep torque Te (=K+kg) determined at Step SR105 and regulate the output torque of the electric motor 12 to the value To, i.e., value Te (=K+kg). Thus, the electric motor 12 is controlled to produce a creep torque such that on an upgrade road surface the vehicle is effectively prevented from being dragged backward due to its weight, and such that on a flat road surface the vehicle is driven forward at a creep speed. Like Steps SS6 to SS10 of FIG. 16 in the fourth embodiment, it is possible to gradually increase the output torque of the electric motor 12 up to the final-target torque Te by incrementing the target torque To.

Step SR114 is followed by Step SR115 to reset a timer, TimE, to zero. At the subsequent Step SR116, the CPU 56 sets the flag F10 to F10=1. Thus, in the following control cycle, the control of the CPU 56 goes to Step SR117 after Step SR113. At Step SR117, the CPU 56 identifies whether the accelerator pedal is not being operated ("OFF"). A positive judgment is made, for example, when the current operation amount Ac is smaller than about several percent of the full operation amount of the accelerator pedal. In this case, the control goes to Step SR118 to judge whether the time counted by the timer TimE has exceeded a prescribed reference value, te. The timer TimE counts the time which has passed after the target torque To is changed at Step SR114, Step ST102, or ST105. The reference value te is pre-selected by taking into consideration a time lag necessary for the running speed V of the vehicle to change in response to the regulation of the output torque of the electric motor 12 to the changed target torque To. As long as a negative judgment is made at Step SR118, that is, till the reference time te is counted up, the target torque To is maintained without any change. Meanwhile, when a positive judgment is made at Step SR118, the control of the CPU 56 goes to Step SR119.

FIG. 18 shows the flow chart representing the series of steps implemented at Step SR119. At Step ST101, the CPU 56 judges whether the current running speed V of the vehicle is smaller than a prescribed reference value, $V_6$. The reference value $V_6$ may be pre-selected at zero or a positive value around zero. Otherwise, the CPU 56 may be adapted to determine the value $V_6$ based on the current condition or conditions of the vehicle including, e.g., the current inclination angle θ. In this case, for an upgrade road surface the value $V_6$ may be determined at zero, and for a flat road surface the value $V_6$ may be determined at a positive value around zero. If a positive judgment is made at Step ST101, the control of the CPU 56 goes to Step ST102 to add a prescribed small value, $v_2$, to the target torque To and increase the output torque of the electric motor 12 by the increment $v_2$. Step ST102 is followed by Step ST103 to reset the timer TimE to zero. On the other hand, if a negative judgment is made at Step ST101, the control of the CPU 56 goes to Step ST104 to judge whether the current vehicle speed V is not smaller than the reference value $V_6$ and simultaneously is not greater than a reference value, $V_7$, which is pre-selected at a value slightly greater than the reference value $V_6$ by taking the degree of accuracy of the torque regulation into consideration. In the case where a negative judgment is made at Step ST104, that is, in the case of $V_7 < V$, the control of the CPU 56 goes to Step ST105 to subtract the small value $v_2$ from the target torque To and decrease the output torque of the electric motor 12 by the decrement $v_2$. Step ST105 is followed by Step ST106 to reset the timer TimE to zero. Thus, the electric motor 12 is controlled to produce such a creep torque which drives the vehicle at a running speed V within the range of $V_6 \leq V \leq V_7$. The small value $v_2$ used at Step ST105 may be different from that used at Step ST102. Otherwise, the CPU 56 may be adapted to determine the value $v_2$ based on, e.g., the difference between the current vehicle speed V and the reference value $V_6$ or $V_7$.

On the other hand, in the case where a positive judgment is made at Step ST104, i.e., in the case of $V_6 \leq V \leq V_7$, the control of the CPU 56 goes to Step ST107 to regulate the output torque of the electric motor 12 at the target torque To maintained without any change. Step ST107 is followed by Step ST108 to judge whether the vehicle has satisfied a prescribed learning condition which may be that a positive judgment is made at Step ST104 successively in a prescribed number of control cycles. If a positive judgment is made at Step ST108, the control of the CPU 56 goes to Step ST9 to newly obtain a learning-control value ng by subtracting the basic creep-torque value N determined at Step SR104, from the current target torque To. At Step ST109, the CPU 56 rewrites the initial learning-control value ng corresponding to the vehicle conditions detected at Step SR103, into the newly obtained learning-control value ng, on the second data map stored in the RAM 58. Thus, the second data map is updated.

Back to FIG. 17, if a negative judgment is made at Step SR117, that is, if the accelerator pedal is depressed ("ON"), the control of the CPU 56 goes to Step SR120 to determine the final-target torque Td based on the current operation amount Ac of the accelerator pedal and the current rotation speed Nm of the motor 12 according to the data map of FIG. 15. Step S120 is followed by Step S121 to judge whether the current target torque To is not greater than the final-target torque Td determined at Step S120. In the case of Td<To, i.e., in the case where a negative judgment is made at Step S121, the control of the CPU 56 goes to Step SR124 to regulate the output torque of the electric motor 12 at the target torque To maintained without any change. On the other hand, in the case of Td≧To, i.e., in the case where a positive judgment is made at Step S121, the control of the CPU 56 goes to Steps S122 to update the target value To by replacing the value To with the final-target torque Td and regulate the output torque of the electric motor 12 to the value To, i.e., final-target torque Td. Subsequently, the control of the CPU 56 goes to Step S123 to set the flag F9 to F9=0. Thus, after Step SR110 in the next control cycle, the CPU 56 implements a running torque regulation at Step SR111.

It emerges from the foregoing description that in the fifth embodiment, the electric motor 12 is controlled to produce and maintain a minimum creep torque necessary to effectively prevent the vehicle from being dragged backward due to its weight M, when the operator releases the brake pedal and subsequently depresses the accelerator pedal for starting the vehicle on an upgrade road surface. Additionally, the second data map used for determining the learning-control value lg at Step SR105 is updated when appropriate. Therefore, any creep torque regulation begins with an appropriate creep torque. Furthermore, while the vehicle is driven on a flat road surface with the brake pedal being released ("OFF"), the electric motor 12 is controlled to produce such a small creep torque which drives the vehicle forward at a creep speed. This arrangement is advantageous in that the vehicle intermittently runs forward simply by repeating the depression and release of the brake pedal, for example, when the vehicle is being involved in a traffic snarl or when the vehicle is being put into a garage. Thus, the operability of the vehicle is improved.

In the fifth embodiment, Steps SR103 to SR105 and SR14 and a portion of the motor control computer 54 for implementing those steps cooperate with each other to function as the torque regulating means for the creep torque regulation; Steps ST101, ST102, ST104, and ST105 and a portion of the computer 54 for implementing those steps cooperate with each other to function as the torque adjusting means for adjusting the creep torque; and Step ST109 and a portion of the computer 54 for implementing Step ST109 cooperate with each other to function as the data updating means for updating the second data map stored in the RAM 58.

Although in the third to fifth embodiments the creep torque regulation is effected while the electric vehicle is driven with the shift lever being operated to the D (drive) range, it is possible to effect the creep torque regulation while the vehicle is driven with the shift lever being operated to the R (reverse) range.

While in the third and fourth embodiments the creep torque regulation is effected while the vehicle satisfies a prescribed condition that the brake pedal is currently depressed ("ON") and the current vehicle speed V is not greater than the reference value $V_5$, it is possible to employ a different creep-torque-regulation starting and/or ending condition. For example, the CPU 56 may be adapted to start a creep torque regulation when the accelerator pedal is released ("OFF"), or when a creep-torque-regulation select switch (not shown) is turned on by the operator. The creep-torque-regulation starting and ending conditions may be different from each other. These apply to the fifth embodiment.

Although in the third and fourth embodiments the creep torque regulation is effected while the brake pedal is depressed ("ON") and in the fifth embodiment the creep torque regulation is effected when the brake pedal is released ("OFF") after having been depressed ("ON"), it is possible to combine the two embodiments so that a creep torque regulation is effected during each of a first period while the brake pedal is being depressed and a second period after the brake pedal has been released. In this case, it is possible to adjust a creep torque and update the second data map based on the adjusted creep torque, in each of the creep torque regulations effected in the first and second periods.

While in the third and fourth embodiments the basic creep-torque value L is determined based on the braking force F, inclination angle θ, and vehicle weight M and in the fifth embodiment the basic creep-torque value N is determined based on the inclination angle θ and vehicle weight M, it is possible to determine a basic creep-torque value L, N based on one or more different parameters by taking a creep-torque-regulation starting and/or ending condition into consideration. For example, the operation amount Ac of the accelerator pedal, rotation resistance of tires (not shown), or other vehicle-condition parameters may be added to the above-indicated parameters. The tire rotation resistance may be detected or estimated based on the relationship between the output torque of the electric motor 12 and the rotation speed of the driving wheel 26L, 26R, the rate of change of the running speed V with respect to the braking force F, etc.

In the case where a common control program or flow chart is used for both the D-range and R-range creep torque regulations, the shift position Sh selected by operating the shift lever may be added as a vehicle-condition parameter to the above-indicated parameters. In this case, with the shift lever being operated to the D range, the first data map provides a basic creep-torque value L, N indicative of a creep torque in a positive direction corresponding to the forward running of the vehicle and, with the shift lever being operated to the R range, the first data map provides a basic creep-torque value L, N indicative of a creep torque in an opposite or reverse direction corresponding to the backward running of the vehicle.

Although in the third to fifth embodiments a creep torque is obtained by summing a basic creep-torque value L, N and a learning-control value lg, ng and only the data lg, ng or second data map is updated when appropriate, it is possible to update the data L, N or first data map without using the first data map. In this case, the data L, N serve as learning-control data.

While in the third to fifth embodiments the basic creep-torque values L, N are stored as a data map in the ROM 60, it is possible, without using any data map, to calculate a basic creep-torque value L, N by employing, e.g., a fuzzy-algorithmic approach wherein various vehicle conditions are used as parameters. In this case, a learning-control value lg, ng is added to the obtained basic creep-torque value L, N. A memory which stores data representative of control formulas and/or membership functions used for the fuzzy-algorithmic approach, serves as the memory which stores data defining the relationship between creep torque and one or more parameters indicative of one or more vehicle conditions.

Figure 19:
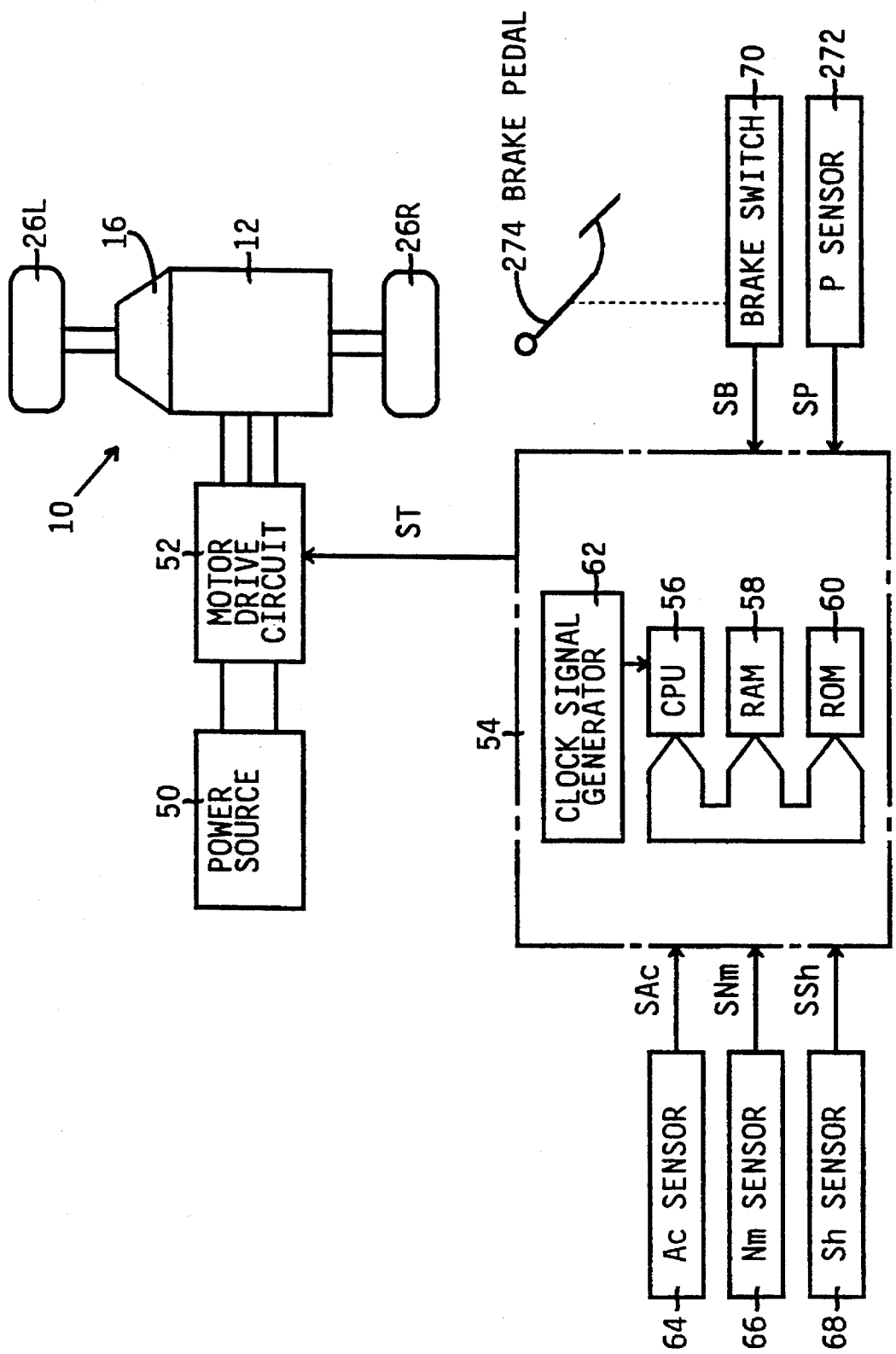
FIG. 19 is a diagrammatic view of a drive system for an electric vehicle as the sixth embodiment of the present invention.

Referring next to FIG. 19, there is illustrated a sixth embodiment of the present invention. The same reference numerals as used in the first embodiment are used for designating the corresponding elements or parts of the sixth embodiment. The sixth embodiment relates to a drive system of an electric vehicle which system has a hard-ware construction generally similar to that of the first embodiment shown in FIG. 1 but different from the latter in that the drive system as the sixth embodiment additionally includes a hydraulic-pressure sensor 272. In FIG. 19, the brake pedal of the vehicle is illustrated, and denoted at 274.

The hydraulic-pressure sensor 272 detects the current braking force, i.e., hydraulic pressure, P, produced in the brake master cylinder (not shown) of the vehicle as a result of operation or depression of the brake pedal 274 by the operator, and generates to the motor control computer 54 a signal, SP, indicative of the detected hydraulic pressure P (hereinafter, referred to as the "P sensor 272"). The brake switch 70 is constituted by, e.g., a limit switch, and identifies whether the brake pedal 274 is being depressed ("ON") from its initial position for operating the brake device (not shown) of the vehicle for braking the vehicle, and generates to the motor control computer 54 the signal SB indicative of the result of identification, i.e., depression ("ON") or release ("OFF"). The brake pedal 274 serves as a brake-device operating member.

Hereinafter there will be described the operation of the motor control computer 54 of the drive system as the sixth embodiment, for regulating the driving force of the electric motor 12, by reference to the flow charts of FIGS. 20, 21 and 22. The control program represented by those flow charts is repetitively implemented at a prescribed cycle time such as several tens of milliseconds (msec).

Figure 20:
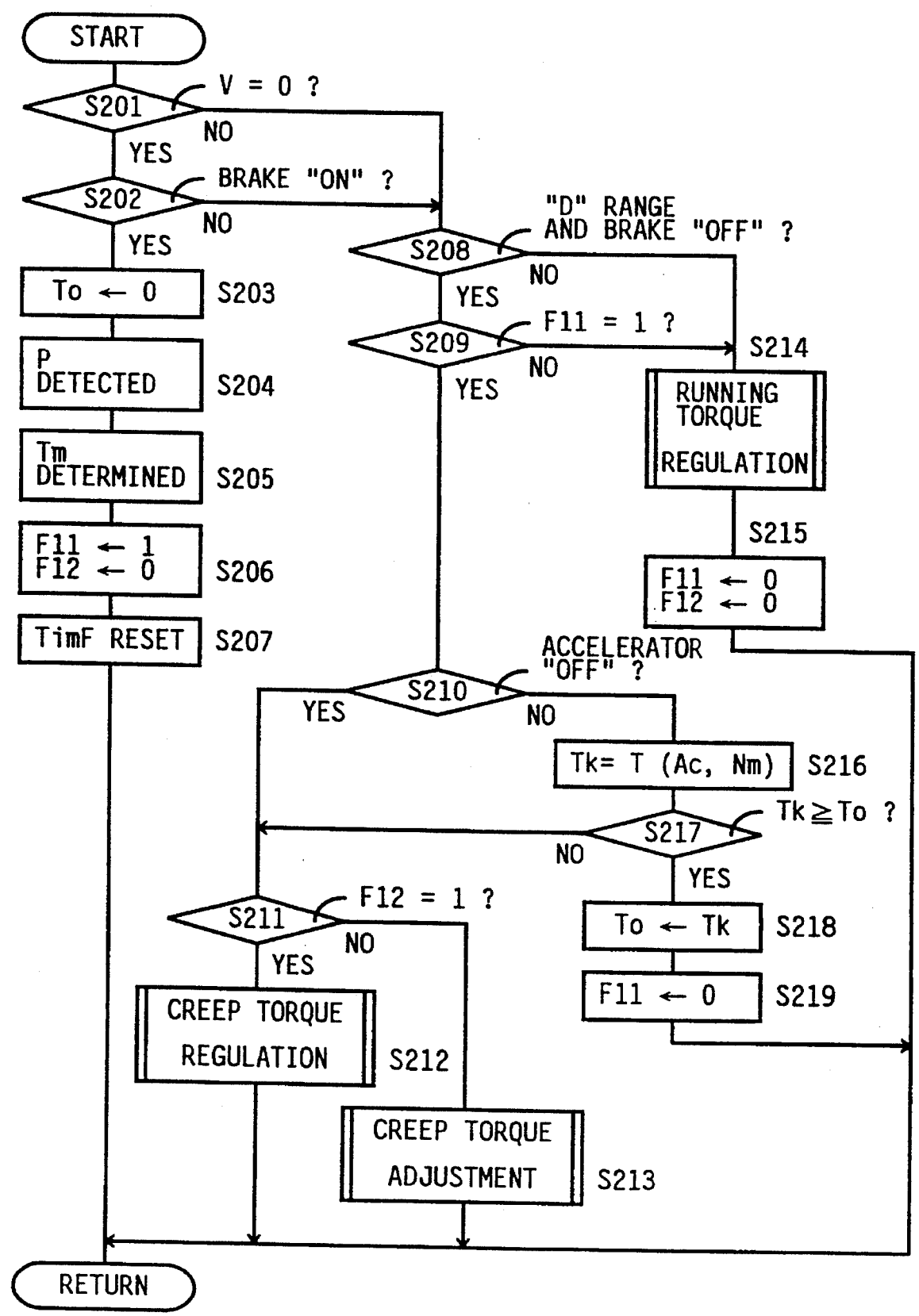
FIG. 20 is a flow chart representing a control program used by the drive system of FIG. 19, for regulating the driving force of the electric vehicle.

First, at Step S201 of FIG. 20, the CPU 56 of the motor control computer 54 judges whether the current running speed V of the vehicle is zero, based on the motor rotation speed Nm represented by the signal SNm supplied from the SNm sensor 66. If a positive judgment is made at Step S201, the control of the CPU 56 proceeds with Step S202 to judge whether the brake pedal 274 is currently depressed ("ON"), based on the signal SB supplied from the brake switch 70. If a positive judgment is made at Step S202, the control proceeds with Step S203 to set zero as the target torque To and generates to the motor control circuit 52 the command signal ST indicative of the target torque To for regulating the output torque of the electric motor 12 to the target torque To, i.e., zero. At the following Step S204, the CPU 56 detects, or reads in, the current hydraulic pressure P represented by the signal SP supplied from the P sensor 272. Step S204 is followed by Step S205 to determine, based on the detected pressure P, a creep torque to which the output torque of the electric motor 12 is regulated and store the determined creep torque as a final-target output torque, Tm, in the RAM 58. The hydraulic pressure P indicates the braking force applied to the brake pedal 274, though the pressure P is variable depending upon the pressure-receiving areas of the wheel cylinders (not shown) and the friction coefficient of the brake lining (not shown). At Step S205, the final-target torque Tm is determined based on the hydraulic pressure P such that the magnitude of the torque Tm is comparable to that of the braking force applied to the brake pedal 274. For the determination of the torque Tm at Step S205, is used an arithmetic expression or a data map pre-stored in the ROM 60 which defines a relationship between creep torque Tm and hydraulic pressure P. The arithmetic expression may be determined based on the pressure-receiving areas of the wheel cylinders, the friction coefficient of the brake lining, the gear ratio of the reduction gear device 16, the diameter of the driving wheels 26L, 26R, etc. The data map may be prepared, and stored in the ROM 60, by utilizing the results obtained from experiments, simulations, etc. Subsequently, at Step S206, the CPU 56 sets a flag, F11, to F11=1 and a flag, F12, to F12=0. Step S206 is followed by Step S207 to reset a timer, TimF, to zero.

If a negative judgment is made at either Step S201 or Step S202, the control of the CPU 56 goes to Step S208 to judge whether the shift lever is currently operated to the D (drive) range based on the shift-position signal SSh, and additionally whether the brake pedal is currently not depressed ("OFF") based on the brake signal SB. If a positive judgment is made at Step S208, the control of the CPU 56 goes to Step S209 to judge whether the flag F11 is set at F11=1. Assuming that the brake pedal 274 is released ("OFF") with the shift lever being operated to the D (drive) range after the vehicle has been stopped as a result of depression ("ON") of the brake pedal 274, and assuming that the current control cycle is one immediately after Step S206 has been implemented to set the flag F11 to F11=1, a positive judgment is made at both Step S208 and Step S209. Therefore, the control of the CPU 56 goes to Step S210 and the following steps. On the other hand, if a negative judgment is made at Step S208, the control proceeds with Step S214 to effect a running torque regulation wherein the CPU 56 determines a final-target output torque, Tk, based on the current operation amount Ac of the accelerator pedal and the current rotation speed Nm of the electric motor 12, according to a data map similar to the data map of FIG. 15 used in the third embodiment, and generates the command signal ST indicative of the determined value Tk as the target torque To for regulating the output torque of the electric motor 12 to the target torque To, i.e., value Tk. Meanwhile, when the vehicle satisfies a prescribed condition, the CPU 56 generates to the drive circuit 52 the command signal ST indicative of a regulated regenerative braking torque, so that the electric motor 12 produces the regulated braking torque, like the engine brake of an internal-combustion engine for an automotive vehicle, and so that the power source 50 is charged with the electric energy corresponding to the braking torque of the electric motor 12. Step S214 is followed by Step S215 to set the flags F11 and F12 to F11=0 and F12=0, respectively.

At Step S210, the CPU 56 identifies whether the accelerator pedal is not depressed, i.e., is released ("OFF"), based on the signal SAc supplied from the Ac sensor 64. If a positive judgment is made at Step S210, the control of the CPU 56 goes to Step S211 to judge whether the flag F12 is set at F12=0. Assuming that the flag F12 has been set to F12=0 at Step S206, the control goes to Step S212.

Figure 21:
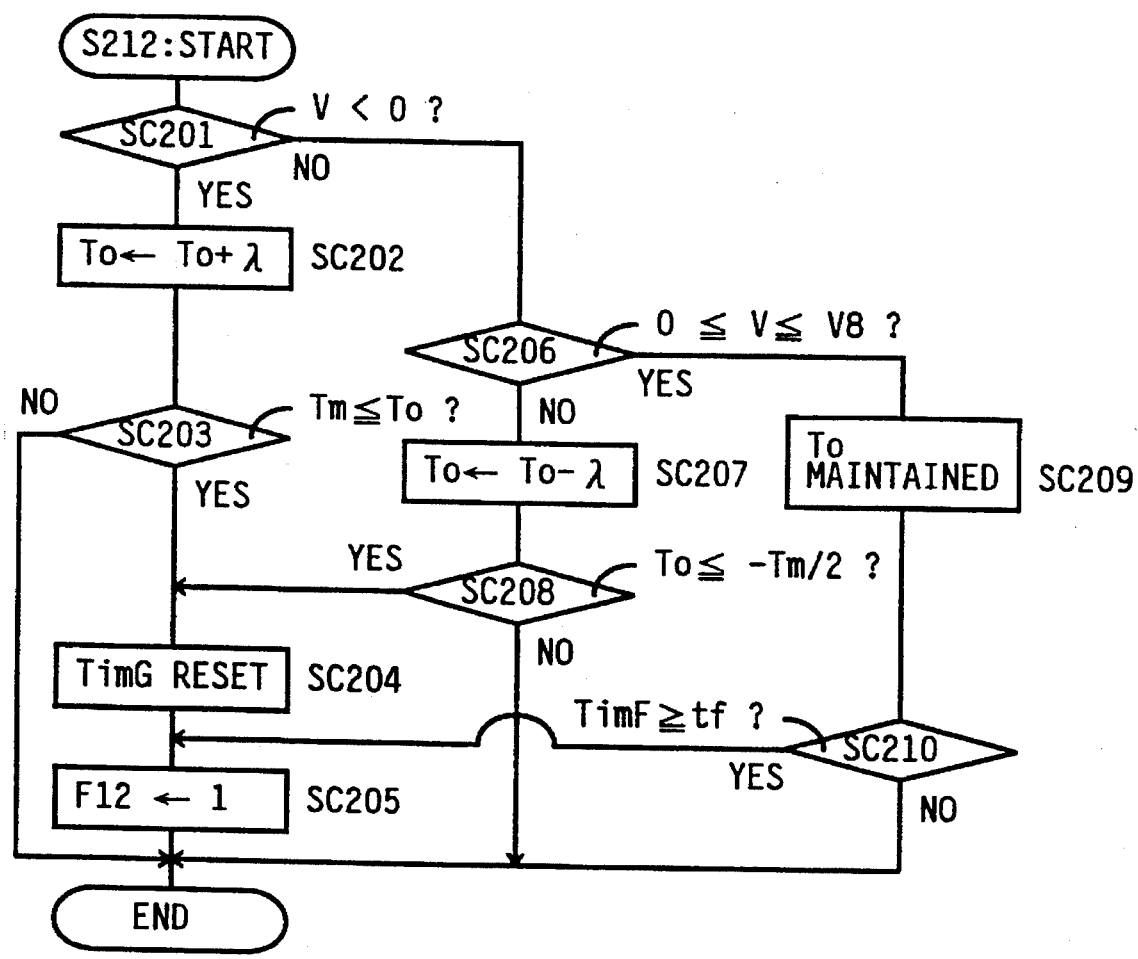
FIG. 21 is a flow chart representing a control program implemented at Step S212 of FIG. 20.
Figure 22:
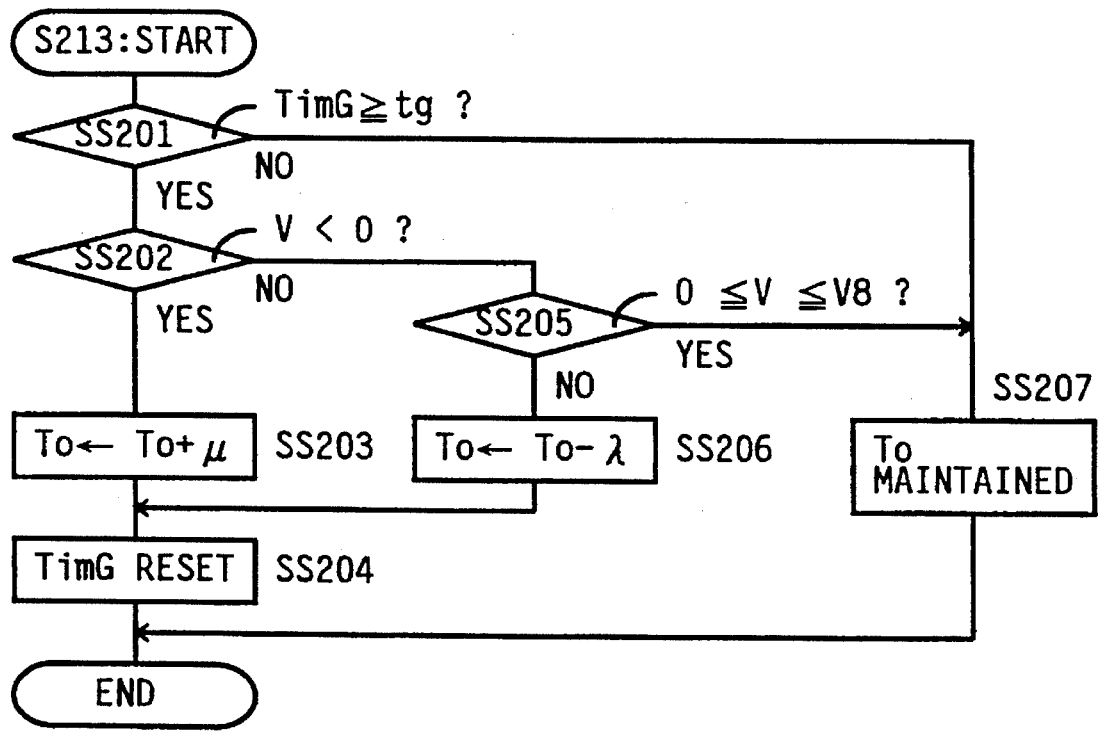
FIG. 22 is a flow chart representing a control program implemented at Step S213 of FIG. 20.

FIG. 21 shows the flow chart representing the control program implemented at Step S212 of FIG. 20. First, at Step SC201, the CPU 56 judges whether the current running speed V of the vehicle is negative. In the case where the current vehicle speed V is negative, i.e., in the case where the vehicle is dragged backward upon release ("OFF") of the brake pedal 274 on an upgrade road surface, a positive judgment is made at Step SC201. Then, the control of the CPU 56 goes to Step SC202 to update the target torque To by adding thereto a prescribed small value, λ, and generates to the motor drive circuit 52 the command signal ST indicative of the updated target torque To for increasing the output torque of the electric motor 12 by the increment λ. Step SC202 is followed by Step SC203 to judge whether the target torque To updated at Step SC202 is not smaller than the final-target torque Tm determined at Step S205. If a positive judgment is made at Step SC203, the control of the CPU 56 goes to Step SC204 to reset a timer, TimG, to zero and further to Step SC205 to set the flag F12 to F12=1, so that in the following control cycle according to the flow chart of FIG. 20, the control of the CPU 56 goes to Step S213 following Step S211. Since in the first or initial control cycle according to the flow chart of FIG. 21 the target torque To is usually zero, the target torque To is increased by the increment λ in each control cycle for preventing an abrupt and large change of the output torque of the electric motor 12. When the target torque To is increased up to the final-target torque Tm comparable to the braking force applied for stopping the vehicle, the backward dragging of the vehicle upon release of the brake pedal 274 is effectively prevented. In this case, the target torque To results in producing a driving force to drive the vehicle forward.

On the other hand, if a negative judgment is made at Step SC201, i.e., if the current vehicle speed V is not negative, the control of the CPU 56 goes to Step SC206 to judge whether the speed V is not smaller than zero and simultaneously is not greater than a prescribed reference speed, $V_8$. The reference speed $V_8$ is pre-selected at a positive value around zero by taking into consideration the degree of accuracy of the vehicle speed detection and/or the degree of accuracy of the motor torque regulation. In the case where the current vehicle speed V is greater than the reference value $V_8$, i.e., in the case where the vehicle is dragged forward upon release ("OFF") of the brake pedal 274 on a downgrade road surface, a negative judgment is made at Step SC206. Then, the control of the CPU 56 goes to Step SC207 to update the target torque To by subtracting therefrom the small value $\lambda$ and generate to the motor drive circuit 52 the command signal ST indicative of the updated target torque To for decreasing the output torque of the electric motor 12 by the decrement $\lambda$. Step SC207 is followed by Step SC208 to judge whether the target torque To updated at Step SC207 is not greater than a negative value, $-Tm/2$, as a product of a factor, $-\frac{1}{2}$, and the final-target torque, Tm. If a positive judgment is made at Step SC208, the control goes to Steps SC204 and SC205. Thus, the target torque To is decreased by the decrement $\lambda$ in each control cycle for preventing an abrupt and large change of the output torque of the electric motor 12. When the target torque To is decreased down to the value $-Tm/2$, the forward dragging of the vehicle upon release of the brake pedal 274 is effectively prevented. In this case, the target torque To results in producing a driving force to drive the vehicle backward. In the present embodiment, not a value, $-Tm$, but the value $-Tm/2$ is pre-selected for the purpose of preventing the vehicle from being driven backward on the downgrade road surface upon release of the brake pedal 274. The small value $\lambda$ used at Step SC207 may be different from that used at Step SC202.

In the case where a positive judgment is made at Step SC206, i.e., in the case of $0 \leq V \leq V_8$, the control of the CPU 56 goes to Step SC209 to regulate the output torque of the electric motor 12 at the target torque To maintained without any change. Step SC209 is followed by Step SC210 to judge whether the time counted by the timer TimF has exceeded a prescribed reference time, tf. Since the timer TimF is reset to zero at Step S207 of FIG. 20, the time measured by the timer TimF is substantially equal to the time which has passed after release of the brake pedal 274. The reference time tf is pre-selected by taking into consideration a time lag between release of the brake pedal 274 and actual forward or backward dragging of the vehicle on a downgrade or upgrade road surface. If a positive judgment is made at Step SC210, the control of the CPU 56 goes to Step SC205 to set the flag F12 to F12=1. In the event that the vehicle is not dragged either forward or backward on, e.g., a flat road surface upon release of the brake pedal 274, the target torque To is maintained at zero (i.e., To=0).

Assuming that a negative judgment is made at Step S211 in a control cycle immediately after the flag F12 has been set to F12=1 at Step SC205, the control of the CPU 56 goes to Step S213 to adjust the target torque To so that the vehicle running speed V is decreased down, or increased up, to within the range of $0 \leq V \leq V_8$, irrespective of the individuality and time-wise change of the vehicle and the variation in the braking force applied for stopping the vehicle. The torque adjustment at Step S213 is effected according to the flow chart of FIG. 22.

First, at Step SS201, the CPU 56 judges whether the time counted by the timer TimG has exceeded a prescribed reference time, tg. Since the timer TimG is reset to zero at Step SC204 of FIG. 21 or Step SS204 of FIG. 22 when the target torque To is changed, the time measured by the timer TimG is indicative of the time which has passed after change of the target torque To. The reference time tg is pre-selected by taking into consideration a time lag between change of the target torque To and actual increase or decrease of the vehicle running speed V. So long as a negative judgment is made at Step SS201, the control of the CPU 56 goes to Step SS207 to regulate the output torque of the electric motor 12 at the target torque To maintained without any change. On the other hand, if a positive judgment is made at Step SS201, the control goes to Step SS202 and the following steps.

At Step SS202, the CPU 56 judges whether the current running speed V of the vehicle is negative. If the current vehicle speed V is negative, i.e., if a positive judgment is made at Step SS202, the control of the CPU 56 goes to Step SS203 to update the target torque To by adding thereto a prescribed small value, $\mu$, and generate to the motor drive circuit 52 the command signal ST indicative of the updated target torque To for increasing the output torque of the electric motor 12 by the increment $\mu$. Step SS203 is followed by Step SS204 to reset the timer TimG to zero. On the other hand, if a negative judgment is made at Step SS202, the control of the CPU 56 goes to Step SS205 to judge whether the speed V is not smaller than zero and simultaneously is not greater than the reference speed $V_8$. In the case of $V>V_8$, i.e., in the case where a negative judgment is made at Step SS205, the control of the CPU 56 goes to Step SS206 to update the target torque To by subtracting therefrom the small value $\mu$ and generates to the motor drive circuit 52 the command signal ST indicative of the updated target torque To for decreasing the output torque of the electric motor 12 by the decrement $\mu$. Step SS206 is followed by Step SS204 to reset the timer TimG to zero. On the other hand, in the case where a positive judgment is made at Step SS205, i.e., in the case of $0 \leq V \leq V_8$, the control of the CPU 56 goes to Step SS207 to regulate the output torque of the electric motor 12 at the target torque To maintained without any change. So long as a positive judgment is made at Step SS205, Step SS207 is repeated. Thus, the output torque of the electric motor 12 is regulated so that the vehicle running speed V falls within the range of $0 \leq V \leq V_8$. The small value $\mu$ used at Step SS206 may be different from that used at Step SS203. Otherwise, the CPU 56 may be adapted to determine the value $\mu$ based on the vehicle speed V, or the difference between the vehicle speed V and the reference speed $V_8$.

Back to the flow chart of FIG. 20, if a negative judgment is made at Step S210, that is, if the accelerator pedal is operated ("ON"), the control of the CPU 56 goes to Step S216 to determine the final-target torque Tk based on the current operation amount Ac of the accelerator pedal and the current rotation speed Nm of the motor 12 according to the same data map as used at Step S214. Step S216 is followed by Step S217 to judge whether the target torque To is not greater than the final-target torque Tk determined at Step S216. In the case of Tk<To, i.e., in the case where a negative judgment is made at Step S217, the control of the CPU 56 goes to Step S211 and the following steps. On the other hand, in the case of Tk$\geq$To, i.e., in the case where a positive judgment is made at Step S217, the control of the CPU 56 goes to Steps S218 to update the target value To by replacing the value To with the final-target torque Tk and control the motor drive circuit 52 for regulating the output torque of the electric motor 12 to the value To, i.e., final-target torque Tk. Subsequently, the control of the CPU 56 goes to Step S219 to set the flag F11 to F11=0. Thus, after Step S209 in the next control cycle, the CPU 56 implements a running torque regulation at Step S214.

It emerges from the foregoing description that in the sixth embodiment, the braking force, i.e., hydraulic pressure P is detected when the vehicle is stopped upon depression ("ON") of the brake pedal 274, and the final-target torque Tm is determined based on the detected braking force. Subsequently, upon release ("OFF") of the brake pedal 274, the output torque of the electric motor 12 is regulated to the determined torque Tm. Therefore, in any torque regulation under this situation, the electric motor 12 is controlled to quickly produce an appropriate torque irrespective of the degree of downgrade or upgrade of the road surface and the weight of the vehicle. In contrast to the conventional torque regulating apparatus wherein a torque regulation is effected according to the distance of movement of a vehicle, the present drive system effectively avoids the backward dragging and repetitive forward and backward movements of the vehicle on an upgrade road surface. Since the torque regulation of the electric motor 12 based on the detected braking pressure P is effected upon release of the brake pedal 274, the consumption amount of electric power is minimized, so that the running distance of the vehicle with a unit of electric power is increased.

In the sixth embodiment, the P sensor 272, Steps S201, S202, and S204, and a portion of the motor control computer 54 for implementing those steps cooperate with each other to function as the braking-force detector; and Steps S205, S212, and S213 and a portion of the computer 54 for implementing those steps cooperate with each other to function as the torque regulating means.

The sixth embodiment may be modified by replacing Step S216 through Step S219 of FIG. 20 with Step SR20 of FIG. 9, i.e., the flow chart of FIG. 11 used in the second embodiment. The flow chart of FIG. 11 is obtained by modifying the flow chart of FIG. 6 used in the first embodiment. For this modification, the parameters Tc, TimA, and F1 employed in the flow charts in FIGS. 11 and 6 are replaced with the parameters Tm, TimF, and F11 employed in the flow chart of FIG. 20, respectively. With this modification, the electric vehicle can smoothly start on a highly upgrade road surface.

Next, there will be described the seventh embodiment of the present invention by reference to the flow chart of FIG. 23. The seventh embodiment is generally similar to the sixth embodiment and is different from the latter in that in the seventh embodiment, Step S212 of FIG. 20 is effected according to the control program represented by the flow chart of FIG. 23, in place of the flow chart of FIG. 21 used in the sixth embodiment. In the present embodiment, the drive system additionally includes an inclination-angle sensor (not shown) similar to the θ sensor 72 shown in FIG. 1. The angle sensor detects, like the θ sensor 72, the current inclination angle, θ, of the electric vehicle on a downgrade or upgrade road surface, i.e., degree of downgrade or upgrade of the road surface, with respect to a horizontal plane. Moreover, at Step S204 of FIG. 20, the CPU 56 detects, or reads in, the inclination angle θ in addition to the hydraulic pressure P, and at Step S205 the CPU 56 judges, based on the detected inclination angle θ, whether the road surface on which the vehicle is being driven is upgrade or downgrade. In the case where the road surface is upgrade, the CPU 56 determines a positive value as the torque Tm; and, in the case where the road surface is downgrade, the CPU 56 determines a negative value as the final-target torque Tm. The final-target torque Tm for the upgrade road surface is determined based on the hydraulic pressure P in the same manner as employed in the sixth embodiment; the torque Tm for the downgrade road surface is determined such that, for a same pressure P, the absolute value of each torque Tm for the downgrade road surface is half that of the corresponding value Tm for the upgrade road surface; and the torque Tm is zero for the flat road surface for which the inclination angle θ is zero.

Figure 23:
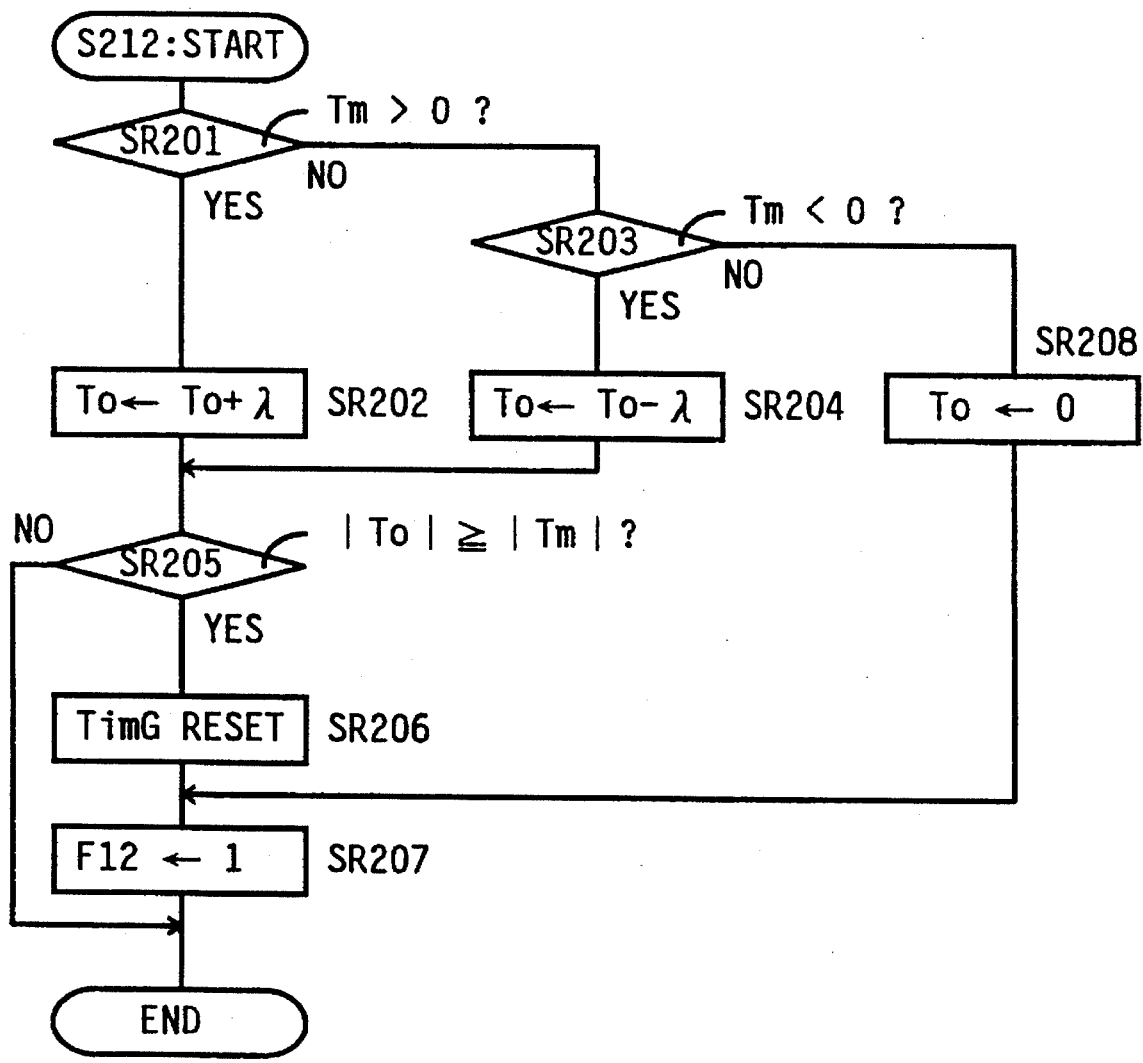
FIG. 23 is a flow chart representing a different control program implemented at Step S212 of FIG. 20, in the seventh embodiment of the present invention.

At Step SR201 of FIG. 23, the CPU 56 judges whether the final-target torque Tm determined at Step S205 is positive. If an affirmative judgment is made at Step SR201, the control of the CPU 56 goes to Step SR202 to increase the target torque To, i.e., the output torque of the electric motor 12 by the prescribed small value λ. Step SR202 is followed by Step SR205 to judge whether the absolute value of the target torque To is not smaller than the absolute value of the final-target torque Tm. If a positive judgment is made at Step SR205, the control of the CPU 56 goes to Step SR206 to reset the timer TimG to zero and further to Step SR207 to set the flag F12 to F12=1. On the other hand, if a negative judgment is made at Step SR201, the control of the CPU 56 goes to Step SR203 to judge whether the final-target torque Tm determined at Step S205 is negative. If an affirmative judgment is made at Step SR203, the control goes to Step SR204 to decrease the target torque To, i.e., the output torque of the electric motor 12 by the small value λ. Step SR204 is followed by Step SR205. If a positive judgment is made at Step SR205, the control of the CPU 56 goes to Steps SR206 and SR207. Otherwise, if a negative judgment is made at Step SR203, i.e., if the torque Tm is zero (i.e., Tm=0), the control of the CPU 56 goes to Step SR208 to change the target torque To to zero (To=0) and further to Step SR207 to set the flag F12 to F12=1.

Figure 24:
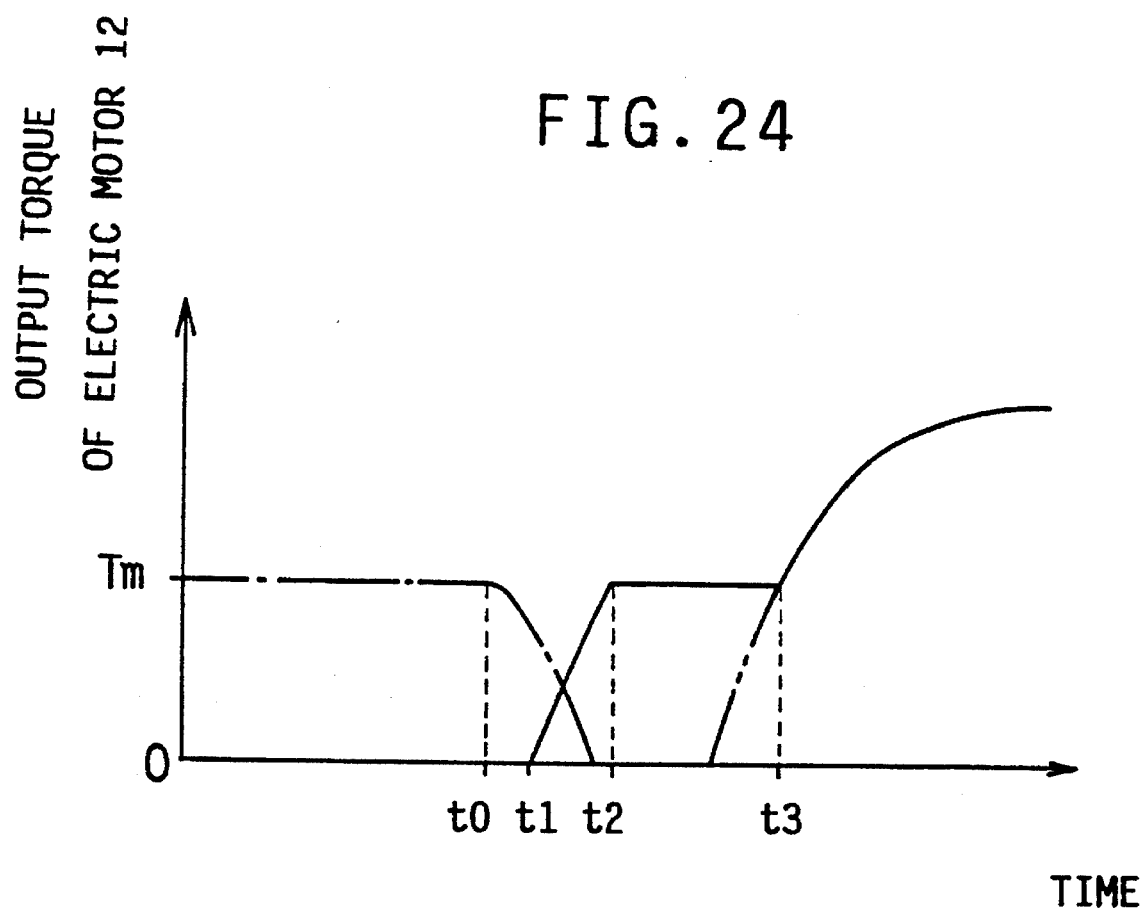
FIG. 24 is a graph showing the time-wise change of the output torque of an electric motor according to the control program of FIG. 23.

In the seventh embodiment, upon release of the brake pedal 274, the CPU 56 immediately starts the torque regulation of the electric motor 12 to the final-target torque Tm. Therefore, the present drive system more effectively prevents the backward dragging of the vehicle on the upgrade road surface, than the drive system as the sixth embodiment which does not start the torque regulation of the electric motor 12 so long as the vehicle running speed V falls within a prescribed range. FIG. 24 is a graph showing a time-wise change of the output torque of the electric motor 12 in the case where the vehicle is started after having been stopped on an upgrade road surface. In the graph, a curve indicated in one-dot chain line represents the time-wise change of the braking force (i.e., hydraulic pressure P) in terms of the output torque of the motor 12, and a time, $t_o$, indicates the time of release ("OFF") of the brake pedal 274. A curve in solid line represents the actual, time-wise change of the output torque of the motor 12, and a time period between a regulation-start time, $t_1$, and a time, $t_2$, indicates the time period during which the output torque of the motor 12 is increased by the increments λ at Step SR202. A time period between the brake-off time $t_o$ and the regulation-start time $t_1$ indicates a delay of response of the electric motor 12. Since the output torque of the motor 12 starts increasing before the braking force or hydraulic pressure P has reduced to zero, the backward dragging of the vehicle is effectively prevented. A curve in two-dot chain line represents the timewise change of the output torque of the motor 12 in the case where the torque regulation of the motor 12 is effected based on the operation amount Ac of the accelerator pedal 274 at Steps S210 to S219 of FIG. 20. A time, $t_3$, indicates when the CPU 56 actually starts increasing the output torque of the motor 12 based on the accelerator operation amount Ac.

While in the sixth and seventh embodiments the drive system is adapted to prevent the vehicle from being dragged forward on a downgrade road surface, by controlling the electric motor 12 to produce an output torque corresponding to a driving force to drive the vehicle backward, this torque control or regulation may be omitted because the forward dragging of the vehicle on the downgrade road surface is not very problematic with respect to the operability of the vehicle. The absolute value of each torque Tm for the downgrade road surface may be other than half that of the corresponding value Tm for the upgrade road surface.

Although in the sixth and seventh embodiments the output torque of the electric motor 12, i.e., target torque To is adjusted at Step S213 so that the vehicle running speed V is maintained at around zero, Step S213 may be omitted.

Based on the target torque To when the vehicle running speed V actually becomes around zero as a result of the adjustment of the torque To at Step S213, it is possible to correct or update the data map (stored in the ROM 60) which defines the relationship between motor output torque Tm and hydraulic pressure P, or prepare a correcting map used for correcting the final-target torque Tm determined at Step S205. In those cases, in a subsequent control cycle, the CPU 56 may determine the final-target torque Tm according to the updated data map at Step S205, or correct the torque Tm determined at Step S205, by utilizing the prepared correcting map. Those arrangements are advantageous in improving the degree of accuracy of the motor torque regulation independently of the variation in the braking forces applied by different operators.

While in the sixth and seventh embodiments the target torque To is set at zero when the vehicle is stopped with the brake pedal 274 being depressed ("ON"), it is possible to control the electric motor 12 to produce a small output torque for adding to the braking force applied to the brake pedal 274.

Although in the sixth and seventh embodiments the torque regulation at Step S212 is effected based on the braking force applied to the brake pedal 274, it is possible to effect the torque regulation based on a braking force applied to the parking brake of the vehicle, which may be detected as, e.g., the tension of the cable of the parking brake.

While in the sixth and seventh embodiments the final-target torque Tm is determined to be comparable to the braking force, as shown in the graph of FIG. 24, it is possible to adapt the CPU 56 to determine, based on a braking force, a final-target torque Tm slightly smaller than a torque just comparable to the braking force, because generally a braking force is greater than a minimum force necessary to prevent the forward or backward dragging of the vehicle.

While in the sixth and seventh embodiments the target torque To is gradually increased or decreased at Step SC202 or Step SC207, and Step SR202 or SR204, respectively, these steps may be omitted. That is, the final-target torque Tm, $-Tm/2$ may directly be set as the target value To. Meanwhile, for preventing the backward dragging of the vehicle on, e.g., an upgrade road surface while simultaneously avoiding a shock due to the change of motor output torque, it is possible to adapt the CPU 56 to immediately increase the output torque of the electric motor 12 up to 80% of the final-target torque Tm and subsequently gradually increase it to the torque Tm.

Although in the sixth and seventh embodiments the final-target torque Tm is determined based mainly on the hydraulic pressure P, one or more other vehicle conditions such as the inclination angle $\theta$ or the vehicle weight may additionally be used for determining the final-target torque Tm, or correcting the determined torque Tm.

Although in the sixth and seventh embodiments the torque regulation at Step S212 is effected while the electric vehicle is driven with the shift lever being operated to the D (drive) range, it is possible to effect a similar torque regulation while the vehicle is driven with the shift lever being operated to the R (reverse) range.

Figure 25:
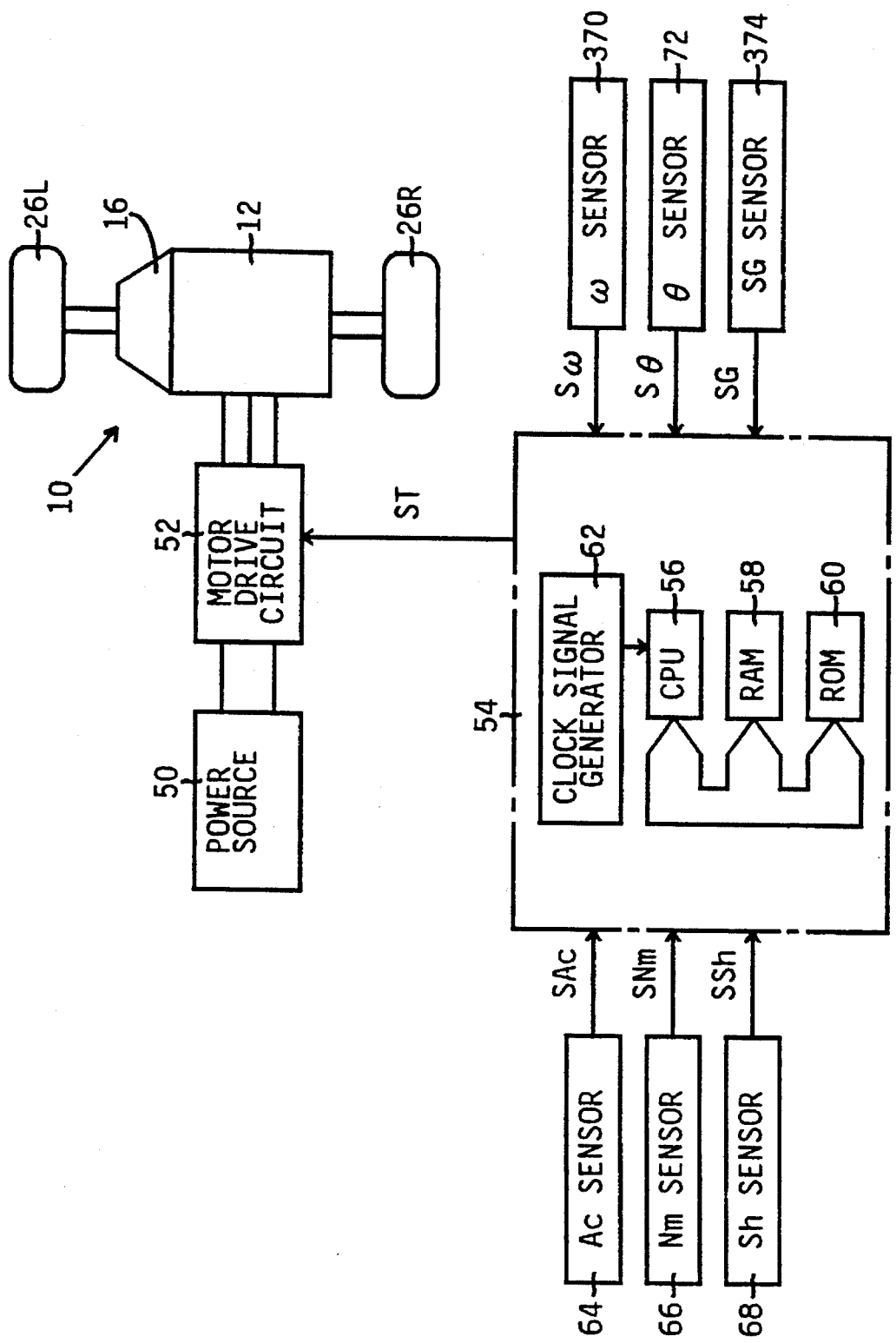
FIG. 25 is a diagrammatic view of a drive system for an electric vehicle as the eighth embodiment of the present invention.

Referring next to FIG. 25, there is illustrated a eighth embodiment of the present invention. The same reference numerals as used in the first embodiment are used for designating the corresponding elements or parts of the eighth embodiment. The eighth embodiment relates to a drive system of an electric vehicle which system has a hard-ware construction generally similar to that of the first embodiment shown in FIG. 1 but different from the latter in that the drive system as the eighth embodiment additionally includes a steering-angle sensor 370 and a mode-select switch 374.

The steering-angle sensor 370 detects the current angle, $\omega$, of steering of the steering wheel (not shown) of the vehicle, and generates to the motor control computer 54 a signal, $S\omega$, indicative of the detected steering angle $\omega$ (hereinafter, referred to as the "$\omega$ sensor 370"). The $\omega$ sensor 370 is constituted by, e.g., a rotary encoder which detects, as the steering angle $\omega$, the amount of rotation of the steering shaft (not shown) of the vehicle from an initial position thereof where the vehicle is driven straightly forward or backward. The mode-select switch 374 is manually operable for selecting a "GARAGE" mode suitable for putting the vehicle into a garage, and generates to the motor control computer 54 a mode signal, SG, indicative of whether the GARAGE mode has been selected. The mode-select switch 374 is provided in the neighborhood of the operator's seat, for example, mounted on the shift lever. The switch 374 is constituted by, e.g., a push button which generates the "ON" signal SG while being pushed and the "OFF" signal SG while not being pushed.

Hereinafter there will be described the operation of the motor control computer 54 of the drive system as the eighth embodiment, for regulating the driving force of the electric motor 12, by reference to the flow charts of FIG. 26. The control program represented by the flow chart is repetitively implemented at a prescribed cycle time such as several tens of milliseconds (msec).

Figure 26:
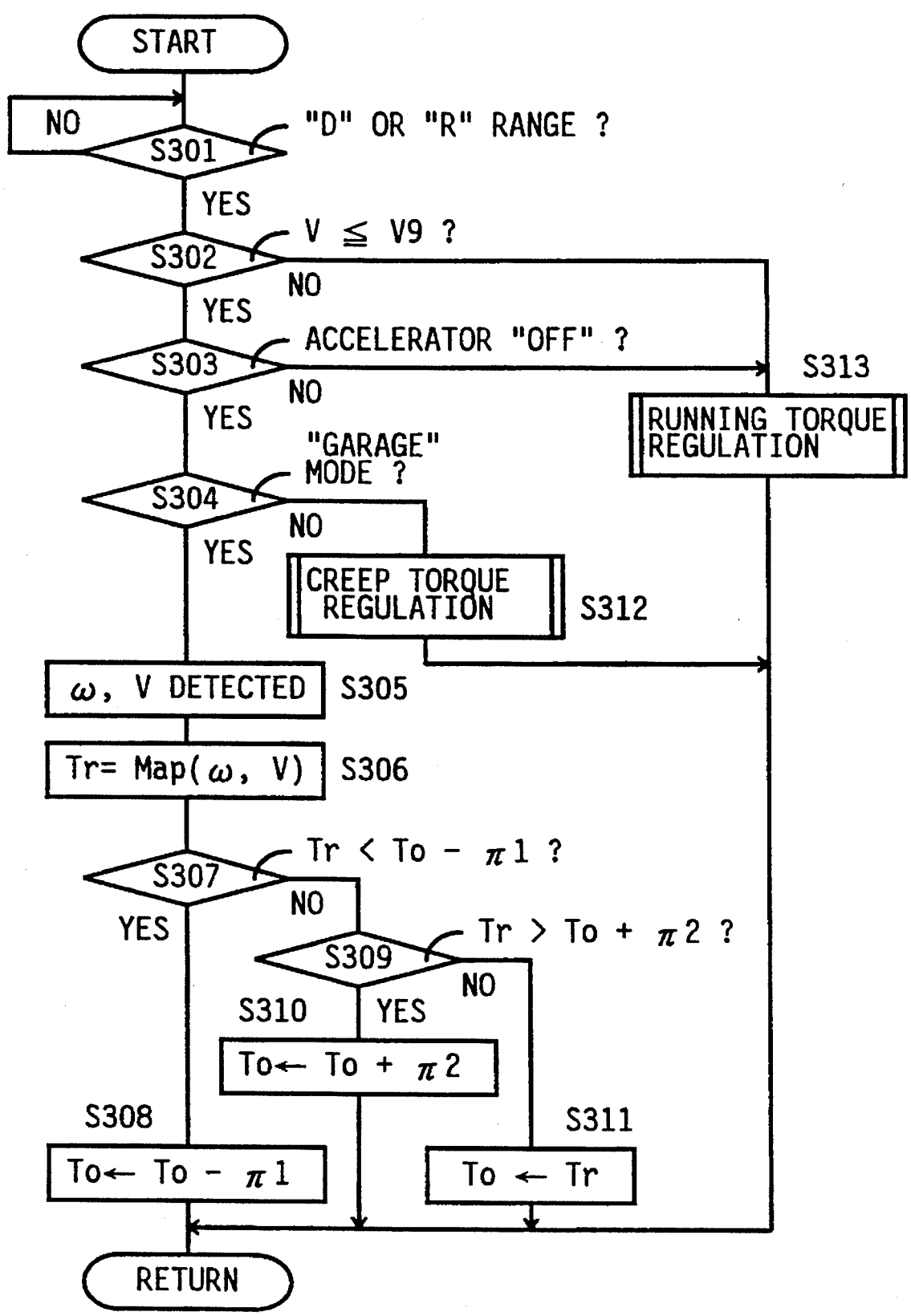
FIG. 26 is a flow chart representing a control program used by the drive system of FIG. 25, for regulating the driving force of the electric vehicle.

First, at Step S301 of FIG. 26, the CPU 56 of the motor control computer 54 judges whether the shift lever is currently operated to the D (drive) range or R (reverse) range, based on the shift-position signal SSh supplied from the Sh sensor 68. If a positive judgment is made at Step S301, the control of the CPU 56 proceeds with Step S302 to judge whether the current running speed V of the vehicle is not greater than a prescribed reference value, $V_9$, based on the signal SNm supplied from the Nm sensor 66. The reference value $V_9$ is pre-selected at, for example, several kilometers per hour. If a positive judgment is made at Step S302, the control of the CPU 56 goes to Step S303 to judge whether the accelerator pedal currently is not depressed ("OFF"), based on the signal SAc supplied from the Ac sensor 64. A positive judgment is made at Step S303 when the operation amount of the accelerator pedal is smaller than, e.g., several percent of the full operation amount thereof. If a positive judgment is made at Step S303, the control of the CPU 56 proceeds with Step S304 and the following steps. Meanwhile, if a negative judgment is made at Step S301, Step S301 is repeated. If a negative judgment is made at either Step S302 or Step S303, the control goes to Step S313. At Step S313, the CPU 56 determines a final-target output torque, Tp, based on the current operation amount Ac of the accelerator pedal and the current rotation speed Nm of the electric motor 12, according to a first data map similar to the data map of FIG. 15 used in the third embodiment, and generates the command signal ST indicative of the determined value Tp as the target torque To for regulating the output torque of the electric motor 12 to the target torque To, i.e., value Tp. Meanwhile, when the vehicle satisfies a prescribed condition, the CPU 56 generates to the drive circuit 52 the command signal ST indicative of a regulated regenerative braking torque, so that the electric motor 12 produces the braking torque, like the engine brake of an internal-combustion engine for an automotive vehicle, and so that the power source 50 is charged with the electric energy corresponding to the braking torque of the electric motor 12.

If a positive judgment is made at each of Steps S302 and S303, the control of the CPU 56 goes to Step S304 as described above. At Step S304, the CPU 56 judged whether the GARAGE mode has been selected, based on the mode signal SG supplied from the mode-select switch 374. If a positive judgment is made at Step S304, the control of the CPU 56 goes to Step S305 and the following steps. On the other hand, if a negative judgment is made at Step S304, the control goes to Step S312 to effect a normal creep torque regulation wherein the CPU 56 determines a creep torque in the same manner as used at Step S4 of FIG. 4 in the first embodiment. Specifically, the CPU 56 determines a final-target output torque, Tq, according to a second data map similar to the data map of FIG. 7 used at Step S4 of FIG. 4, based on the current rotation speed Nm of the electric motor 12 and the current inclination angle, θ, of the electric vehicle on a downgrade, flat, or upgrade road surface, and generates to the motor drive circuit 52 the command signal ST indicative of the determined final-target torque Tq as the target torque To for regulating the electric motor 12 to the target torque To, i.e., final-target torque Tq. In the case where the inclination angle θ is small, i.e., where the road surface on which the vehicle is being driven is downgrade, flat, or lowly upgrade, the CPU 56 selects the map or curve MA out of the three curves MA, MB, and MC shown in the graph of FIG. 7, and determines the final-target torque Tq according to the selected curve MA. In the case where the inclination angle θ is intermediate, i.e., where the road surface is intermediately or moderately upgrade, the CPU 56 selects the curve MB from the three curves MA, MB, and MC and determines the final-target torque Tq according to the selected curve MB. In the case where the inclination angle θ is great, i.e., where the road surface is highly upgrade, the CPU 56 selects the curve MC from the three curves MA, MB, and MC and determines the final-target torque Tq according to the selected curve MC. Thus, the present drive system produces an appropriate creep torque which results in preventing the electric vehicle from being dragged forward or backward on any downgrade or upgrade road surface. The negative portions of the three curves MA, MB, MC of FIG. 7 with respect to the motor output torque Tb (for the first embodiment; or Tq for the eighth embodiment) indicate the previously-described regenerative braking torques which result in reducing the rotation speed Nm of the electric motor 12. With the shift lever being operated to the R (reverse) range, the CPU 56 sets zero as the final-target torque Tq (i.e., Tq=0) and does not effect a creep torque regulation.

Figure 27:
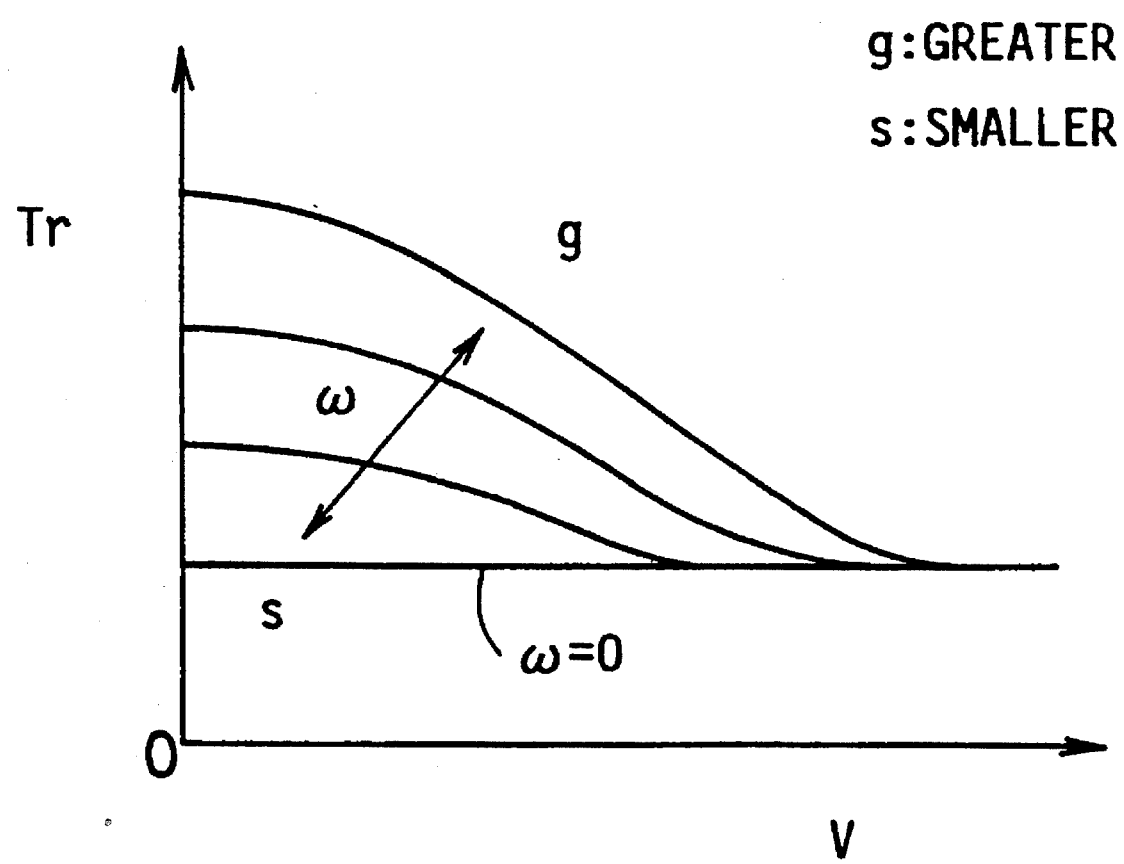
FIG. 27 is a graph showing a map used at Step S306 of FIG. 26.

On the other hand, if a positive judgment is made at Step S304, the control of the CPU 56 goes to Step S305 to read in the current steering angle ω from the steering-angle signal Sω supplied by the Sω sensor 370, and determine the current vehicle speed V based on the rotation speed Nm of the electric motor 12 represented by the signal SNm supplied from the Nm sensor 66. Step S305 is followed by Step S306 to determine a final-target output torque, Tr, according to a third data map pre-stored in the ROM 60, based on the read-in steering angle ω and determined vehicle speed V. As shown in the graph of FIG. 27, the third data map defines the output torque Tr such that a greater output torque Tr corresponds to a greater steering angle ω or a smaller vehicle speed V, so that the vehicle can run, when being driven on a flat road surface, against a great running resistance exerted to the vehicle because of a great steering angle ω. The third data map is prepared by using the results obtained from experiments, simulations, etc. With the shift lever being operated to the D (drive) or R range, the CPU 56 determines a positive or a negative final-target output torque Tr each with a same absolute value, respectively, for a same steering angle ω and a same vehicle speed V. The third data map shown in FIG. 27 may be adapted such that the motor rotation speed Nm is used as the parameter in place of the vehicle running speed V.

Step S306 is followed by Step S307 to judge whether the final-target torque Tr determined at Step S306 is smaller than a value, (To−$\pi_1$), obtained by subtracting a prescribed small value, $\pi_1$, from the target torque To. If a positive judgment is made at Step S307, the control of the CPU 56 goes to Step S308 to update the target torque To by subtracting the small value $\pi_1$ from the target torque To and generate the command signal ST indicative of the updated target torque To for decreasing the output torque of the electric motor 12 by the decrement $\pi_1$. The decrement $\pi_1$ is pre-selected at a value which results in changing or decreasing the output torque of the electric motor 12 without causing a shock in the vehicle. Thus, the vehicle effectively avoids an abrupt and large change of the output torque of the electric motor 12. As Steps S307 and S308 are repeated, the output torque of the motor 12 is smoothly decreased to the final-target torque Tr.

On the other hand, if a negative judgment is made at Step S307, i.e., if the final-target torque Tr is not smaller than the value (To−$\pi_1$), the control of the CPU 56 goes to Step S309 to judge whether the final-target torque Tr is greater than a value, (To+$\pi_2$), obtained by adding a prescribed small value, $\pi_2$, to the target torque To. If a positive judgment is made at Step S309, the control of the CPU 56 goes to Step S310 to update the target torque To by adding the small value $\pi_2$ to the target torque To and generate the command signal ST indicative of the updated target torque To for increasing the output torque of the electric motor 12 by the increment $\pi_2$. The increment $\pi_2$ is pre-selected at a value which results in changing or increasing the output torque of the electric motor 12 without causing a shock in the vehicle. Thus, the vehicle effectively avoids an abrupt and large change of the output torque of the electric motor 12. As Steps S309 and S310 are repeated, the output torque of the motor 12 is smoothly increased to the final-target torque Tr. The small values $\pi_1$, $\pi_2$ may be equal to each other. Meanwhile, in the case where a negative judgment is made at each of Steps S307 and S309, i.e., in the case of (To−$\pi_1$)≦Tr≦(To+$\pi_2$), the control of the CPU 56 goes to Step S311 to set the final-target torque Tr as the target torque To and generates the command signal St indicative of the target torque To for regulating the output torque of the electric motor 12 to the target torque To, i.e., final-target torque Tr. Steps S307 to S310 may be omitted, so that the control of the CPU 56 goes to Step S311 following Step S306.

It emerges from the foregoing description that in the eighth embodiment, at Step S305 the steering angle ω and vehicle speed V are detected, at Step S306 the final-target torque Tr is determined according to the third data map of FIG. 27 based on the detected steering angle ω and vehicle speed V as parameters, and at Step S311 the output torque of the electric motor 12 is regulated to the final-target torque Tr which increases as the steering angle ω increases. Thus, with the steering wheel being operated by a great steering angle ω, a correspondingly great creep torque is produced so as to run the vehicle. Therefore, the vehicle can easily be put into a garage by depressing and releasing the brake pedal. Additionally, since the creep torque is determined based on the steering angle ω, the vehicle running speed V is not unnecessarily increased with the steering wheel being operated by a small steering angle ω. Thus, the change of vehicle running speed V is minimized, through the running resistance of the vehicle is changed due to the operation of the steering wheel.

As shown in the graph of FIG. 27, the influence of the steering angle ω to the output torque Tr of the electric motor 12 decreases as the vehicle running speed V increases. That is, the creep torque decreases as the vehicle speed V increases. Therefore, an unnecessary increase of the vehicle speed V is effectively avoided. Thus, the operability of the electric vehicle for putting the vehicle into the garage is improved. Moreover, in the eighth embodiment, only while the GARAGE mode is selected through operation of the mode-select switch 374, the special creep torque regulation at Steps S305 through S311 is effected based on the steering angle ω. Therefore, the operator expects the vehicle speed V not to decrease if the steering angel ω increases, like the normal creep torque regulation at Step S312 wherein the operator expects the vehicle speed V to decrease if the steering angel ω increases. Since the vehicle speed V changes as expected by the operator, the vehicle can be operated with high safety.

In the eighth embodiment, Steps S305 to S311 and a portion of the motor control computer 54 for implementing those steps cooperate with each other to function as the torque regulating means for the creep torque regulation based on the steering angle of the electric vehicle. When a positive judgment is made at each of Steps S302, S303, and S304, the torque regulating means effects the creep torque regulation based on the steering angle of the vehicle.

In the flow chart of FIG. 26 used in the eighth embodiment, it is possible to add, following Step S312, steps identical with Steps S5 and S6 of FIG. 4 used in the first embodiment and add, following Step S303, steps identical with Steps S8 and S15 of FIG. 4. If a negative judgment is made at Step S8, the control goes to Step S313; on the other hand, if a positive judgment is made at Step S8, the control goes to Step S15 to effect a start-after-creep (SAC) torque regulation. After Step S15, the control of the CPU 56 returns to Step S301. With this modification, the electric vehicle can smoothly start on a highly upgrade road surface.

In the eighth embodiment, even while the shift lever is operated to the R range, the drive system produces a creep torque which drives the electric vehicle backward, if the mode-select switch 374 has been operated to select the GARAGE mode. However, it is possible to adapt the drive system not to effect the creep torque regulation while the shift lever is operated to the R range.

Although in the eighth embodiment the drive system effects the creep torque regulation based on the steering angle ω at Steps S305 to S311 so long as the vehicle satisfies the three prescribed conditions, i.e., that the vehicle speed V is not greater than the reference speed $V_9$, that the accelerator pedal is not depressed ("OFF"), and that the GARAGE mode has been selected, a different creep-torque-regulation starting and ending condition may be employed, such that the brake pedal is released ("OFF") after the vehicle has been stopped as a result of the depression ("ON") of the brake pedal. The creep-torque-regulation starting and ending conditions may be different from each other.

Although in the eighth embodiment the normal creep torque regulation is effected at Step S312, it is possible to modify, or omit, the normal creep torque regulation. The normal creep torque regulation at Step S312 may be modified such that the final-target torque Tq determined based on the vehicle inclination angle θ and vehicle running speed V is corrected based on the steering angle ω, or such that the final-target torque Tq is determined based on the steering angle ω as a parameter. In either case, the drive system produces a great creep torque based on a great steering angle ω.

Although in the eighth embodiment the final-target torque Tr is determined based on both the vehicle steering angle ω and the vehicle running speed V as parameters, it is possible to determine the torque Tr based on the steering angle ω only, or to add the vehicle inclination angle θ, vehicle weight, and/or other vehicle conditions as one or more additional parameters used for regulating the output torque of the electric motor 12, so that the vehicle is driven forward at a creep speed irrespective of the inclination angle θ or vehicle weight. It is possible to adapt the drive system to produce no creep torque, or a regenerative braking torque, when the electric vehicle is dragged forward due to its weight on a downgrade road surface on which the inclination angle θ of the vehicle is negative. The vehicle weight may be detected by a sensor similar to the deflectometer 178 shown in FIG. 12.

Without using the third data map shown in FIG. 27, it is possible to determine the final-target torque Tr by utilizing a fuzzy-algorithmic approach or an arithmetic expression each wherein the steering angle ω, vehicle speed V, and/or other vehicle conditions are used as parameters. In the running torque regulation at Step S313 or the normal creep torque regulation at Step S312, it is possible to determine the final-target torque Tp or Tq by utilizing a fuzzy-algorithmic approach or an arithmetic expression.

Although the third data map of FIG. 27 defines positive final-target torque values Tr corresponding to great vehicle speeds V, the data map may be so modified to define, as the final-target torque Tr, zero or regenerative braking torques corresponding to excessively great vehicle speeds V, like the second data map used in the normal creep torque regulation at Step S312 which map is similar to the data map shown in FIG. 7(a).

While in each of the first to eighth embodiments of the present invention the drive unit 10 includes the electric motor 12, reduction gear device 16, and differential 18 all of which are provided around a single, common axis and between the left and right driving wheels 26L, 26R, the drive unit 10 may be replaced with any of other drive units such as a drive unit including a reduction gear device having a plurality of axes; a drive unit including a bevel gear-type differential; a drive unit including no reduction gear device; or a drive unit including a reduction gear device whose gear ratio is variable.

It is to be understood that the present invention may be embodied with other changes, improvements, and modifications that may occur to those skilled in the art without departing from the spirit and scope of the invention defined in the appended claims.

What is claimed is:

1. A driving-force regulating apparatus for an electric vehicle which is driven by an electric motor, comprising:

first regulating means for regulating, when an accelerator of the electric vehicle is operated, an output torque of the electric motor to a running torque corresponding to (A1) an operation amount of the accelerator and (A2) a rotation speed of the electric motor when the accelerator is operated;

second regulating means for regulating, when the electric vehicle satisfies a predetermined condition, said output torque of the electric motor to a creep torque corresponding to (B) at least one condition of the vehicle different from an operation amount of the accelerator; and third regulating means for regulating, when the accelerator is operated after termination of the creep torque regulation by said second regulating means, said output torque of the electric motor to an after-creep torque corresponding to (B) said at least one condition of the vehicle when the vehicle satisfies said predetermined condition, (C1) an after-creep operation amount of the accelerator after said termination of said creep torque regulation, and (C2) an after-creep rotation speed of the electric motor when the accelerator is operated after said termination of said creep torque regulation, said third regulating means regulating said output torque of the electric motor to said after-creep torque such that said after-creep torque is different from a running torque to which said output torque of the motor is regulated by said first regulating means in response to a same operation amount of the accelerator as said after-creep operation amount thereof and a same rotation speed of the motor as said after-creep rotation speed thereof.

2. A driving-force regulating apparatus according to claim 1, wherein, when said second regulating means regulates said output torque of the electric motor to a positive creep torque, said third regulating means regulates said output torque of the electric motor to said after-creep torque such that said after-creep torque is greater than said running torque to which said output torque of the motor is regulated by said first regulating means in response to said same operation amount of the accelerator as said after-creep operation amount thereof and said same rotation speed of the motor as said after-creep rotation speed thereof.

3. A driving-force regulating apparatus according to claim 1, wherein, when said second regulating means regulates said output torque of the electric motor to a negative creep torque, said third regulating means regulates said output torque of the electric motor to said after-creep torque such that said after-creep torque is smaller than said running torque to which said output torque of the motor is regulated by said first regulating means in response to said same operation amount of the accelerator as said after-creep operation amount thereof and said same rotation speed of the motor as said after-creep rotation speed thereof.

4. A driving-force regulating apparatus according to claim 1, wherein said second regulating means regulates said output torque of the electric motor to said creep torque corresponding to, as (B) said at least one condition of the electric vehicle, at least one of (b1) an angle of inclination of the vehicle on a road surface on which the vehicle is driven by the motor, and (b2) a weight of the vehicle.

5. A driving-force regulating apparatus according to claim 1, wherein said second regulating means regulates said output torque of the electric motor to said creep torque when the electric vehicle satisfies, as said predetermined condition, each of at least one of (a) a first condition that a running speed of the vehicle becomes smaller than a reference value as a result of operation of a brake pedal of the vehicle and (b) a second condition that a brake pedal of the vehicle is released after a running speed of the vehicle has become smaller than a reference value as a result of operation of the brake pedal.

6. A driving-force regulating apparatus according to claim 1, further comprising:

a memory which stores data indicative of a relationship between creep torque and at least one parameter indicative of said at least one condition of the electric vehicle, said second regulating means determining, when a running speed of the electric vehicle is around zero, a creep torque corresponding to at least one actual value of said at least one parameter, according to said data stored in said memory, and regulating said output torque of the electric motor to the determined creep torque;

torque adjusting means for adjusting said output torque of the electric motor from said determined creep torque to an adjusted creep torque, so that with said adjusted creep torque the electric vehicle is driven at a predetermined running speed around zero; and data updating means for updating said data stored in said memory, based on said adjusted creep torque.

7. A driving-force regulating apparatus according to claim 1, further comprising:

a brake switch which detects operation of a brake device of the electric vehicle for braking the vehicle; and a braking-force detector which detects a braking force applied to the brake device, when said brake switch detects said operation of the brake device and simultaneously when a running speed of the vehicle is around zero, said second regulating means regulating, when said brake switch detects termination of said operation of the brake device, said output torque of the electric motor to said creep torque corresponding to, as (B) said at least one condition of the electric vehicle, the braking force detected by said braking-force detector, so that said running speed of the vehicle is maintained at around zero.

8. A driving-force regulating apparatus according to claim 1, further comprising a steering-angle detector which detects a steering angle of a steering member of the electric vehicle, said second regulating means regulating, when the electric vehicle satisfies said predetermined condition, said output torque of the electric motor to said creep torque corresponding to, as (B) said at least one condition of the vehicle, the steering angle detected by said steering-angle detector such that a greater creep torque corresponds to a greater steering angle detected by said steering-angle detector.

9. A driving-force regulating apparatus according to claim 1, further comprising a first memory which stores a first set of data indicative of a first relationship between creep torque and rotation speed of the electric motor, and a second set of data indicative of a second relationship between creep torque and rotation speed of the motor, said second set of data defining a greater creep torque than said first set of data for a same rotation speed of the motor, when an angle of inclination of the electric vehicle on an upgrade road surface on which the vehicle is driven by the electric motor is smaller than a reference value, said second regulating means determining said creep torque according to said first set of data based on a rotation speed of the motor when the vehicle satisfies said predetermined condition, and regulating said output torque of the electric motor to the determined creep torque, when said angle of inclination of the electric vehicle is not smaller than said reference value, said second regulating means determining said creep torque according to said second set of data based on a rotation speed of the motor when the vehicle satisfies said predetermined condition, and regulating said output torque of the electric motor to the determined creep torque.

10. A driving-force regulating apparatus according to claim 9, further comprising a second memory which stores a third set of data indicative of a first relationship between (1) creep torque and (2) (2a) operation amount of the accelerator and (2b) rotation speed of the electric motor, and a fourth set of data indicative of a second relationship between (1) creep torque and (2) (2a) operation amount of the accelerator and (2b) rotation speed of the motor, said fourth set of data defining a greater creep torque than said third set of data for a same operation amount of the accelerator and a same rotation speed of the motor, when said angle of inclination of the electric vehicle is smaller than said reference value, said third regulating means determining said after-creep torque according to said third set of data based on said after-creep operation amount of the accelerator and said after-creep rotation speed of the motor, and regulating said output torque of the electric motor to the determined after-creep torque, when said angle of inclination of the electric vehicle is not smaller than said reference value, said third regulating means determining said after-creep torque according to said fourth set of data based on said after-creep operation amount of the accelerator and said after-creep rotation speed of the motor, and regulating said output torque of the electric motor to the determined after-creep torque.

11. A driving-force regulating apparatus according to claim 1, further comprising a first memory which stores a first set of data indicative of a relationship between (1) creep torque and (2) at least one parameter indicative of said at least one condition of the electric vehicle, said second regulating means determining said creep torque according to said first set of data based on at least one actual value of said at least one parameter when the vehicle satisfies said predetermined condition, and regulating said output torque of the electric motor to the determined creep torque.

12. A driving-force regulating apparatus according to claim 11, further comprising a second memory which stores a second set of data indicative of a first relationship between (1) creep torque and (2) (2a) operation amount of the accelerator and (2b) rotation speed of the electric motor, and a third set of data indicative of a second relationship between (1) creep torque and (2) (2a) operation amount of the accelerator and (2b) rotation speed of the motor, said third set of data defining a greater creep torque than said second set of data for a same operation amount of the accelerator and a same rotation speed of the motor, when said creep torque determined by said second regulating means is smaller than a reference value, said third regulating means determining said after-creep torque according to said second set of data based on said after-creep operation amount of the accelerator and said after-creep rotation speed of the motor, and regulating said output torque of the electric motor to the determined after-creep torque, when said creep torque determined by said second regulating means is not smaller than said reference value, said third regulating means determining said after-creep torque according to said third set of data based on said after-creep operation amount of the accelerator and said after-creep rotation speed of the motor, and regulating said output torque of the electric motor to the determined after-creep torque.

13. A driving-force regulating apparatus according to claim 1, further comprising torque adjusting means for adjusting said output torque of the electric motor from said creep torque to an adjusted creep torque, so that with said adjusted creep torque the electric vehicle is driven at a predetermined running speed around zero.

14. A driving-force regulating apparatus for an electric vehicle which is driven by an electric motor, comprising:

a memory which stores data indicative of a relationship between creep torque and at least one parameter indicative of at least one condition of the electric vehicle;

torque regulating means for determining, when a running speed of the electric vehicle is around zero, a creep torque corresponding to at least one actual value of said at least one parameter, according to said data stored in said memory, and regulating an output torque of the electric motor to the determined creep torque;

torque adjusting means for adjusting said output torque of the electric motor from said determined creep torque to an adjusted creep torque, so that with said adjusted creep torque the electric vehicle is driven at a predetermined running speed around zero; and data updating means for updating said data stored in said memory, based on said adjusted creep torque.

15. A driving-force regulating apparatus according to claim 14, wherein said memory stores a set of data indicative of a relationship between (1) creep torque and (2) at least one of (2a) braking force applied to a brake device of the electric vehicle, (2b) angle of inclination of the vehicle on a road surface on which the vehicle is driven by the electric motor, and (2c) weight of the vehicle.

16. A driving-force regulating apparatus according to claim 14, wherein, when said running speed of the electric vehicle is not equal to said predetermined running speed while the vehicle is driven with said creep torque determined by said torque regulating means according to said data stored in said memory, said torque adjusting means adjusting said determined creep torque by one of an incremental value and a decremental value, and said data updating means updating said data based on said determined creep torque and said one of said incremental and decremental values, said torque adjusting means and said data updating means repeating the adjustment of said creep torque and the updating of said data, respectively, so that, with the creep torque determined according to the updated data by said torque regulating means, the electric vehicle is driven at said predetermined running speed.

17. A driving-force regulating apparatus according to claim 14, wherein said data updating means updates said data stored in said memory, based on said adjusted creep torque, when the electric vehicle satisfies a predetermined data-updating condition.

18. A driving-force regulating apparatus according to claim 17, wherein said data updating means updates said data stored in said memory, based on said adjusted creep torque, when the electric vehicle is driven at said predetermined running speed for a predetermined duration of time.

19. A driving-force regulating apparatus for an electric vehicle which is driven by an electric motor, comprising:

a brake switch which detects operation of a brake device of the electric vehicle for braking the vehicle;

a braking-force detector which detects a braking force applied to the brake device, when said brake switch detects said operation of the brake device and simultaneously when a running speed of the vehicle is around zero; and torque regulating means for regulating, when said brake switch detects termination of said operation of the brake device, an output torque of the electric motor to a creep torque corresponding to the braking force detected by said braking-force detector, so that said running speed of the electric vehicle is maintained at around zero.

20. A driving-force regulating apparatus according to claim 19, further comprising torque adjusting means for adjusting said output torque of the electric motor from said creep torque to an adjusted creep torque, so that with said adjusted creep torque the electric vehicle is driven at a predetermined running speed around zero.

21. A driving-force regulating apparatus according to claim 19, wherein said torque regulating means regulates said output torque of the electric motor to said creep torque corresponding to the braking force detected by said braking-force detector and one of an upgrade and a downgrade road surface on which the vehicle is driven by the electric motor.

22. A driving-force regulating apparatus according to claim 21, further comprising a road-surface detector which identifies one of said upgrade and downgrade road surfaces on which the electric vehicle is driven by the electric motor, said torque regulating means determines, for a same braking force detected by said braking-force detector, a positive creep torque when said road-surface detector identifies that the vehicle is driven on said upgrade road surface, and a negative creep torque whose absolute value is smaller than that of said positive creep torque, when said road-surface detector identifies that the electric vehicle is driven on said downgrade road surface, and regulates said output torque of the electric motor to said positive or negative creep torque.

23. A driving-force regulating apparatus according to claim 21, wherein said torque regulating means determines, for a same braking force detected by said braking-force detector, a positive and a negative creep torque corresponding to said upgrade and downgrade road surfaces, respectively, on which the electric vehicle is driven, such that an absolute value of said negative creep torque is smaller than that of said positive creep torque, and regulates said output torque of the electric motor to said positive or negative creep torque.

24. A driving-force regulating apparatus for an electric vehicle which is driven by an electric motor, comprising:

a steering-angle detector which detects a steering angle of a steering member of the electric vehicle; and torque regulating means for regulating, when the electric vehicle satisfies a predetermined condition, an output torque of the electric motor to a creep torque corresponding to the steering angle detected by said steering-angle detector such that a greater creep torque corresponds to a greater steering angle detected by said steering-angle detector.

25. A driving-force regulating apparatus according to claim 24, further comprising a mode-select device operable for selecting one of a first and a second creep mode, when the electric vehicle satisfies said predetermined condition in said first creep mode, said torque regulating means regulating said output torque of the electric motor to a creep torque corresponding to at least the steering angle detected by said steering-angle detector, when the electric vehicle satisfies said predetermined condition in said second creep mode, said torque regulating means regulating said output torque of the electric motor to a creep torque corresponding to at least one condition of the vehicle different from a steering angle detected by said steering-angle detector.

26. A driving-force regulating apparatus according to claim 25, wherein, when the electric vehicle satisfies said predetermined condition in said second creep mode, said torque regulating means regulates said output torque of the electric motor to a creep torque corresponding to at least an angle of inclination of the electric vehicle on a road surface on which the vehicle is driven by the motor.

* * * * *

UNITED STATES PATENT AND TRADEMARK OFFICE
CERTIFICATE OF CORRECTION

PATENT NO. : 5,457,363             Page 1 of 2
DATED : Oct. 10, 1995
INVENTOR(S) : Yoshii et al.

It is certified that error appears in the above-indentified patent and that said Letters Patent is hereby corrected as shown below:

| Column | Line | |
|---|---|---|
| 2 | 15 | After "Even" delete "if". |
| 4 | 44 | Change "dragging" to --dragged--. |
| 4 | 55 | Change "dragging" to --dragged--. |
| 10 | 26 | Change "46" to --44--. |
| 18 | 19 | Change "Select" to --select--. |
| 25 | 48 | Change "W" to --M--. |
| 26 | 14 | Change "(3)" to --(1)--. |
| 26 | 16 | Change "(2b)" to --(2c)--. |
| 26 | 50 | Change "c" to --∈--. |

UNITED STATES PATENT AND TRADEMARK OFFICE
CERTIFICATE OF CORRECTION

PATENT NO. : 5,457,363
DATED : Oct. 10, 1995
INVENTOR(S) : Yoshii et al.

It is certified that error appears in the above-indentified patent and that said Letters Patent is hereby corrected as shown below:

| Column | Line  |                                          |
|--------|-------|------------------------------------------|
| 27     | 54    | Change "in" to --if--.                   |
| 30     | 59    | Change "e" to --∈--.                     |
| 31     | 42    | Change "kg" to --lg--.                   |
| 31     | 43&45 | Change "K" to --L--.                     |
| 31     | 46    | Change "SS3" to --SS103--.               |
| 33     | 32    | Change "K+kg" to --N+ng--.               |
| 33     | 34    | Change "K+kg" to --N+ng--.               |
| 33     | 39    | Change "SS6 to SS10" to --SS106 to SS110--. |
| 35     | 30    | Change "SR14" to --SR114--.              |
| 45     | 22    | Change "judged" to --judges--.           |

Signed and Sealed this

Twenty-eighth Day of May, 1996

Attest:

BRUCE LEHMAN

*Attesting Officer*      Commissioner of Patents and Trademarks